US012062878B2

(12) United States Patent
Jushchyshyn et al.

(10) Patent No.: US 12,062,878 B2
(45) Date of Patent: Aug. 13, 2024

(54) CONNECTOR WITH CAPTIVE INTERFACE

(71) Applicant: Burndy, LLC, Manchester, NH (US)

(72) Inventors: Jeremy Jushchyshyn, Willow Grove, PA (US); Gary E. Schrader, Manchester, NH (US); Charles L. York, Bow, NH (US); Andison Fernandez, Pennsauken, NJ (US); Nicholas Polidori, Medford, NJ (US)

(73) Assignee: Burndy, LLC, Manchester, NH (US)

( * ) Notice: Subject to any disclaimer, the term of this patent is extended or adjusted under 35 U.S.C. 154(b) by 0 days.

(21) Appl. No.: 18/109,732

(22) Filed: Feb. 14, 2023

(65) Prior Publication Data

US 2023/0198175 A1 Jun. 22, 2023

Related U.S. Application Data

(63) Continuation of application No. 17/178,130, filed on Feb. 17, 2021, now Pat. No. 11,588,258.

(60) Provisional application No. 62/977,656, filed on Feb. 17, 2020, provisional application No. 63/115,529, filed on Nov. 18, 2020.

(51) Int. Cl.
*H01R 4/50* (2006.01)
*H01R 4/38* (2006.01)

(52) U.S. Cl.
CPC .............. *H01R 4/5083* (2013.01); *H01R 4/38* (2013.01); *H01R 4/5091* (2013.01)

(58) Field of Classification Search
CPC ........................... H01R 4/5091; H01R 4/5083
See application file for complete search history.

(56) References Cited

U.S. PATENT DOCUMENTS

| | | | |
|---|---|---|---|
| 2,858,522 A | 4/1955 | Wengen | |
| 3,462,543 A | 8/1969 | Wahl | |
| 3,512,447 A | 5/1970 | Vaughn | |
| 4,114,977 A | 9/1978 | Polidori | |
| 4,415,222 A | 11/1983 | Polidori | |
| 4,627,774 A | 12/1986 | Bradley | |
| 5,092,797 A | 3/1992 | Cole | |
| 5,152,701 A | 10/1992 | Polidori | |
| 5,320,565 A * | 6/1994 | Polidori | H01R 4/5083 439/807 |
| 5,419,667 A | 5/1995 | Avgoustis | |
| 5,632,633 A | 5/1997 | Roosdorp et al. | |
| 5,772,252 A | 6/1998 | Malani | |

(Continued)

FOREIGN PATENT DOCUMENTS

| | | |
|---|---|---|
| WO | 1998027621 | 6/1998 |
| WO | 2018208540 | 11/2018 |

OTHER PUBLICATIONS

CPI_Pad-Tap-Cut-Sheet-May 2012 (2 pages).

(Continued)

*Primary Examiner* — Ross N Gushi
(74) *Attorney, Agent, or Firm* — Wissing Miller LLP

(57) ABSTRACT

Wedge type electrical connector assemblies adapted to electrically and mechanically connect conductors within transmission and/or distribution circuits is provided. The wedge type electrical connector assembly includes a frame, an interface and a wedge assembly. The interface is coupled to the frame so that it is movable relative to the frame. The interface can move and flex when installing conductors into the wedge type electrical connector assemblies.

17 Claims, 38 Drawing Sheets

(56) References Cited

U.S. PATENT DOCUMENTS

| | | | |
|---|---|---|---|
| 6,045,414 | A | 4/2000 | DeFrance |
| 6,739,631 | B2 | 5/2004 | Smith |
| 7,179,034 | B2 | 2/2007 | Ladcoucer |
| 7,641,522 | B2 | 1/2010 | Carcangiu |
| 7,993,169 | B1 | 8/2011 | Hoxha |
| 8,402,641 | B2 | 3/2013 | Johnson |
| 8,668,419 | B2 | 3/2014 | Hardt |
| 8,696,274 | B2 | 4/2014 | Kim |
| 10,465,732 | B2 | 11/2019 | Polidori |
| 11,183,778 | B2 * | 11/2021 | Juillet ............ H01R 4/42 |
| 2012/0214355 | A1 | 8/2012 | De France |
| 2013/0078873 | A1 | 3/2013 | La Salvia |
| 2016/0186795 | A1 | 6/2016 | Schneider |
| 2018/0258975 | A1 | 9/2018 | Polidori |
| 2018/0331435 | A1 | 11/2018 | Murugiah |
| 2020/0235500 | A1 | 7/2020 | Juillet |

OTHER PUBLICATIONS

AFL Brochure_Wedge-Pad-Tap-Connectors_Nov. 25, 2019 (2 pages).
International Search Report and Written Opinion mailed in corresponding International Application PCT/US21/18413 on Apr. 29, 2021 (9 pages).
International Preliminary Report on Patentability mailed in corresponding International Application PCT/US21/18413 on Sep. 1, 2022 (8 pages).
Extended European Search Report in corresponding European Application No. 21756372.5 mailed Feb. 5, 2024. (11 pages).

* cited by examiner

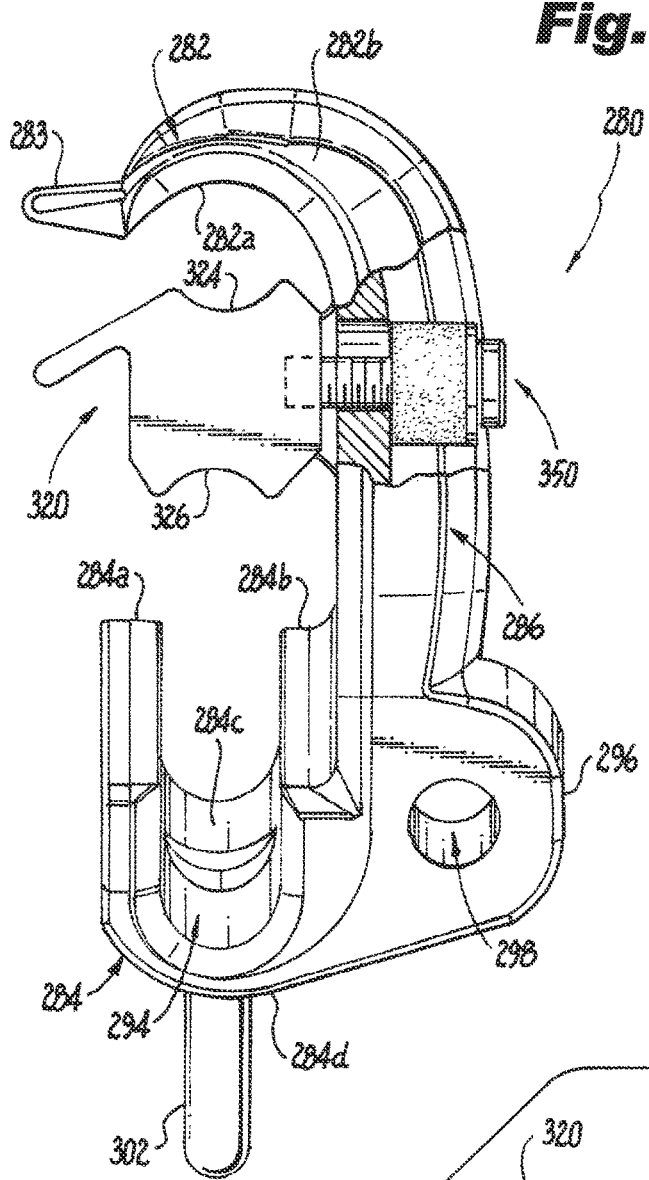
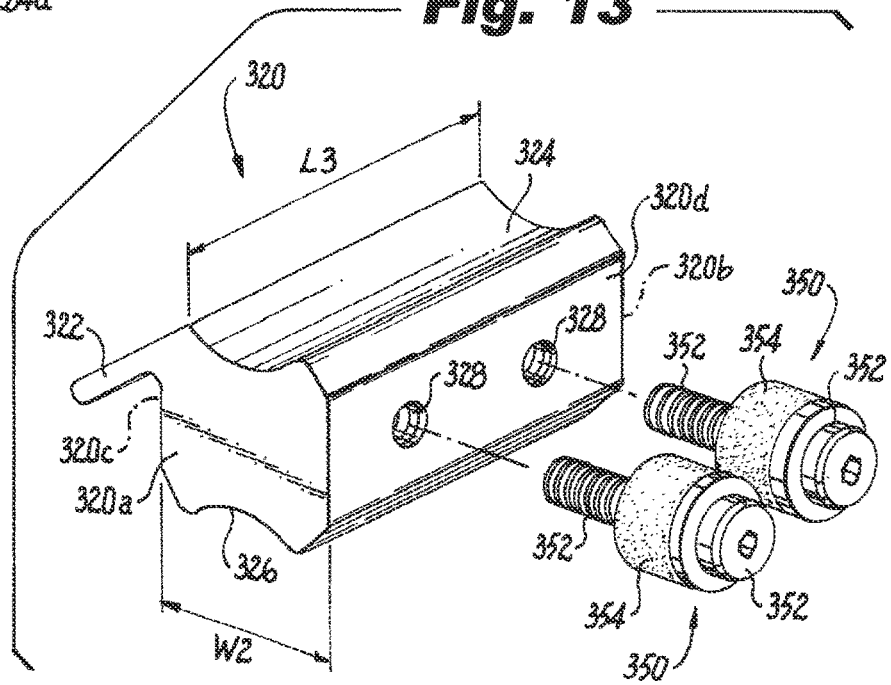

Fig. 21
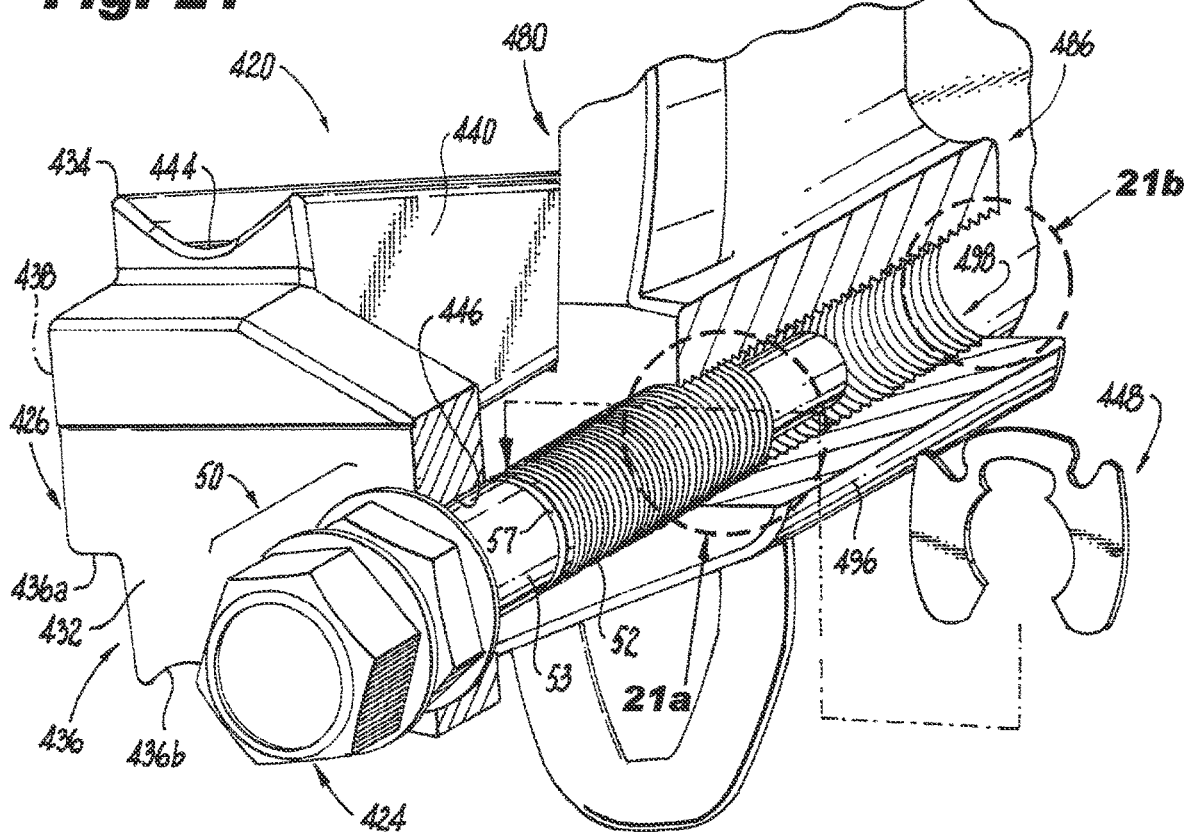
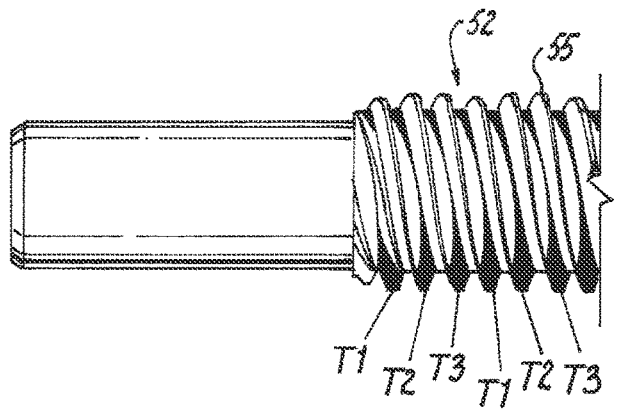
Fig. 21a
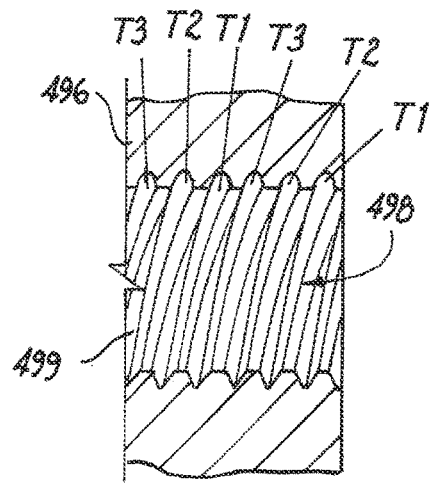
Fig. 21b

CONNECTOR WITH CAPTIVE INTERFACE

CROSS-REFERENCE TO RELATED APPLICATIONS

The present disclosure is a continuation of co-pending U.S. application Ser. No. 17/178,130 filed Feb. 17, 2021, which is based on and claims benefit from U.S. Provisional Patent Application Ser. No. 62/977,656 filed on Feb. 17, 2020 entitled "Connector with Captive Interface" and from U.S. Provisional Application Ser. No. 63/115,529 filed on Nov. 18, 2020 entitled "Connector with Captive Interface" the contents of each are incorporated herein in their entirety by reference.

BACKGROUND

Field

The present disclosure relates generally to electrical connectors. More particularly, the present disclosure relates to wedge type electrical connectors adapted to electrically and mechanically interconnect main conductors and tap conductors.

Description of the Related Art

Wedge type electrical connector assemblies are known in the art. Electrical connectors may be adapted to electrically and mechanically connect conductors within a transmission or distribution circuit. For example, a typical electrical connector may be used to connect a main conductor to a tap conductor. An electrical connector adapted to connect a main conductor or a tap conductor to another conductor may be referred to as a tap connector. Wedge type tap connectors typically include a C-shaped body having a curved top wall adapted to fit over a main conductor. A bolt-operated wedge is carried by the bottom of the C-shaped body and may include an elongated recess in the top for supporting the tap conductor. A conductor interface has a handle thereon which allows the interface to be placed within the C-shaped connector body between the conductors. A bolt positively moves the wedge both in and out of the C-shaped body so that the clamping action of the connector can be tightened or loosened as desired.

However, the conductor interface is a separate component of such wedge type electrical connector assemblies which requires additional steps and care be taken in order to install the wedge type electrical connector assemblies.

SUMMARY

The present disclosure provides exemplary embodiments of wedge type electrical connector assemblies adapted to electrically and mechanically connect conductors within transmission and/or distribution circuits. In an exemplary embodiment, the wedge type electrical connector assembly includes a frame, an interface and a wedge assembly. The frame has a conductor contact wall, a wedge support wall, a rear wall and a mounting member. The rear wall is between the conductor contact wall and the wedge support wall. The conductor contact wall, wedge support wall and rear wall form a wedge receiving channel. The interface is movably coupled to the frame by a connecting member so that the interface is flexible relative to the frame. The wedge assembly has a wedge and a fastener. The wedge has a body shaped to fit within the wedge receiving channel of the frame and a fastener holder extending from a side wall of the body. The fastener holder is aligned with the mounting member so that the fastener can pass through the fastener holder into engagement with the mounting member.

In another exemplary embodiment, the wedge type electrical power connector assembly includes a frame, an interface and a wedge assembly. The frame has a conductor contact wall, a wedge support wall, a rear wall and a mounting member. The rear wall is between the conductor contact wall and the wedge support wall. The conductor contact wall, wedge support wall and rear wall form a wedge receiving channel. The interface is movably coupled to the frame by at least one connecting member. The at least one connecting member includes a flexible member having a base, a leg having one end attached to the base and a second end positioned away from the base. The second end of the leg has an interface coupling member attached thereto configured to attached to the interface. The flexible member is preferably an elastomeric member. The wedge assembly has a wedge and a fastener. The wedge has a body shaped to fit within the wedge receiving channel of the frame and a fastener holder extending from the body. The fastener holder is aligned with the mounting member so that the fastener can pass through the fastener holder into engagement with the mounting member. The fastener is used to move the wedge between an open position and a clamping position.

In another exemplary embodiment, the wedge type electrical power connector assembly includes a frame, an interface and a wedge assembly. The frame has a conductor contact wall, a wedge support wall, a rear wall and a mounting member. The rear wall is between the conductor contact wall and the wedge support wall and includes at least one opening. The conductor contact wall, wedge support wall and rear wall form a wedge receiving channel. The interface is positioned within the wedge receiving channel and coupled to the frame by at least one flexible member. The at least one flexible member is preferably flexible an elastomeric member that includes a base, a leg having one end attached to the base and a second end positioned away from the base. The second end of the leg has an interface coupling member attached thereto that is configured to pass through the at least one opening in the rear wall. The wedge assembly has a wedge and a fastener. The wedge has a wedge-shaped body that fits within the wedge receiving channel of the frame and a fastener holder extending from the body. The body of the wedge has a contact surface facing the conductor contact wall of the frame. The fastener holder is aligned with the mounting member so that the fastener can pass through the fastener holder into engagement with the mounting member. The fastener moves the wedge between an open position and a clamping position.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein:

FIG. 12 is the first end elevation view of the frame and interface of the wedge type electrical cable connector assembly of FIG. 9, illustrating the conductor interface mated with the frame using the flex connecting member;

FIG. 13 is an exploded perspective view of the conductor interface of FIG. 12, illustrating a flex connecting member of FIG. 12 positioned to be inserted within each mounting aperture in the conductor interface;

FIG. 21 is an enlarged perspective view of a portion of the wedge type electrical cable connector assembly of FIG. 20, illustrating a retaining ring used to secure a fastener to the wedge assembly;

FIG. 21a is an enlarged perspective view of a portion of the fastener used to tighten the wedge of the wedge assembly to the frame, illustrating a triple-lead threaded portion of the fastener;

FIG. 21b is an enlarged cross-sectional view of a mounting member of the frame of FIG. 21, illustrating triple-lead threads in a threaded bore of the mounting member;

DETAILED DESCRIPTION

Figure 1:
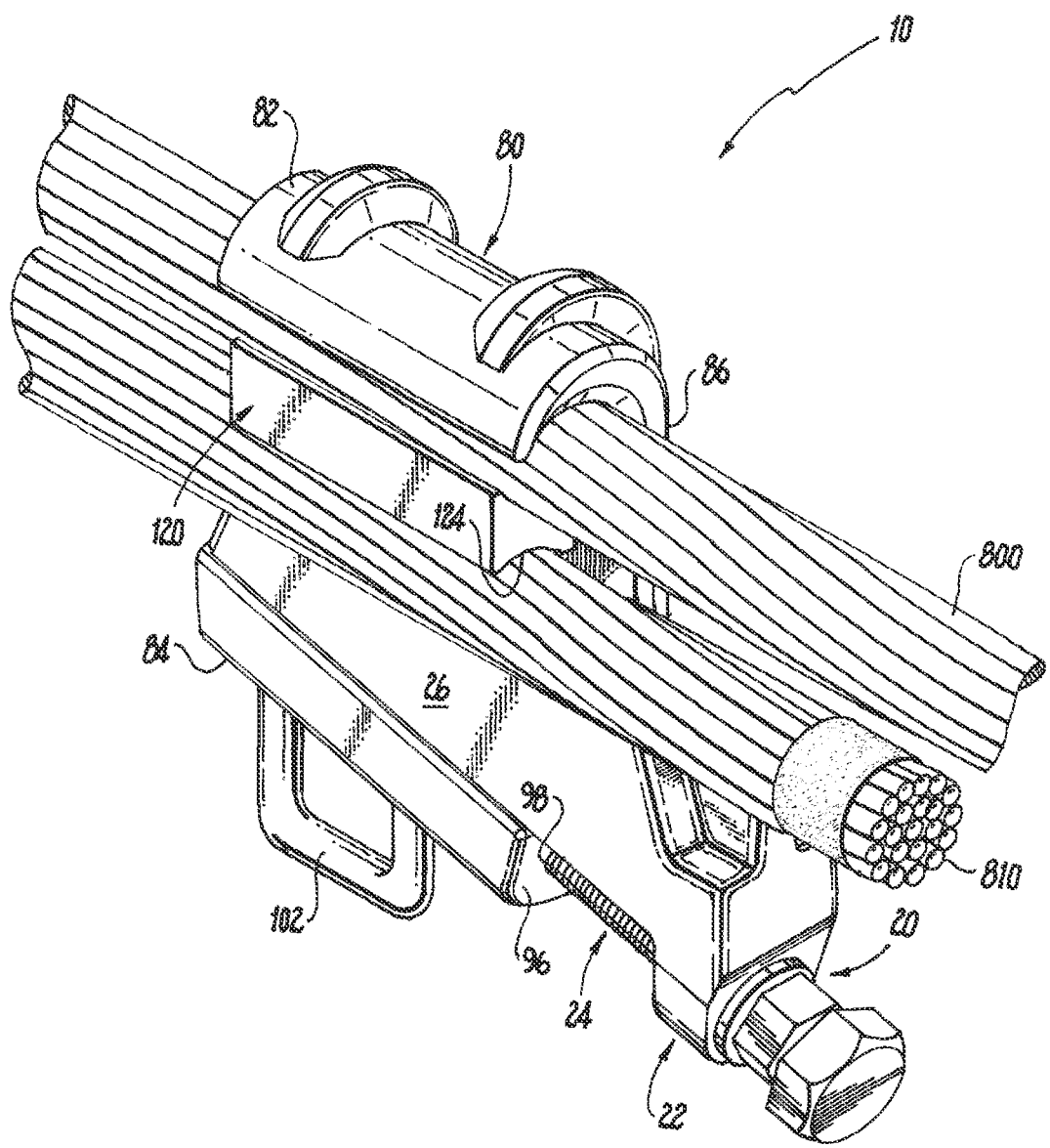
FIG. 1 is a perspective view of an exemplary embodiment of a wedge type electrical cable connector assembly according to the present disclosure, illustrating a frame, a wedge assembly and a conductor interface of the cable connector assembly, with the cable connector assembly connected to a main conductor and a tap conductor.

The present disclosure provides exemplary embodiments of improved wedge type electrical cable connectors adapted to electrically and mechanically connect conductors within transmission or distribution circuits. The wedge type electrical cable connectors contemplated by the present disclosure include, but are not limited to, wedge type tap connectors. Wedge type tap connectors electrically and mechanically connect a main conductor to a tap conductor, as shown in FIG. 1. The wedge type electrical cable connectors according to the present disclosure flexibly mates a conductor interface with a frame of the wedge type electrical cable connector using one or more flex connecting members to facilitate easier installation of the wedge type electrical cable connector using extendable reach tools. For ease of description, the wedge type electrical cable connectors contemplated by the present disclosure may also be referred to herein as the "connectors" in the plural and the "connector" in the singular. The conductor interfaces contemplated by the present disclosure may also be referred to herein as the "interfaces" in the plural and the "interface" in the singular. The flex connecting members contemplated by the present disclosure may also be referred to herein as the "connecting members" in the plural and the "connecting member" in the singular. The main conductors referenced herein include, for example, transmission line conductors, and the tap conductors referenced herein include, for example, branch conductors. For general reference purposes, a main conductor supplies power from either a transmission circuit or a distribution circuit, and a tap conductor distributes power to a distribution circuit or a load.

Figure 4:
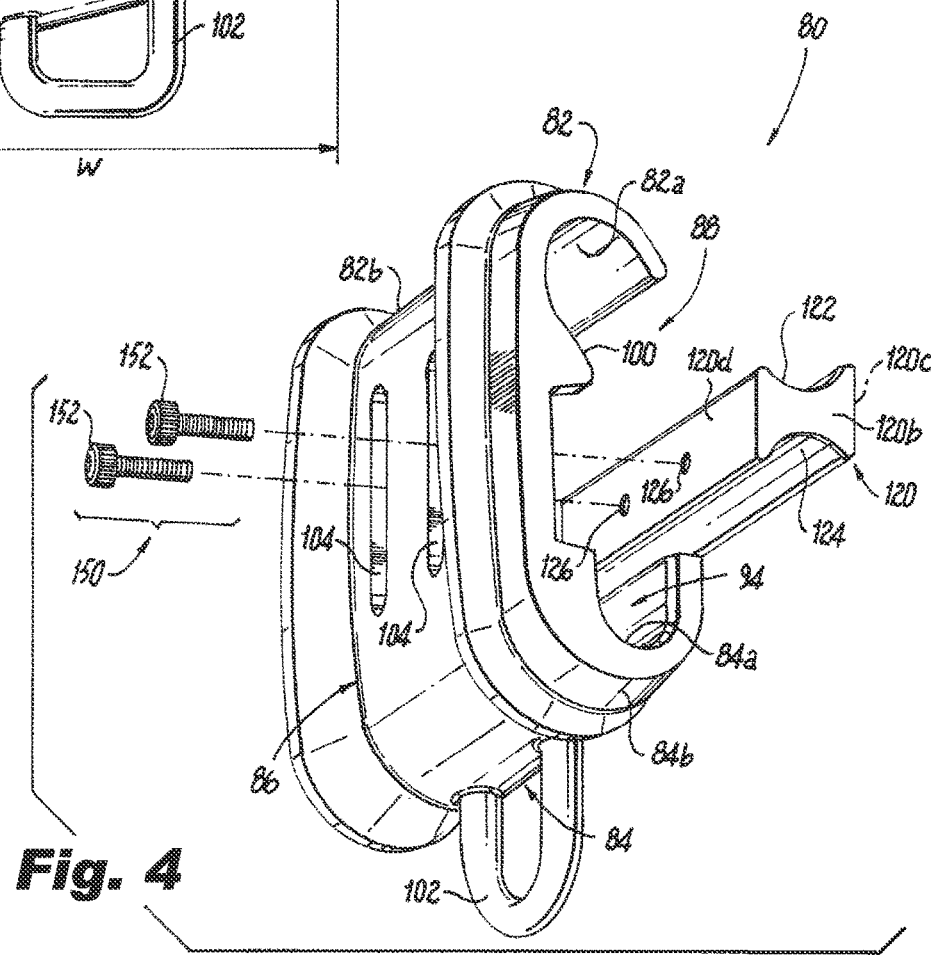
FIG. 4 is an exploded perspective view of a first end of the frame and conductor interface of the wedge type electrical cable connector assembly of FIG. 3, illustrating the multiple slots in the frame and the multiple flex connecting members positioned to mate the conductor interface to the frame.
Figure 7:
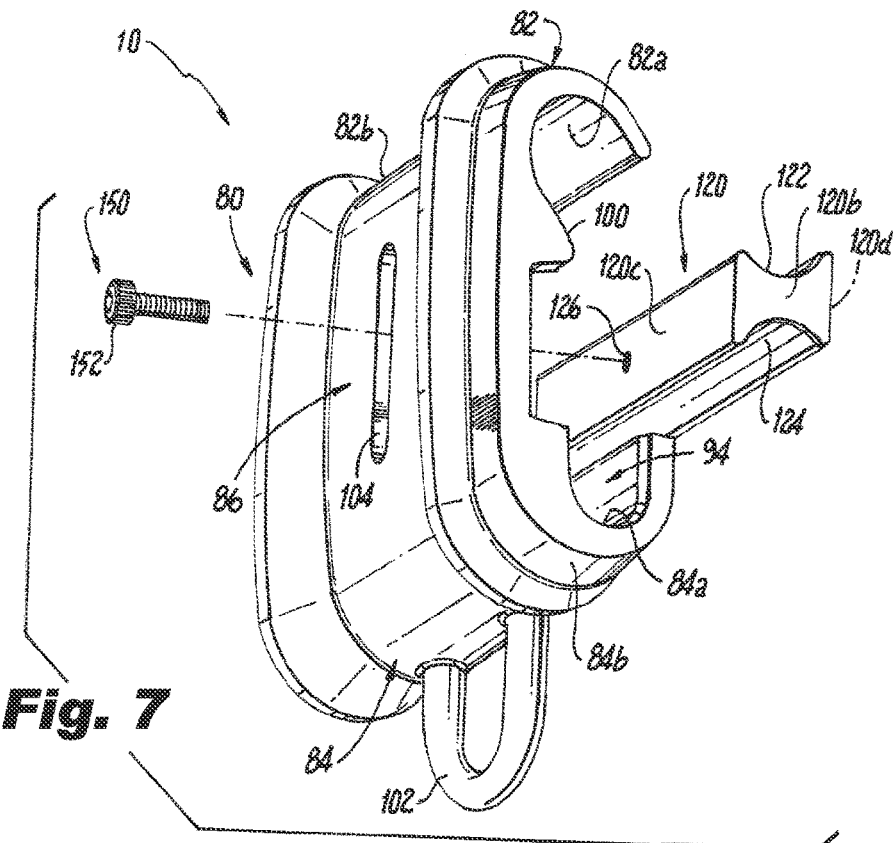
FIG. 7 is a perspective view of another exemplary embodiment of the frame and conductor interface of the wedge type electrical cable connector assembly according to the present disclosure, illustrating a single slot in a frame of the cable connector assembly and a flex connecting member extending through the slot in the frame and mating with the conductor interface.
Figure 8:
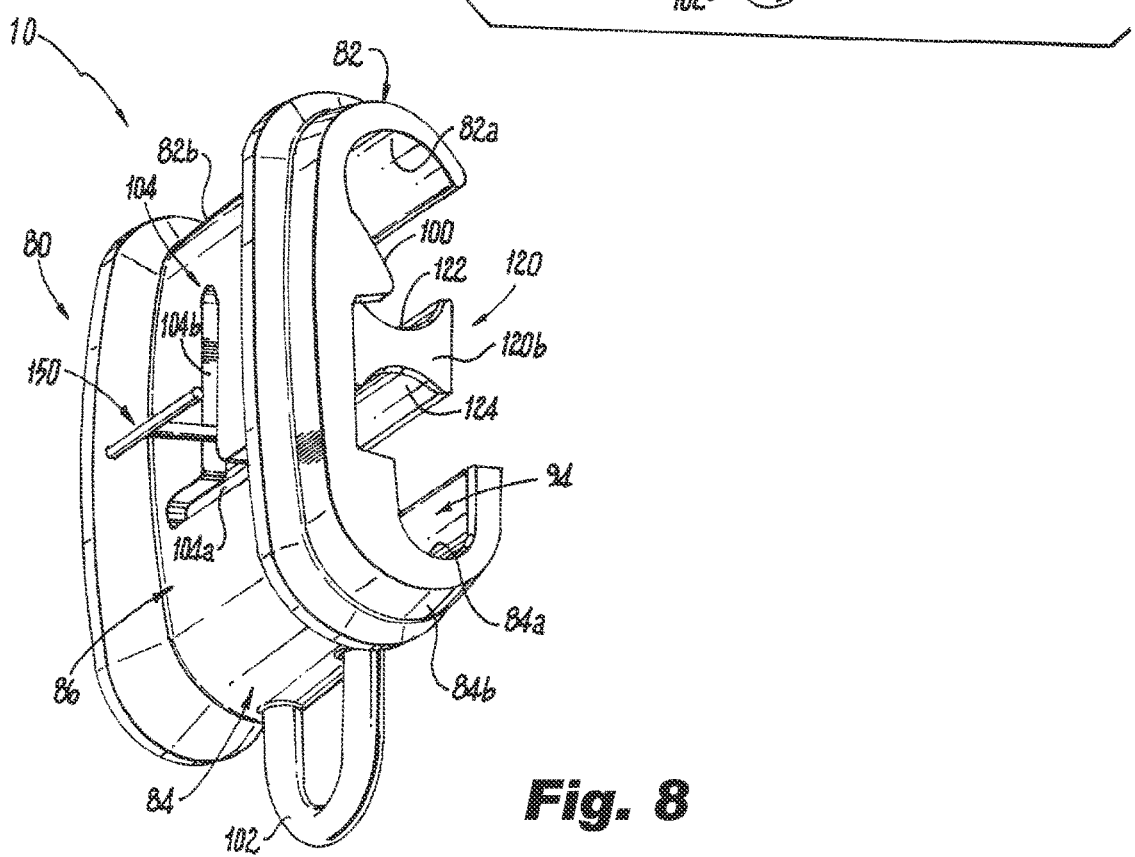
FIG. 8 is a perspective view of another exemplary embodiment of the frame and conductor interface of the wedge type electrical cable connector assembly according to the present disclosure, illustrating a T-shaped slot in a frame of the cable connector assembly and a flex connecting member extending through the slot in the frame and mating with the conductor interface.
Figure 9:
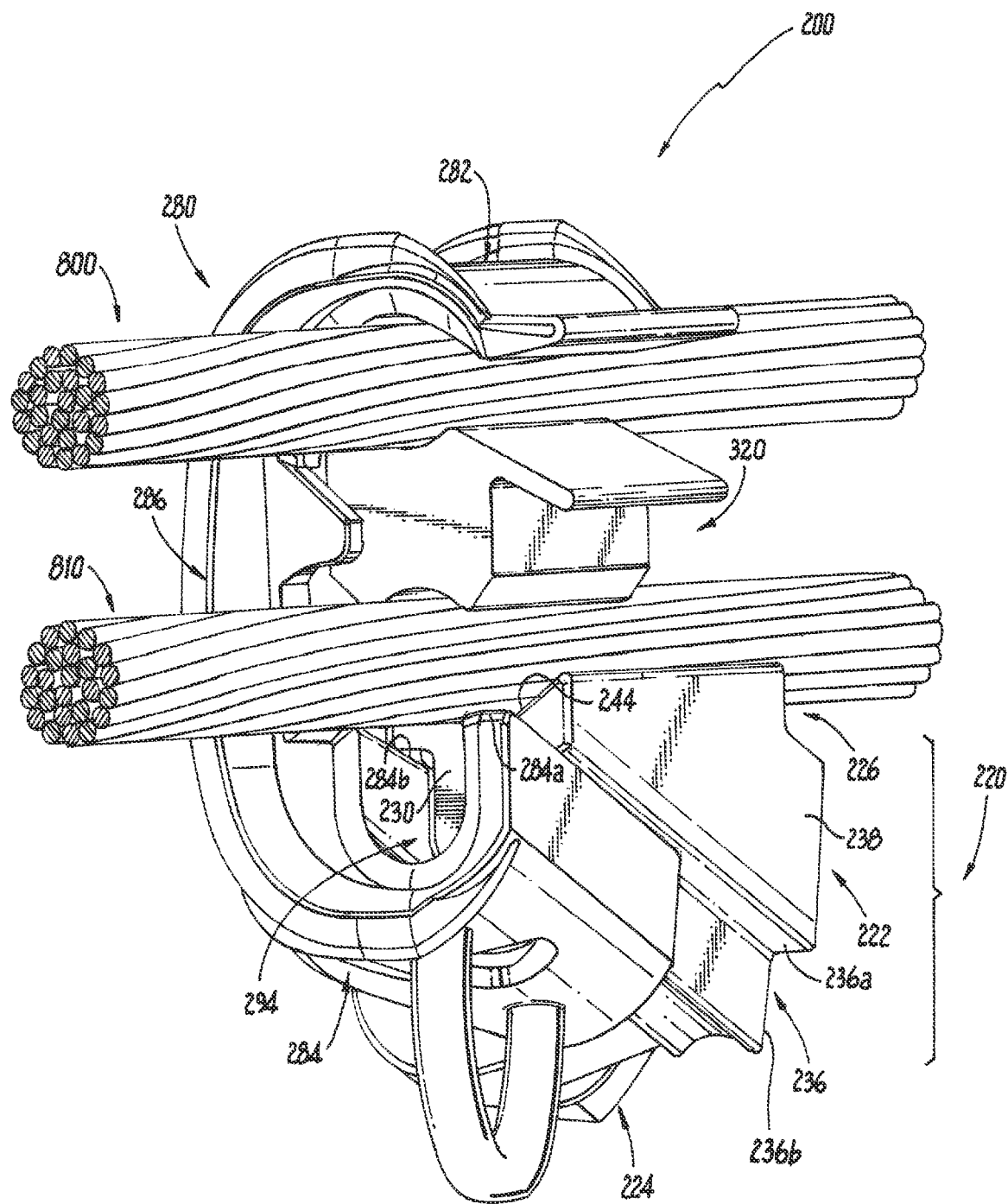
FIG. 9 is a first end perspective view of another exemplary embodiment of a wedge type electrical cable connector assembly according to the present disclosure, illustrating a frame, a wedge assembly and a conductor interface of the cable connector assembly, and illustrating the main and tap conductors secured to the cable connector assembly.

Referring to FIGS. 1 and 4, an exemplary embodiment of a connector 10 according to the present disclosure is shown electrically and mechanically connecting a main conductor 800 to a tap conductor 810. The connector 10 includes a wedge assembly 20, a frame 80, an interface 120 and one or more connecting members 150, seen in FIGS. 4, 7 and 8. The wedge assembly 20 is operatively coupled to or interconnected with the frame 80 so that the wedge assembly 20 can slide or glide along the frame to clamp a main conductor 800 to a tap conductor 810 so that the main conductor 800 and tap conductor 810 are electrically and mechanically connected, as will be described below. The wedge assembly 20, frame 80 and interface 120 are made of an electrically conductive material that has sufficient rigidity to withstand the forces applied by the wedge assembly 20 against the frame 80 when mechanically connecting the main conductor 800 to a tap conductor 810. Non-limiting examples of such electrically conductive and rigid materials include aluminum, aluminum alloys, stainless steel, galvanized steel, copper and copper/brass alloys. The one or more connecting members 150 may also be made of an electrically conductive material or a non-conductive material. Non-limiting examples of such electrically conductive materials include aluminum, aluminum alloys, stainless steel, galvanized steel, copper and copper/brass alloys described above. Non-limiting examples of such non-conductive materials include plastic materials and elastomeric materials. For example, the one or more connecting members 150 may be made of Ethylene Propylene Diene Monomer (EPDM), Thermoplastic Elastomer (Rubber TPE) or Silicone.

Figure 2:
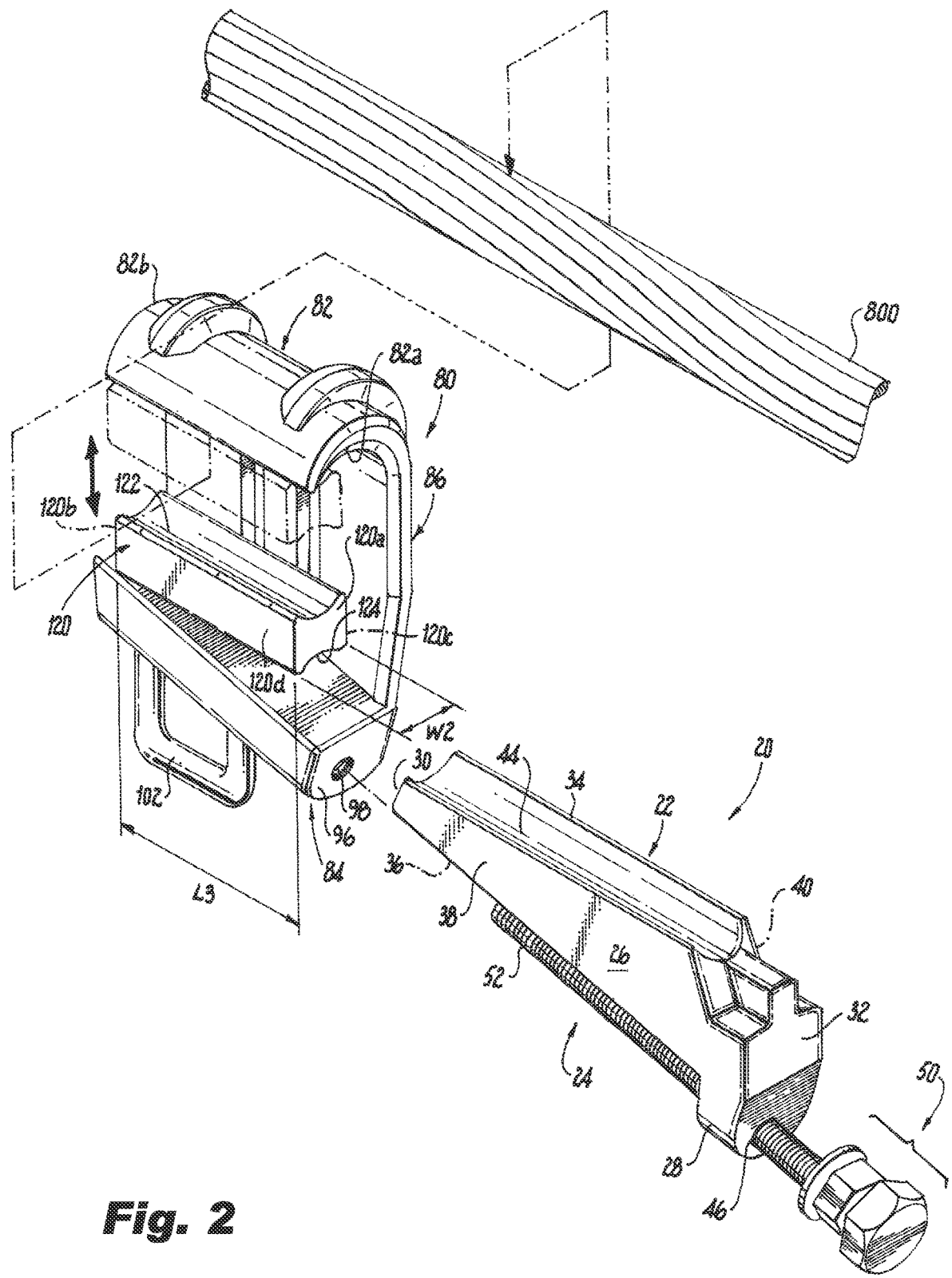
FIG. 2 is an exploded perspective view of the wedge type electrical cable connector assembly of FIG. 1 without the tap conductor.

Referring to FIGS. 1 and 2, in the exemplary embodiment shown, the wedge assembly 20 includes a wedge 22 and a fastener 24. The wedge 22 includes a body 26 and a fastener holder 28. The body 26 has a front wall 30, a rear wall 32, a top wall 34, a bottom wall 36 and side walls 38 and 40. The wedge body 26 is shaped to fit within the frame 80. At least a portion of the top wall 34 includes a contact surface 44, and at least a portion of the bottom wall 36 is substantially flat. The contact surface 44 may be in the form of an elongated recess or groove as shown. The contact surface 44 is preferably configured to contact with a tap conductor 810 positioned in the frame 80. The fastener holder 28 extends from the body 26 and includes an aperture 46 configured and dimensioned to receive the fastener 24 such that the fastener 24 can rotate relative to the aperture 46. Preferably, the fastener holder 28 is positioned at or in proximity to the rear wall 32 of the body 26 and extends between the side walls 38 and 40 so that the aperture 46 of the fastener holder 28 is aligned with a bore 98 in the frame 80 when the wedge assembly 20 is coupled to the frame 80. However, the present disclosure contemplates that the fastener holder 28 can be positioned at any location on the body 26 so long as the aperture 46 of the fastener holder 28 aligns with the bore 98 in the frame 80 when the wedge assembly 20 is coupled to the frame 80.

Figure 5:
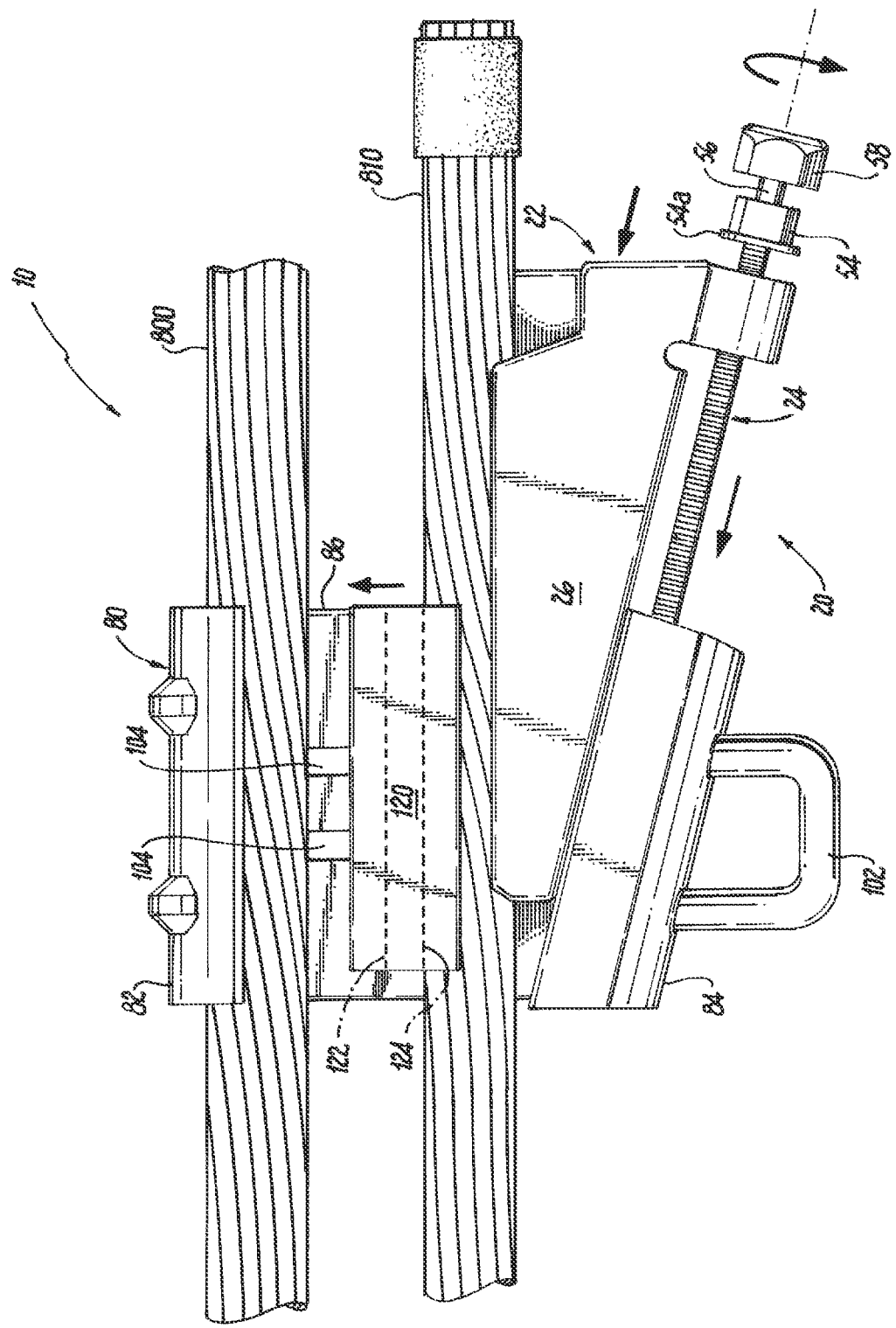
FIG. 5 is a front elevation view of the wedge type electrical cable connector assembly similar to FIG. 1, illustrating the main and tap conductors inserted into the cable connector assembly, and the wedge assembly pushing the tap conductor and conductor interface toward the main conductor.
Figure 6:
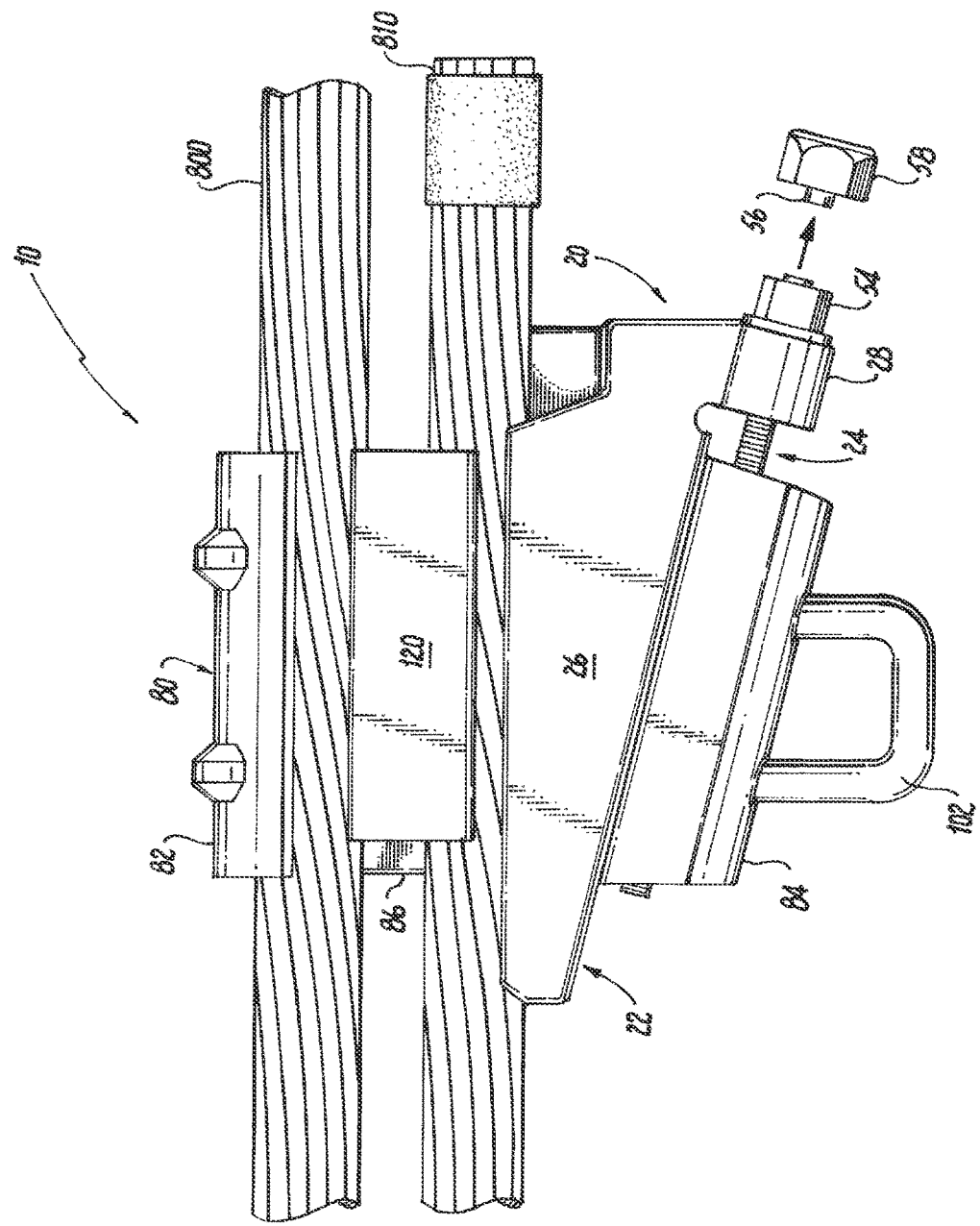
FIG. 6 is a front elevation view of the wedge type electrical cable connector assembly similar to FIG. 5, illustrating the main and tap conductors secured to the cable connector assembly and a shear fastener sheared from the wedge assembly after the main and tap conductors are secured to the cable connector assembly.

Referring to FIGS. 2, 5 and 6, the fastener 24 may be any fastener suitable to releasably secure the wedge assembly 20 to the frame 80 as described herein. In the exemplary embodiment shown, the fastener 24 is an elongated bolt having a head portion 50 followed by a threaded portion 52. The head portion 50 may be, for example, a breakaway head configuration where a portion of the head shears or breaks-away from the head portion 50. In other embodiments, the head portion 50 may be a conventional hexagonal bolt head configuration. The head portion 50 shown is a breakaway head configuration. Generally, the breakaway head 50 includes a head nut 54, a shear stud 56 and a cap nut 58. It is noted that the head nut 54 may include a washer 54a or the washer may be a separate member. The head nut 54 may be a hexagonal shaped nut that is used when removing the fastener 24 from the frame 80. The shear stud 56 extends between the head nut 54 and the cap nut 58. The shear stud 56 may be a circular structure that may have a tapered cross section, where the narrow portion of the taper is attached to the head nut 54 and the wide portion of the taper is attached to the cap nut 58. The shear stud 56 is configured and dimensioned to shear at or above a threshold torque so that the cap nut 58 shears or breaks away from the head portion 50. The diameters of the narrow portion and wide portion of the shear stud 56 are determined by the desired predetermined torque at which the shear stud 56 is to shear. For example, if the predetermined torque is to be in the range of about 145 inch-lbs. to about 160 inch-lbs., the diameter for the narrow portion of the shear stud 56 may be in the range from about 0.2 inches to about 0.3 inches, and the shear stud 56 tapers outward from the narrow portion at an angle ranging from 5 degrees to about 30 degrees. The cap nut 58 may be a hexagonal shaped nut that is used when clamping the main conductor 800 and the tap conductor 810 to the connector 10 as described herein and that shears or breaks away when tightened sufficient to clamp the main conductor 800 and tap conductor 810 to the connector 10. A more detailed description of a shear type head portion is described in commonly owned U.S. Pat. No. 10,465,732 which is incorporated herein in its entirety by reference.

Figure 3:
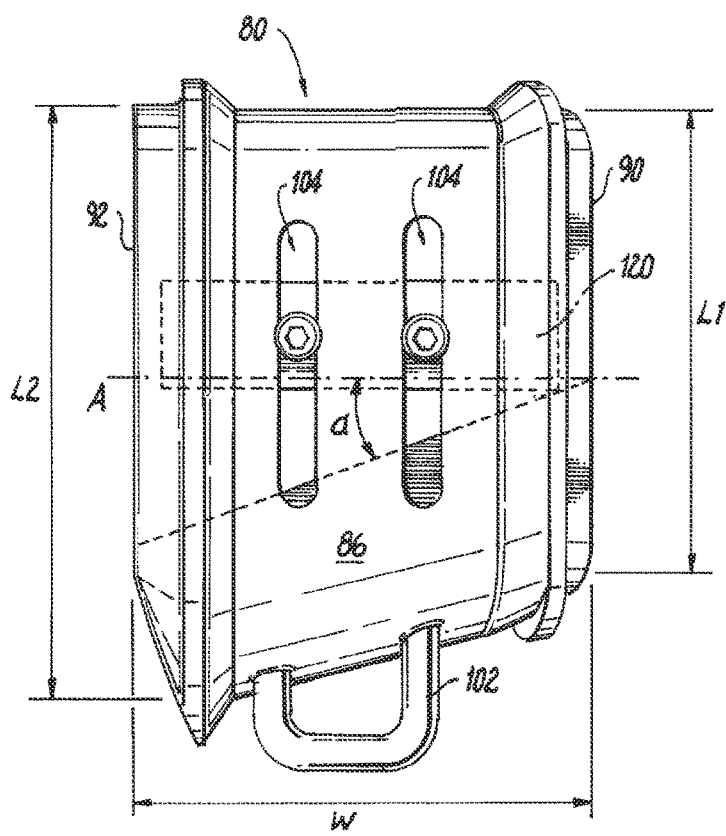
FIG. 3 is a rear side elevation view of the frame and conductor interface of the wedge type electrical cable connector assembly of FIG. 1, illustrating multiple slots in the frame and multiple flex connecting members mating the conductor interface to the frame.

Referring to FIGS. 2-4, in the exemplary embodiment shown, the frame 80 is a C-shaped like body or member. The frame 80 has a conductor contact wall 82, a wedge support wall 84, and a rear wall 86 between the conductor contact wall 82 and the wedge support wall 84. Between the conductor contact wall 82, the wedge support wall 84 and the rear wall 86 is a wedge receiving channel 88. The wedge receiving channel 88 at a first end 90 of the frame 80 has a length "L1" and the wedge receiving channel 88 at a second end 92 of the frame 80 has a length "L2." In the embodiment shown, the length "L1" is less than the length "L2" such that one or both of the conductor contact wall 82 and the wedge support wall 84 are tapered relative to a longitudinal axis "A" of the frame 80. In the embodiment shown, the wedge support wall 84 is at an angle "α" relative to a longitudinal axis "A" of the frame 80. The angle "α" may be in the range of about 5 degrees and about 25 degrees. In the embodiment shown, the conductor contact wall 82, the wedge support wall 84, the rear wall 86 and the wedge receiving channel 88 form the C-shaped like body or member. The frame 80 may also include a stop member 100, seen in FIG. 4, used to prevent longitudinal movement of the interface 120 along axis "A" when mated with the frame 80.

The conductor contact wall 82 has an inner surface 82a and an outer surface 82b. The inner surface 82a of the conductor contact wall 82 is shaped, e.g., arcuate shaped, to form a conductor groove that is configured and dimensioned to receive or fit at least partially around a main conductor 800. The wedge support wall 84 is configured and dimensioned to receive the fastener 24 and to provide a platform on which the bottom wall 36 of the wedge body 22 can slide along. In the exemplary embodiment shown, the wedge support wall 84 has an inner surface 84a and an outer surface 84b. The inner surface 84a of the wedge support wall 84 is shaped, e.g., a U-shape like structure, to form a channel 94 that is configured and dimensioned to receive the fastener 24. The wedge support wall 84 of the frame 80 includes a mounting member or tab 96. The mounting member 96 is a substantially solid member having an internally threaded bore 98 that passes through the mounting member. The threaded bore 98 is configured and dimensioned to receive the fastener 24. The mounting member 96 may be positioned at any point along the channel 94 of the wedge support wall 84. In the exemplary embodiment shown in FIG. 2, the mounting member 96 is positioned in close proximity to the second end 92 of the frame 80. The mounting member 96 may be integrally or monolithically formed into the wedge support wall 84 or the mounting member 96 may be secured to the wedge support wall 84 using welds, mechanical fasteners or adhesives. The wedge support wall 84 may also include an eyelet 102 used for connecting an extendable reach tool (not shown) to the connector 10.

The rear wall 86 of the frame 80 is a substantially flat wall having one or more elongated opening 104, e.g., slots, through which a connecting member 150 may pass to mate the interface 120 to the frame 80. In the exemplary embodiment of FIGS. 3 and 4 there are two elongated openings 104. In the exemplary embodiment of FIG. 7 there is a single elongated opening 104, and in the exemplary embodiment of FIG. 8 there is a single T-shaped opening 104 having a cross-leg 104a and a long leg 104b.

Referring again to FIGS. 2 and 4, the interface 120 is an elongated solid or hollow body having a predefined length "L3" and a width "W2." In the exemplary embodiment shown, the interface 120 has a length "L3" that is substantially the same as a width "W" of the frame 80. In the exemplary embodiment shown, the interface 120 is a rectangular body having first and second ends 120a and 120b, and first and second side walls 120c and 120d. A contact surface 122 is formed in an upper surface of the interface 120, and a contact surface 124 is formed in a lower surface of the interface. The contact surface 122 is configured and dimensioned to receive or fit at least partially around a main conductor 800. The contact surface 124 is configured and dimensioned to receive or fit at least partially around a tap conductor 810. As shown in FIG. 1, when the wedge body 26 is positioned within the frame 80 and the interface 120 is positioned between a main conductor 800 and a tap conductor 810, the contact surface 122 contacts a lower surface of the main conductor 800 and the contact surface 124 contacts an upper surface of the tap conductor 810. It is noted that the main conductor 800 and tap conductor 810, shown in FIG. 1, have substantially the same outer diameter. Accordingly, the contact surface 122 and 124 formed in the upper and lower surfaces of the interface 120 have substantially the same configuration. However, in some instances it may be desirable to connect a tap conductor 810 having a smaller outer diameter to a main conductor 800 having a larger outer diameter. In such situations, the contact surface 122 would be configured to engage the larger outer diameter main conductor 800 and the contact surface 124 would be configured to engage the smaller outer diameter tap conductor 810.

Either the first side wall 120c or the second side wall 120d of the interface 120 includes one or more mounting elements 126, e.g., apertures, configured and dimensioned to interact with the connecting members 150. In the exemplary embodiment of FIGS. 3 and 4 there are two apertures 126 as mounting elements. In the exemplary embodiment of FIGS. 7 and 8 there is a single aperture 126 as a mounting element. The connecting members 150 are provided to be mounted or attached to the interface 120 and to mate the interface 120 to the frame 80 so that the interface 120 can flex and move when installing the main conductor 800 and the tap conductor 810 into the connector 10. In the exemplary embodiment shown in FIGS. 1-7, each connecting member 150 is a set-screw 152 that is passed through one of the elongated openings 104 in the rear wall 86 of the frame 80 into engagement with an aperture 126 in the interface 120 to mate the interface 120 to the frame 80. The set screws 152 are not fully tightened which allows the interface 120 to flex and move axially and linearly relative to the frame 80 when installing the main conductor 800 and the tap conductor 810 into the connector 10. In the exemplary embodiment shown in FIG. 8, the connecting member 150 is a T-shaped set-screw 154 that can be inserted into the aperture 126 in the interface 120 prior to installing the interface 120. The cross-leg of the T-shaped set screw is then passed through the cross-leg 104a of the T-shaped opening 104 so that the set screw 154 can then slide along the long-leg 104b in the rear wall 86 of the frame 80 to mate the interface 120 to the frame 80. The T-shaped set screw 154 is not fully tightened which allows the interface 120 to flex and move axially and linearly relative to the frame 80 when installing the main conductor 800 and the tap conductor 810 into the connector 10.

Referring now to FIGS. 5 and 6, the electrical connector 10 can be installed in the following exemplary manner. The connector 10 is first assembled where the interface 120 is mated to the frame 80 using the connecting members 150 of FIGS. 3 and 4, and the wedge 22 is attached to the frame 80 using the fastener 24 of the wedge assembly 20. The wedge 22 is attached to the frame 80 so that wedge 22 is substantially withdrawn from a center of the frame 80, as shown in FIG. 5. At this point, the interface 120 is in close proximity to the wedge assembly 20. The connector 10 is then suspended from a main conductor 800 by placing the inner surface 82a, seen in FIG. 8, of the conductor contact wall 82 onto the main conductor 800. When placing the inner surface 82a of the conductor contact wall 82 onto the main conductor 800, the interface 120 may need to move axially and/or linearly, e.g., flex, relative to the frame 80 so that the interface 120 is not obstructing the placement of the inner surface 82a onto the main conductor 800. A tap conductor 810 is then passed, e.g., slid, between the contact surface 124 in the interface 120 and the contact surface 44 of the wedge body 26. As the tap conductor 810 is passed between the contact surface 124 in the interface 120 and the contact surface 44, seen in FIG. 2, of the wedge body 26, the interface 120 slides within the frame 80 toward the conductor contact wall 82. As noted above, the stop 100 on the frame 80, seen in FIG. 4, may be provided to prevent the interface 120 from rotating as the interface 120 slides within the frame 80 toward the conductor contact wall 82. With the conductors 800 and 810 positioned within the connector 10, the fastener 24 is rotated, e.g., tightened, so that wedge 22 moves toward and into the interior of the frame 80 causing the contact surface 44 of the wedge body 26 to engage the bottom surface of the tap conductor 810. As the wedge 22 is further moved into the interior of the frame 80, the wedge body 26 pushes the tap conductor 810 into engagement with the contact surface 124 of the interface 120. Continued movement of the wedge 22 into the interior of the frame 80 causes the interface 120 to move upwardly causing the contact surface 122 of the interface 120 into contact with the main conductor 800. Continued tightening of the fastener 24 forces the main conductor 800 against the inner surface 82a of the conductor contact wall 82 of the frame 80. The fastener 24 is tightened until a stable, electrically conductive path is established between the main conductor 800 and the tap conductor 810. In embodiments where the fastener 24 is a shear fastener, the cap nut 58 shears off when sufficient force has been applied by the wedge 22 against the tap conductor 810, the interface 120, the main conductor 800 and frame 80, as described above. While the above installation embodiment describes the connector 10 being suspended from the main conductor 800 first and then the tap conductor 810 being installed, the present disclosure also contemplates the tap conductor 810 being installed first and then suspending the connector 10 and the tap conductor 810 from the main conductor 800.

Referring now to FIGS. 9-18, another exemplary embodiment of a connector according to the present disclosure is shown and used to electrically and mechanically connect a main conductor 800 to a tap conductor 810. The connector 200 includes a wedge assembly 220, a frame 280, an interface 320 and one or more connecting members 350. The wedge assembly 220 is operatively coupled to or interconnected with the frame 280 so that the wedge assembly 220 can slide or glide along the frame 280 to clamp a main conductor 800 to a tap conductor 810 so that the main conductor 800 and tap conductor 810 are electrically and mechanically connected, as will be described below. The wedge assembly 220, frame 280 and interface 320 are made of an electrically conductive material that has sufficient rigidity to withstand the forces applied by the wedge assembly 220 against the frame 280 when mechanically connecting the main conductor 800 to a tap conductor 810. Non-limiting examples of such electrically conductive and rigid materials include aluminum, aluminum alloys, stainless steel, galvanized steel, copper and copper/brass alloys. The one or more connecting members 350 may also be made of an electrically conductive material or a non-conductive material. Non-limiting examples of such electrically conductive materials include aluminum, aluminum alloys, stainless steel, galvanized steel, copper and copper/brass alloys described above. Non-limiting examples of such non-conductive materials include plastic materials and elastomeric materials. For example, the one or more connecting members 350 may be made of Ethylene Propylene Diene Monomer (EPDM), Thermoplastic Elastomer (Rubber TPE) or Silicone.

Referring to FIGS. 9, 10 and FIGS. 14-16, in the exemplary embodiment shown, the wedge assembly 220 includes a wedge 222 and a fastener 224. The wedge 222 includes a body 226 and a fastener holder 228. The body 226 has a front wall 230, a rear wall 232, a top wall 234, a bottom wall 236 and side walls 238 and 240. The wedge body 226 is shaped to fit within the frame 280. At least a portion of the top wall 234 includes a contact surface 244, and at least a portion 236a of the bottom wall 236 is flat and a portion 236b of the bottom wall 236 extends from the flat portion 236a forming a rail. In the embodiment shown, the bottom wall 236 includes two flat portions 236a provided to glide along the upper surfaces 284a and 284b of the frame 280, and the rail portion 236b of the bottom wall 236 is received within a channel 294, seen in FIG. 12, of the frame 280. The contact surface 244 may be an arcuate surface in the form of an elongated recess or groove as shown. The contact surface 244 is preferably configured to contact a tap conductor 810 positioned in the frame 280. The fastener holder 228 extends from the body 226 and includes an aperture 246 configured and dimensioned to receive the fastener 224 such that the fastener 224 can rotate relative to the aperture 246. Preferably, the fastener holder 228 is positioned at or in proximity to the rear wall 232 of the body 226 and extends away from the side wall 240 so that the aperture 246 of the fastener holder 228 is aligned with a bore 298 in the frame 280, seen in FIG. 12, when the wedge assembly 220 is coupled to the frame 280. However, the present disclosure contemplates that the fastener holder 228 can be positioned at any location on the body 226 so long as the aperture 246 of the fastener holder 228 aligns with the bore 298 in the frame 280 when the wedge assembly 220 is coupled to the frame 280.

Figure 10:
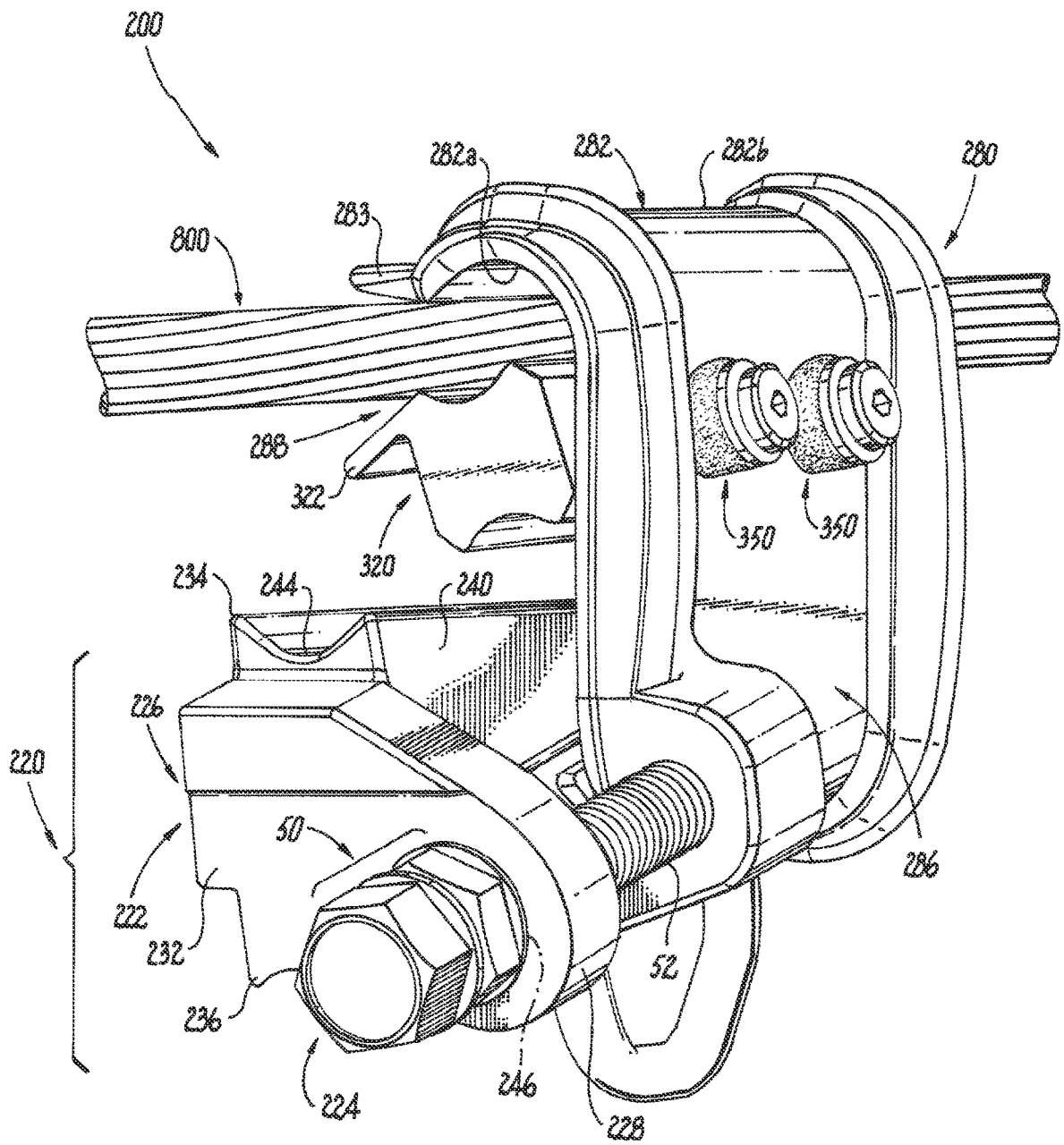
FIG. 10 is a second end perspective view of the wedge type electrical cable connector assembly of FIG. 9.
Figure 11:
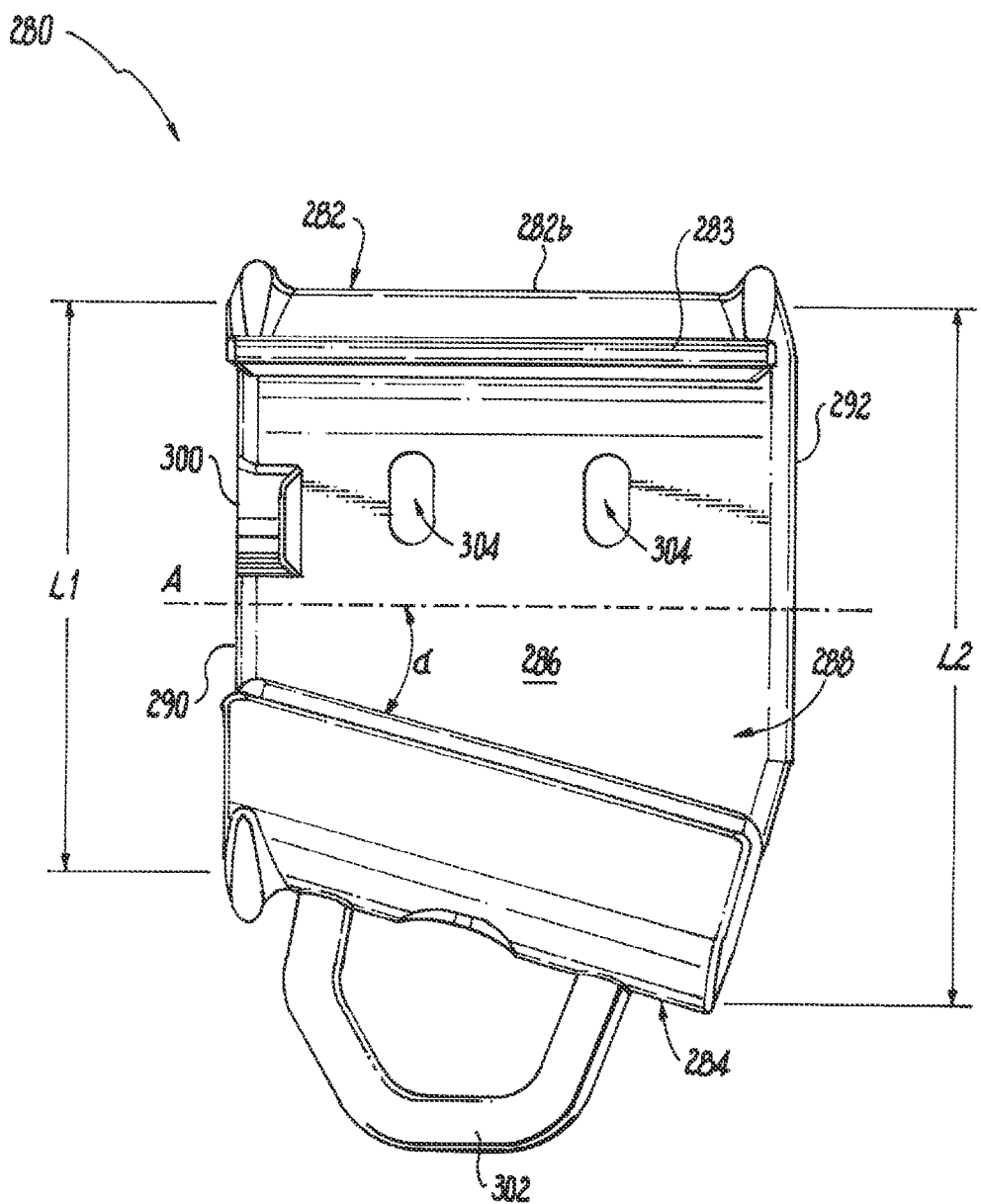
FIG. 11 is a front elevation view of the frame of the wedge type electrical cable connector assembly of FIG. 9, illustrating multiple slots in the frame.

Continuing to refer to FIG. 10, the fastener 224 may be any fastener suitable to releasably secure the wedge assembly 220 to the frame 280 as described herein. In the exemplary embodiment shown, the fastener 224 is the same as the fastener 24 described above such that like numerals will be used. Generally, the fastener 224 is an elongated bolt having a head portion 50 followed by a threaded portion 52. The head portion 50 may be, for example, a breakaway head configuration where a portion of the head shears or breaksaway from the head portion 50. In other embodiments, the head portion 50 may be a conventional hexagonal bolt head configuration. The head portion 50 shown is a breakaway head configuration described above. A more detailed description of a shear type head portion is described in commonly owned U.S. Pat. No. 10,465,732 which is incorporated herein in its entirety by reference.

Referring now to FIGS. 9-12, in the exemplary embodiment shown, the frame 280 is a C-shaped like body or member. The frame 280 has a conductor contact wall 282, a wedge support wall 284, and a rear wall 286 between the conductor contact wall 282 and the wedge support wall 284. Between the conductor contact wall 282, the wedge support wall 284 and the rear wall 286 is a wedge receiving channel 288. The wedge receiving channel 288 at a first end 290 of the frame 280 has a length "L1" and the wedge receiving channel 288 at a second end 292 of the frame 280 has a length "L2." In the embodiment shown, the length "L1" is less than the length "L2" such that one or both of the conductor contact wall 282 and the wedge support wall 284 are tapered relative to a longitudinal axis "A" of the frame 280. In the embodiment shown, the wedge support wall 284 is at an angle "α" relative to a longitudinal axis "A" of the frame 280. The angle "α" may be in the range of about 5 degrees to about 25 degrees. In the embodiment shown, the conductor contact wall 282, the wedge support wall 284, the rear wall 286 and the wedge receiving channel 288 form the C-shaped like body or member. The frame 280 may also include a stop member 300, seen in FIG. 11, used to prevent longitudinal movement of the interface 320 along axis "A" when mated with the frame 280. The stop member 300 may also limit and possibly prevent rotation of the interface 320 when tightening the fastener 224 to secure the main conductor 800 and the tap conductor 810 to the frame 280.

Figure 17:
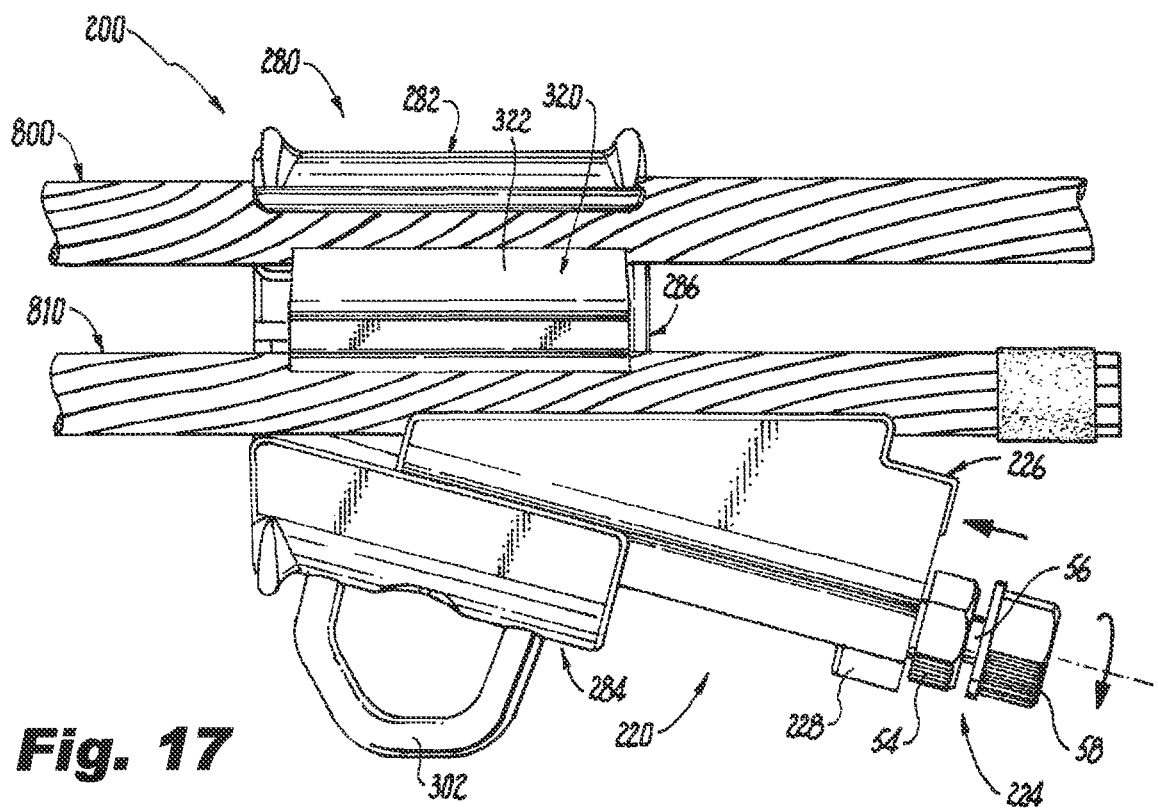
FIG. 17 is a front elevation view of the frame and conductor interface of FIG. 16, illustrating a main conductor secured to the cable connector assembly, and the wedge assembly positioned to receive a tap conductor.
Figure 18:
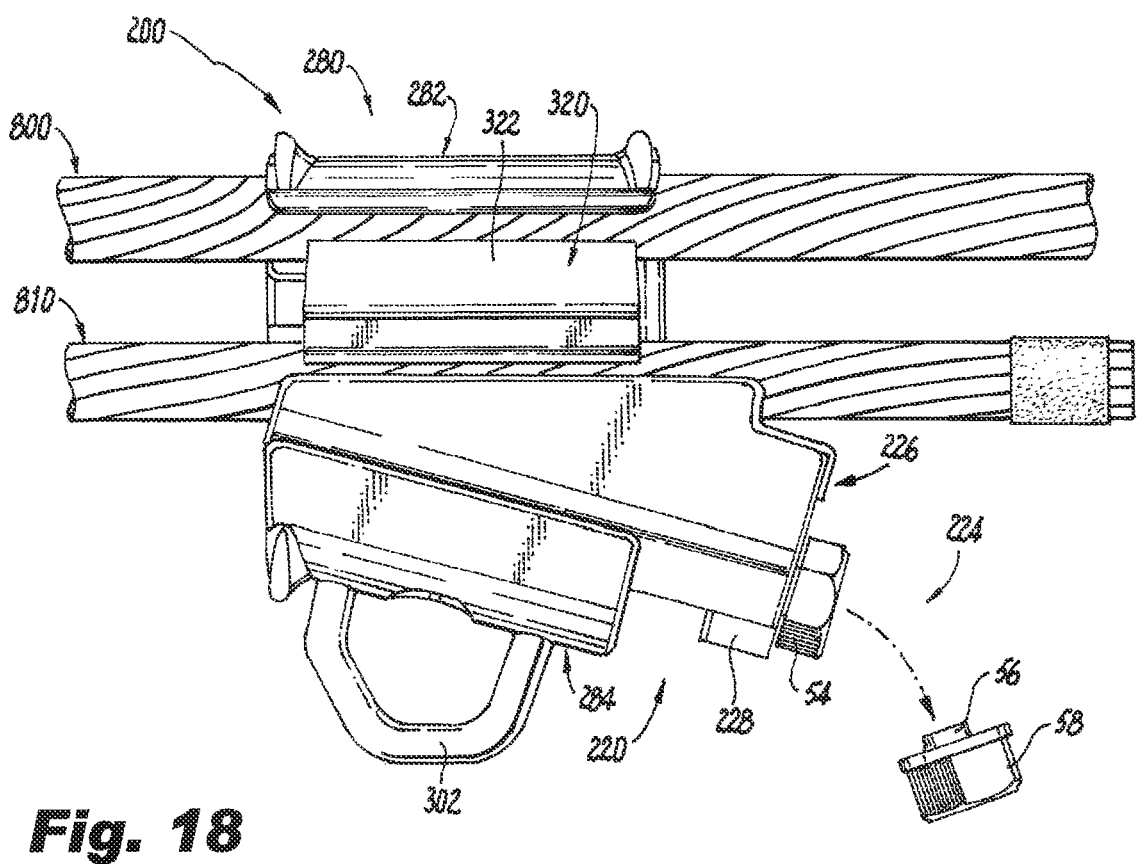
FIG. 18 is a front elevation view of the frame and conductor interface of FIG. 17, illustrating the main conductor secured to the cable connector assembly and the tap conductor secured to the cable connector assembly.

The conductor contact wall 282 has an inner surface 282a, an outer surface 282b and a lead-in 283. The inner surface 282a of the conductor contact wall 282 is shaped, e.g., arcuate shaped, to form a conductor groove that is configured and dimensioned to receive or fit at least partially around a main conductor 800. The lead-ins 283 and 322 help to guide the main conductor 800 toward and into the conductor contact wall 282 as described above. The wedge support wall 284 includes one or more upper surfaces 284a and 284b and the channel 294. In the embodiment shown, the wedge support wall 284 includes two upper surfaces 284a and 284b. The upper surfaces 284a and 284b are configured and dimensioned to interact with the flat portions 236a of the bottom wall 236 of the wedge body 226 so that the wedge body 226 can glide along the upper surfaces 284a and 284b when the wedge body 226 moves between the loading position and the clamping position. It is noted that in the loading position a center of the wedge body 226 is away from a center of the frame 280 sufficient so that the main conductor 800 and the tap conductor 810 can be installed in the frame, as shown in FIG. 17. In the clamping position a center of the wedge body 226 is close to a center of the frame 280 sufficient so that the main conductor 800 and the tap conductor 810 are electrically and mechanically connected, as shown in FIG. 18.

In the exemplary embodiment shown, the wedge support wall 284 also has an inner surface 284c and an outer surface 284d, seen in FIG. 12. The inner surface 284c of the wedge support wall 284 is shaped, e.g., a U-shaped like structure, to form the channel 294 that is configured and dimensioned to receive the fastener 224. The wedge support wall 284 of the frame 280 includes a mounting member or tab 296 extending from the wedge support wall 284 and/or the rear wall 286, as shown. The mounting member 296 is a substantially solid member having an internally threaded bore 298 that passes through the mounting member 296. The threaded bore 298 is configured and dimensioned to receive the fastener 224. The mounting member 296 may be positioned at any point along the channel 294 of the wedge support wall 284. In the exemplary embodiment shown in FIG. 12, the mounting member 296 is positioned in close proximity to the second end 292 of the frame 280. The mounting member 296 may be integrally or monolithically formed into the wedge support wall 284 and/or the rear wall 286, or the mounting member 296 may be secured to the wedge support wall 284 and/or the rear wall 286 using welds, mechanical fasteners or adhesives. The wedge support wall 284 may also include an eyelet 302 used for connecting an extendable reach tool (not shown) to the connector 200.

The rear wall 286 of the frame is a substantially flat wall having one or more openings 304, e.g., slots, through which the connecting member 350 may pass to mate the interface 320 to the frame 280. In the exemplary embodiment of FIG. 11 there are two openings 304. But, as described above, there may be a single opening, or other opening, such as the T-shaped opening described above.

An exemplary embodiment of the interface 320 is shown in FIGS. 12 and 13. The interface 320 is an elongated solid or hollow body having a predefined length "L3" and a width "W2." In the exemplary embodiment shown, the interface 120 has a length "L3" that is substantially the same as a width "W" of the frame 280. In the exemplary embodiment shown, the interface 320 is a rectangular body having first and second ends 320a and 320b, and first and second side walls 320c and 320d. A lead-in 322 may extend from either the first side wall 320c or the second side wall 320d. A contact surface 324 is formed in an upper surface of the interface 320, and a contact surface 326 is formed in a lower surface of the interface 320. The contact surface 324 is configured and dimensioned to receive or fit at least partially around a main conductor 800. The contact surface 326 is configured and dimensioned to receive or fit at least partially around a tap conductor 810. As shown in FIGS. 13 and 17, when the wedge assembly 220 is coupled to the frame 280 and the interface 320 is positioned between a main conductor 800 and a tap conductor 810, the contact surface 324 contacts a lower surface of the main conductor 800 and the contact surface 326 contacts an upper surface of the tap conductor 810. It is noted that the main conductor 800 and tap conductor 810, shown in FIG. 17, have substantially the same outer diameter. Accordingly, the contact surface 324 and 326 formed in the upper and lower surfaces of the interface 320 have substantially the same configuration. However, in some instances it may be desirable to connect a tap conductor having a smaller outer diameter to a main conductor having a larger outer diameter. In such situations, the contact surface 324 would be configured to engage the larger outer diameter main conductor 800 and the contact surface 326 would be configured to engage the smaller outer diameter tap conductor 810.

Either the first side wall 320c or the second side wall 320d of the interface 320 includes one or more mounting elements 328, e.g., apertures, configured and dimensioned to interact with the connecting members 350. In the exemplary embodiment of FIG. 13 there are two apertures 328 as the mounting elements. However, as described above there may be instances where a single aperture 328 as a mounting element may be desired. As shown in FIGS. 12 and 13, the connecting members 350 are provided to be mounted or attached to the interface 320 and to mate the interface 320 to the frame 20 so that the interface 320 can flex and move when installing the main conductor 800 and the tap conductor 810 into the connector 200. In the exemplary embodiment shown in FIG. 13, there are two connecting members 350 used. Each connecting member 350 includes a set-screw 352 and an elastomeric bushing 354 positioned on the set screw 352. The free end of the set screw 352 is passed through one of the openings 304, seen in FIG. 11, in the rear wall 286 of the frame 280, seen in FIG. 12, into engagement with an aperture 326 in the interface 320 to mate the interface 320 to the frame 280.

Figure 16:
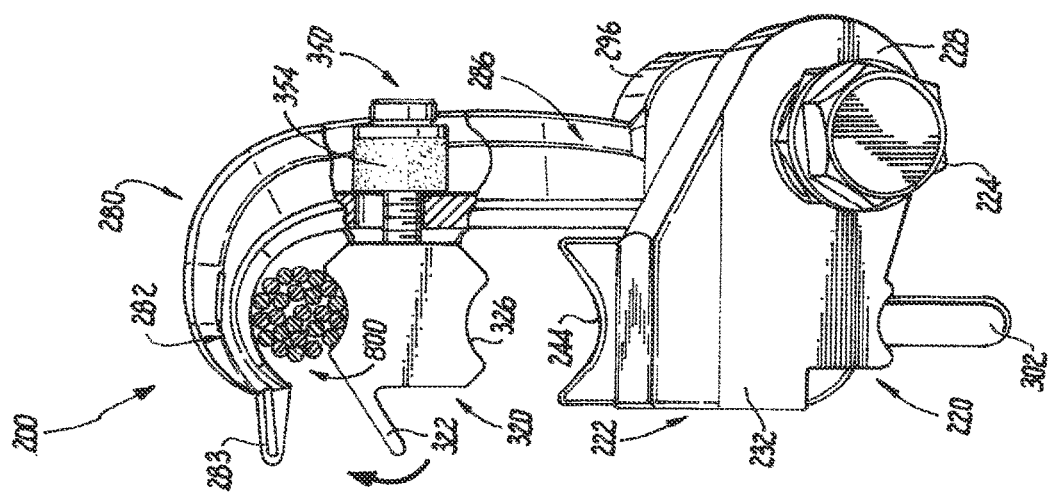
FIG. 16 is the second end elevation view of the wedge type electrical cable connector assembly of FIG. 15, illustrating the main conductor contacting the conductor contact wall and the conductor interface of the cable connector assembly.
Figure 15:
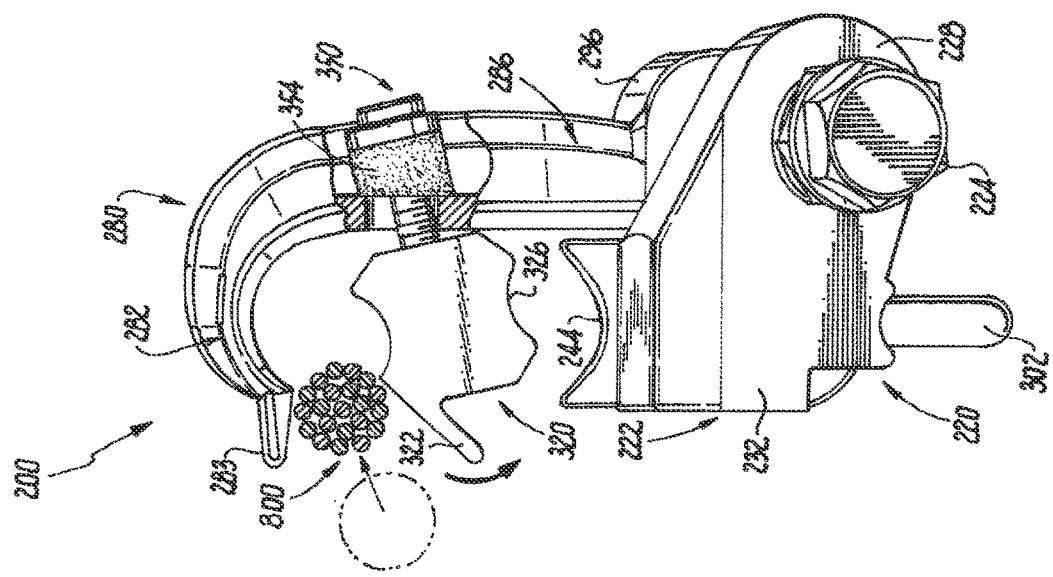
FIG. 15 is the second end elevation view of the wedge type electrical cable connector assembly of FIG. 14, illustrating the main conductor being inserted into the cable connector assembly with the conductor interface flexing to permit the main conductor to pass into contact with a conductor contact wall of the cable connector assembly.
Figure 14:
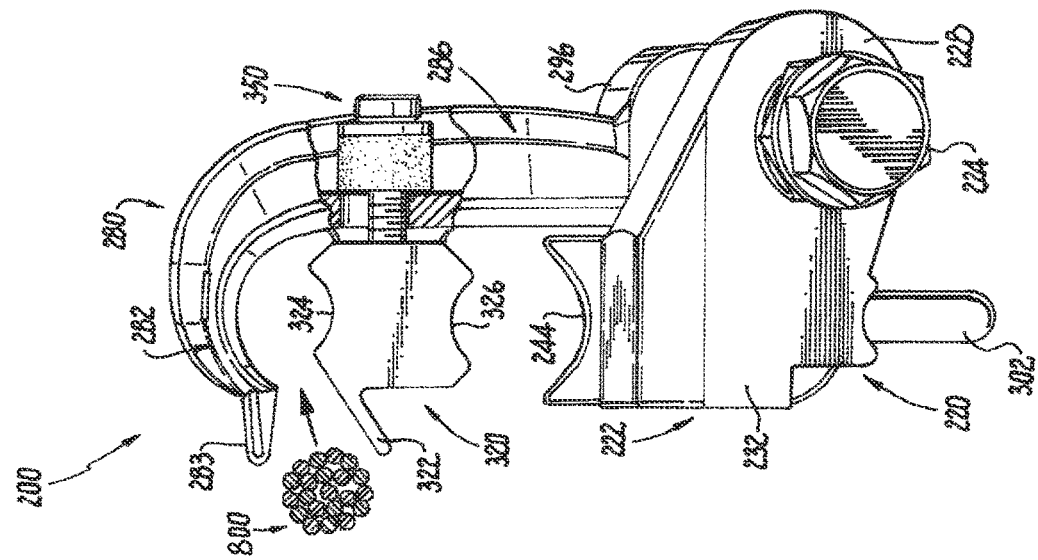
FIG. 14 is the second end elevation view of the wedge type electrical cable connector assembly of FIG. 10, illustrating a main conductor positioned for insertion into the cable connector assembly.

As shown in FIGS. 14-16, in this configuration, the set screws 352 can be tightened and the bushings 354 allow the interface 320 to flex and move axially relative to the frame 280 when installing the main conductor 800 and the tap conductor 810 into the connector 200. More specifically, the bushing 354 provides a snap operation when installing a main conductor 800 into the connector 200. The main conductor 800 is initially positioned in close proximity to the lead-in 283 of the frame 280 and the lead-in 322 of the interface 320, seen in FIG. 14, using for example an extendable reach tool (not shown). The main conductor 800 is then guided toward the conductor contact wall 282 by the lead-in 283 of the frame 280 and the lead-in 322 of the interface 320 where the force applied by the main conductor 800 causes the interface lead-in 322 to radially flex toward the wedge body 226 compressing a portion of the bushing 354 and extending another portion of the bushing 354, as seen in FIG. 15. When the main conductor passes the lead-ins 283 and 322, the force compressing the bushing 354 is removed causing the interface 320 to snap back to its normal position as seen in FIG. 16 with the main conductor 800 positioned between the conductor contact wall 282 and the interface 320.

Referring now to FIGS. 17 and 18, the electrical connector 200 can be installed in the following exemplary manner. The connector 200 is first assembled where the interface 320 is mated to the frame 280 using the connecting members 350 of FIGS. 12 and 13, and the wedge 222 is attached to the frame 280 using the fastener 224 of the wedge assembly 220. The wedge 222 is attached to the frame 280 so that wedge 222 is substantially withdrawn from a center of the frame 280, as shown in FIG. 17. At this point, the interface 320 is in close proximity to the wedge assembly 220. The connector 200 is then suspended from a main conductor 800 by placing the inner surface 282a of the conductor contact wall 282 onto the main conductor 800 as described above with reference to FIGS. 14-16. As described, when placing the inner surface 282a of the conductor contact wall 282 onto the main conductor 800, the interface 320 may need to move axially and/or linearly, e.g., flex, relative to the frame 280 so that the interface 320 is not obstructing the placement of the inner surface 282a onto the main conductor 800. A tap conductor 810 is then passed, e.g., slid, between the contact surface 326, as seen in FIGS. 14-16, in the interface 320 and the contact surface 244 of the wedge body 226. As the tap conductor 810 is passed between the contact surface 326 in the interface 320 and the contact surface 244 of the wedge body 226, the interface 320 slides within the frame 280 toward the conductor contact wall 282. As noted above, the stop 300 on the frame 280, seen in FIG. 11, may be provided to prevent the interface 320 from rotating as the interface 320 slides within the frame 280 toward the conductor contact wall 282. With the conductors 800 and 810 positioned within the connector 200, the fastener 224 is rotated, e.g., tightened, so that wedge 222 moves toward and into the interior of the frame 280 causing the contact surface 244 of the wedge body 226 to engage the bottom surface of the tap conductor 810. As the wedge 222 is further moved into the interior of the frame 280, the wedge body 226 pushes the tap conductor 810 into engagement with the contact surface 326 of the interface 320. Continued movement of the wedge 222 into the interior of the frame 280 causes the interface 320 to move upwardly causing the contact surface 324 of the interface 320 into contact with the main conductor 800. Continued tightening of the fastener 224 forces the main conductor 800 against the inner surface 282a of the conductor contact wall 282 of the frame 280. The fastener 224 is tightened until a stable, electrically conductive path is established between the main conductor 800 and the tap conductor 810. In embodiments where the fastener 224 is a shear fastener, the cap nut 58 shears off when sufficient force has been applied by the wedge 222 against the tap conductor 810, the interface 320, the main conductor 800 and frame 280, as described above. While the above installation embodiment describes the connector 200 being suspended from the main conductor 800 first and then the tap conductor 810 being installed, the present disclosure also contemplates the tap conductor 810 being installed first and the suspending the connector 200 and the tap conductor 810 from the main conductor 800.

Referring now to FIGS. 19-43, another exemplary embodiment of a connector according to the present disclosure is shown and used to electrically and mechanically connect a main conductor 800 to a tap conductor 810. The connector 400 includes a wedge assembly 420, a frame 480, an interface 520 and one or more connecting members 550. The wedge assembly 420 is operatively coupled to or interconnected with the frame 480 so that the wedge assembly 420 can slide or glide along the frame 480 to wedge or secure a main conductor 800 to a tap conductor 810 so that the main conductor 800 and tap conductor 810 are electrically and mechanically connected, as will be described below. The wedge assembly 420, frame 480 and interface 520 are made of an electrically conductive material that has sufficient rigidity to withstand the forces applied by the wedge assembly 420 against the frame 480 when mechanically connecting the main conductor 800 to a tap conductor 810. Non-limiting examples of such electrically conductive and rigid materials include aluminum, aluminum alloys, stainless steel, galvanized steel, copper and copper/brass alloys. The one or more connecting members 550 may also be made of an electrically conductive material or a non-conductive material. Non-limiting examples of such electrically conductive materials include the aluminum, aluminum alloys, stainless steel, galvanized steel, copper and copper/brass alloys described above. Non-limiting examples of such non-conductive materials include plastic materials and elastomeric materials. For example, the one or more connecting members 550 may be made of Ethylene Propylene Diene Monomer (EPDM), Thermoplastic Elastomer (Rubber TPE) or Silicone.

Referring to FIGS. 19-21, 31 and 32, in the exemplary embodiment shown, the wedge assembly 420 includes a wedge 422 and a fastener 424. The wedge 422 includes a body 426 and a fastener holder 428. The body 426 has a front wall 430, a rear wall 432, a top wall 434, a bottom wall 436 and side walls 438 and 440. The wedge body 426 is shaped to fit within the frame 480. At least a portion of the top wall 434 includes a contact surface 444, and at least a portion 436a of the bottom wall 436 is flat and a portion 436b of the bottom wall 436 extends from the flat portion 436a forming a rail. In the embodiment shown, the bottom wall 436 includes two flat portions 436a provided to glide along the upper surfaces 484a and 484b of the frame 480, and the rail portion 436b of the bottom wall 436 is received within a channel 494 of the frame 480, seen in FIG. 23. The contact surface 444 may be an arcuate surface in the form of an elongated recess or groove as shown. The contact surface 444 is preferably configured to contact a tap conductor 810 positioned in the frame 480. The fastener holder 428 extends from the body 426 and includes an aperture 446 configured and dimensioned to receive the fastener 424 such that the fastener 424 can rotate relative to the aperture 446. Preferably, the fastener holder 428 is positioned at or in proximity to the rear wall 432 of the body 426 and extends away from the side wall 440 so that the aperture 446 of the fastener holder 428 is aligned with a bore 498, seen in FIG. 19, in the frame 480 when the wedge assembly 420 is coupled to the frame 480. However, the present disclosure contemplates that the fastener holder 428 can be positioned at any location on the body 426 so long as the aperture 446 of the fastener holder 428 aligns with the bore 498 in the frame 480, seen in FIG. 24, when the wedge assembly 420 is coupled to the frame 480.

Figure 19:
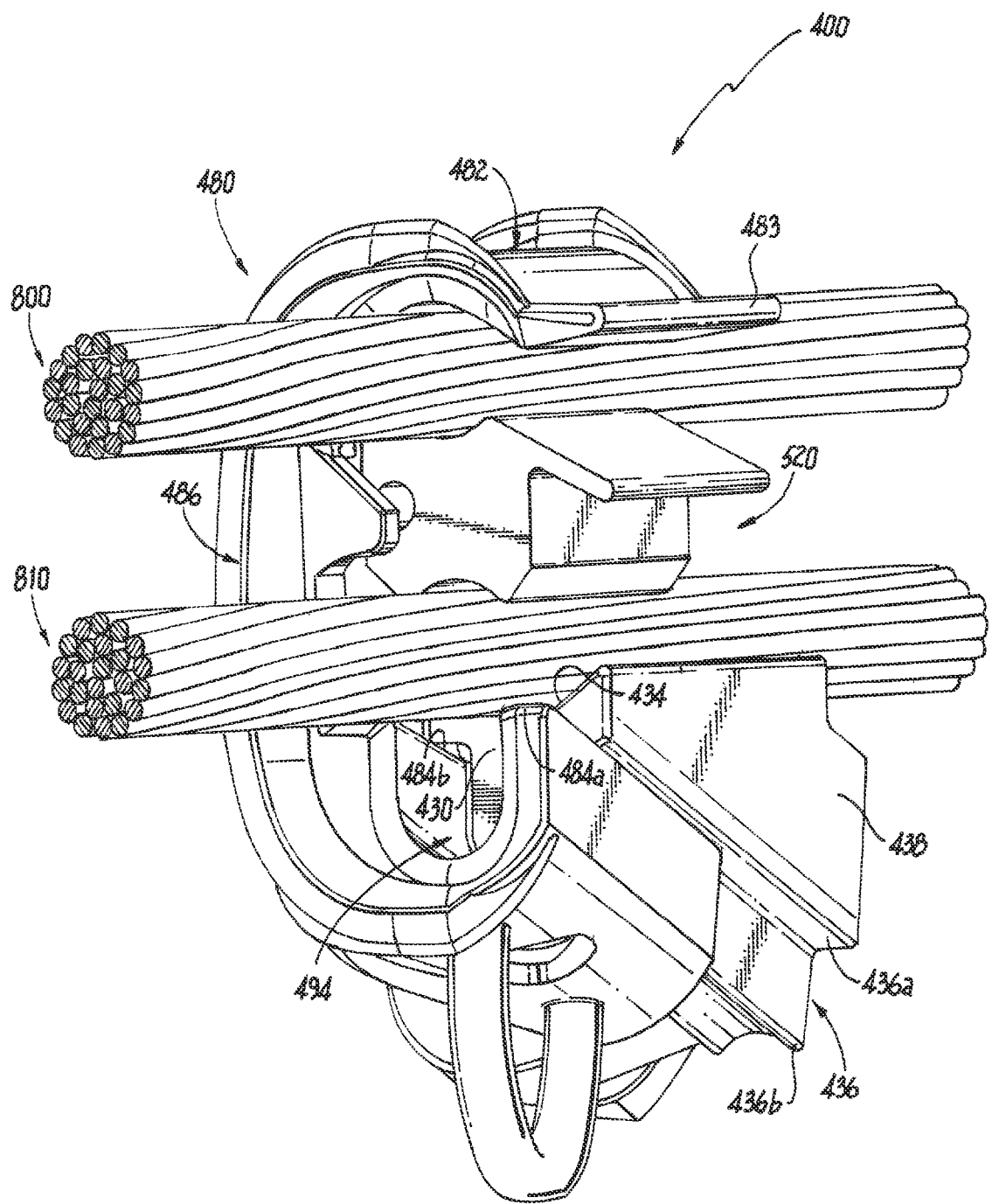
FIG. 19 is a first end perspective view of another exemplary embodiment of a wedge type electrical cable connector assembly according to the present disclosure, illustrating a frame, a wedge assembly and a conductor interface of the cable connector assembly, a main conductor and tap conductor secured to the cable connector assembly.
Figure 20:
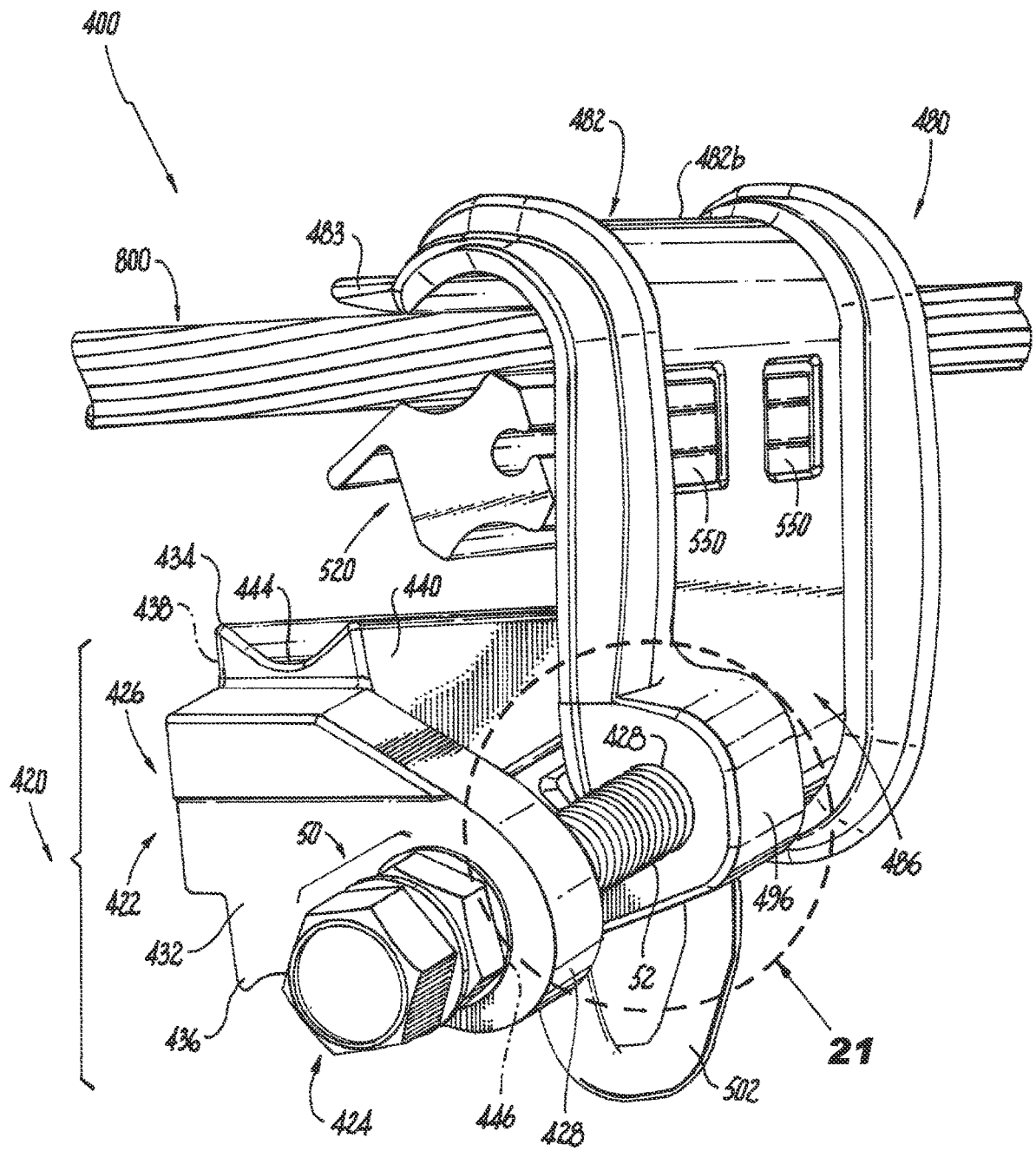
FIG. 20 is a second end perspective view of the wedge type electrical cable connector assembly of FIG. 19, illustrating a frame, a wedge assembly and a conductor interface of the cable connector assembly, with the conductor interface flexing to permit a main conductor to be secured to the cable connector assembly.
Figure 22:
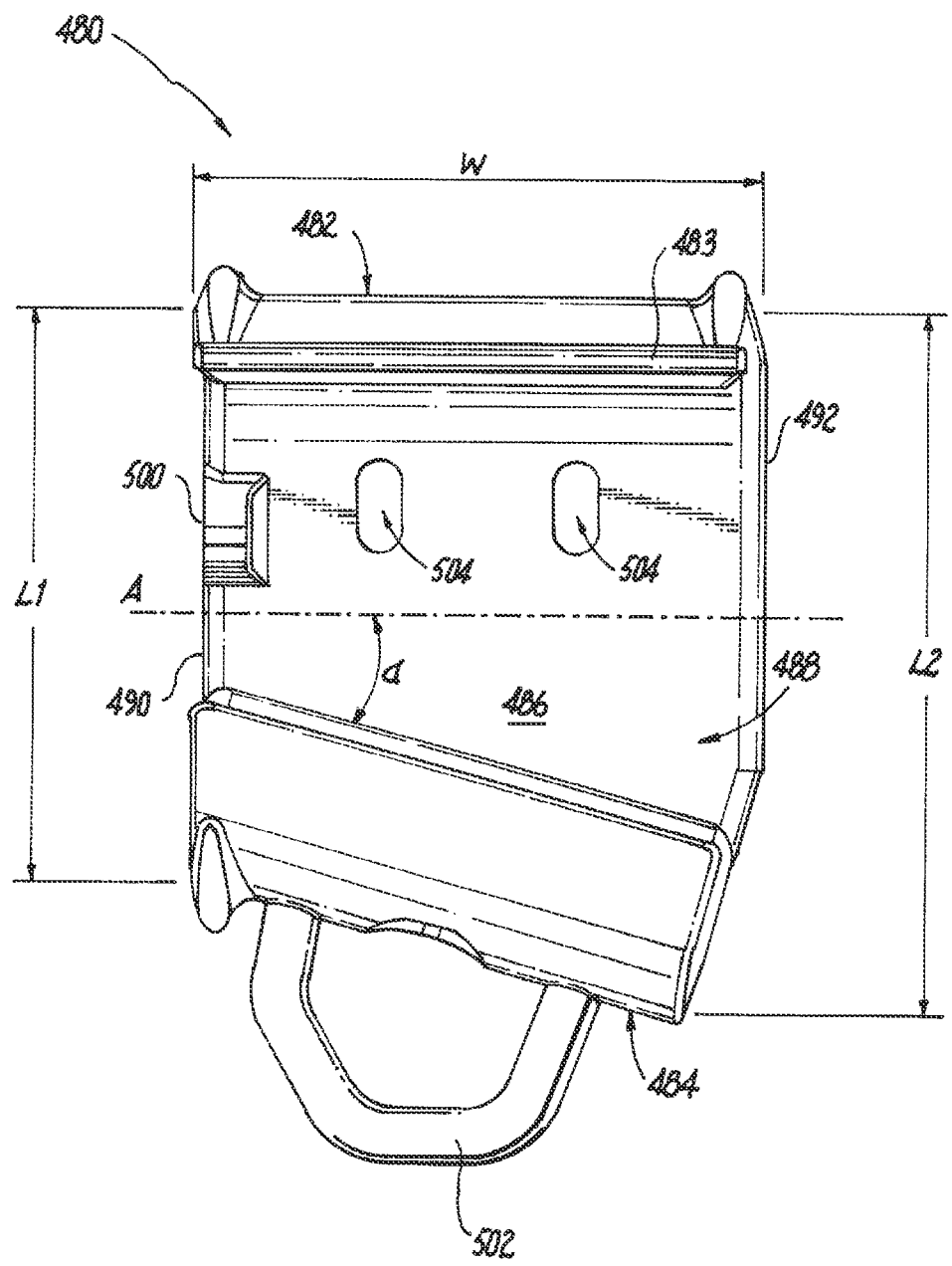
FIG. 22 is a front elevation view of the frame of the wedge type electrical cable connector assembly of FIG. 19, illustrating multiple slots in the frame.

Continuing to refer to FIGS. 19 and 20, the fastener 424 may be any fastener suitable to releasably secure the wedge assembly 420 to the frame 480 as described herein. In the exemplary embodiment shown, the fastener 424 is the same as the fastener 24 described above such that like numerals will be used. Generally, the fastener 424 is an elongated bolt having a head portion 50 followed by a threaded portion 52. The head portion 50 may be, for example, a breakaway head configuration where a portion of the head shears or breaksaway from the head portion 50. In other embodiments, the head portion 50 may be a conventional hexagonal bolt head configuration. The head portion 50 shown is a breakaway head configuration described above. A more detailed description of a shear type head portion is described in commonly owned U.S. Pat. No. 10,465,732 which is incorporated herein in its entirety by reference.

Referring to FIGS. 20-23, an exemplary embodiment of the fastener 424 attached to the wedge 422 is shown. In the exemplary embodiment shown, the threaded portion 52 of the fastener 424 includes a shoulder 53 that is configured and dimensioned to fit within the aperture 446 of the fastener holder 428 of the wedge 422 and threading 55. Preferably, the shoulder 53 has a smooth outer surface so that when the shoulder 53 is within the aperture 446, the shoulder 53 can freely rotate relative to the fastener holder 428, which permits the fastener 424 to freely rotate. Between the shoulder 53 and the threading 55 is a retaining groove 57 that receives the retaining ring 448 used to at least partially attach the fastener 424 to the wedge 422 of the wedge assembly 420. The threading 55 on the outer surface of the threaded portion 52 of the fastener 424 is complementary to the threading 499 of the threaded bore 498 in the mounting member 496 of the frame 480, which acts as a nut. The threading 55 of the threaded portion 52 may be single-lead threading or multi-lead threading, e.g., double-lead, triple-lead or quadruple-lead threading. In the exemplary embodiment shown in FIGS. 22 and 23, the threading 55 is triple-lead threading. With triple-lead threading there are three independent and continuous helixes "T1", "T2" and "T3" that have different starting points and that are wrapped around the threaded portion 52 of the fastener 424 forming the threads. It is noted that the three helixes may also be referred to as ridges and the spacing between the ridges and the pitch of the ridges are typically the same. Similarly, the corresponding threading in the threaded bore 498 also has three independent and continuous helixes "T1", "T2" and "T3" that have different starting points and form the threaded bore 498. In this configuration, each time the threaded portion 52 rotates one turn, i.e., 360°, the fastener 424 advances axially within the threaded bore 498 by the width of the number of ridges, here by three ridges. Using triple-lead threading permits more rapid movement of the fastener 424 and thus the wedge assembly 420 relative to the frame 480 when compared to single-lead threading. As a result, using triple-lead threading reduces the installation time to connect the main conductor 800 and the tap conductor 810 to the connector 400. It is noted that the present disclosure contemplates that for any embodiment described herein the fastener may have single-lead threading or multi-lead threading, e.g., double-lead, triple-lead or quadruple-lead threading.

Referring now to FIGS. 19 and 22-24, in the exemplary embodiment shown, the frame 480 is a C-shaped like body or member. The frame 480 has a conductor contact wall 482, a wedge support wall 484, and a rear wall 486 between the conductor contact wall 482 and the wedge support wall 484. Between the conductor contact wall 482, the wedge support wall 484 and the rear wall 486 is a wedge receiving channel 488. The wedge receiving channel 488 at a first end 490 of the frame 480 has a length "L1" and the wedge receiving channel 488 at a second end 492 of the frame 480 has a length "L2." In the embodiment shown, the length "L1" is less than the length "L2" such that one or both of the conductor contact wall 482 and the wedge support wall 484 are tapered relative to a longitudinal axis "A" of the frame 480. In the embodiment shown, the wedge support wall 484 is at an angle "α" relative to a longitudinal axis "A" of the frame 480. The angle "α" may be in the range of about 5 degrees to about 25 degrees. In the embodiment shown, the conductor contact wall 482, the wedge support wall 484, the rear wall 486 and the wedge receiving channel 488 form the C-shaped like body or member. The frame 480 may also include a stop member 500, seen in FIG. 22, used to prevent longitudinal movement of the interface 520 along axis "A" when mated with the frame 480. The stop member 500 may also limit and possibly prevent rotation of the interface 520 when tightening the fastener 424 to secure the main conductor 800 and the tap conductor 810 to the frame 480.

The conductor contact wall 482 has an inner surface 482a, an outer surface 482b and a lead-in 483. The inner surface 482a of the conductor contact wall 482 is shaped, e.g., arcuate shaped, to form a conductor groove that is configured and dimensioned to receive or fit at least partially around a main conductor 800. The lead-in 483 helps to guide the main conductor 800 toward and into the conductor contact wall 482. The wedge support wall 484 includes one or more upper surfaces and the channel 494. In the embodiment shown, the wedge support wall 484 includes two upper surfaces 484a and 484b. The upper surfaces 484a and 484b are configured and dimensioned to interact with the flat portions 436a of the bottom wall 436 of the wedge body 426 so that the wedge body 426 can glide along the upper surfaces 484a and 484b when the wedge body 426 moves between the loading position and the clamping position. It is noted that in the loading position a center of the wedge body 426 is away from a center of the frame 480 sufficient so that the main conductor 800 and the tap conductor 810 can be installed in the frame 480. In the clamping position a center of the wedge body 426 is close to a center of the frame 480 sufficient so that the main conductor 800 and the tap conductor 810 are electrically and mechanically connected.

Figure 24:
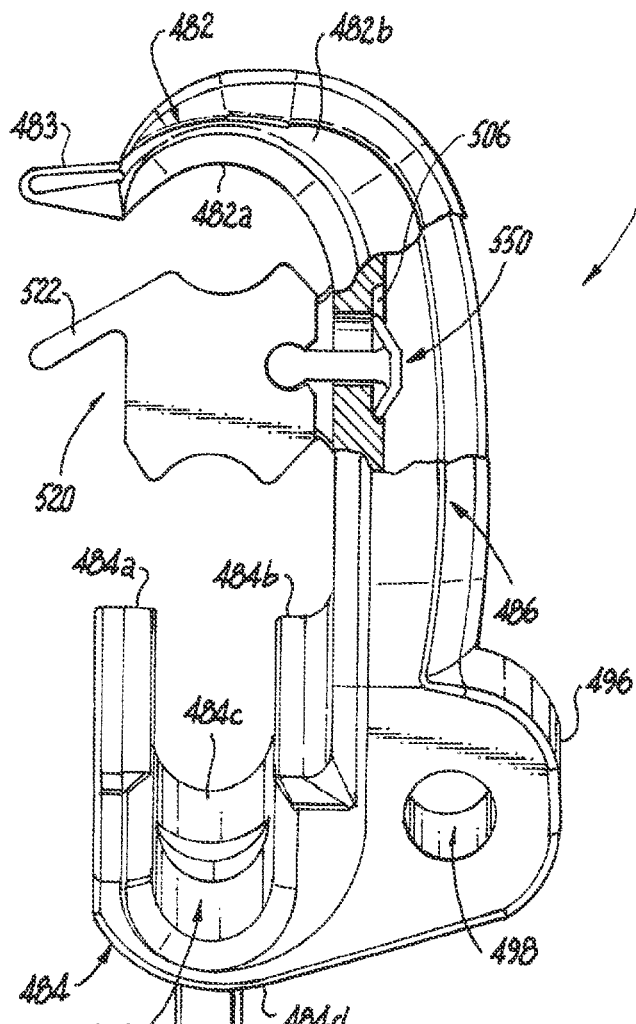
FIG. 24 is the first end perspective view, in partial cut away, of the frame of the wedge type electrical cable connector assembly of FIG. 20, illustrating the conductor interface mated with the frame using the flex connecting members.

In the exemplary embodiment shown, the wedge support wall 484 also has an inner surface 484c and an outer surface 484d, seen in FIG. 24. The inner surface 484c of the wedge support wall 484 is shaped, e.g., a U-shape like structure, to form the channel 494 that is configured and dimensioned to receive the fastener 424. The wedge support wall 484 of the frame 480 includes a mounting member or tab 496 extending from the wedge support wall 484 and/or the rear wall 486, as shown. The mounting member 496 is a substantially solid member having an internally threaded bore 498 that passes through the mounting member 496. The threaded bore 498 is configured and dimensioned to receive the fastener 424. The mounting member 496 may be positioned at any point along the channel 494 of the wedge support wall 484. In the exemplary embodiment shown in FIG. 24, the mounting member 496 is positioned in close proximity to the second end 492 of the frame 480. The mounting member 496 may be integrally or monolithically formed into the wedge support wall 484 and/or the rear wall 486, or the mounting member 496 may be secured to the wedge support wall 484 and/or the rear wall 486 using welds, mechanical fasteners or adhesives. The wedge support wall 484 may also include an eyelet 502 used for connecting an extendable reach tool (not shown) to the connector 400.

The rear wall 486 of the frame 480 is a substantially flat wall having one or more openings 504, e.g., slots, through which the connecting member 550 may pass to mate the interface 520 to the frame 480. In the exemplary embodiment of FIG. 22 there are two openings 504. But, as described above, there may be a single opening, or other opening, such as the T-shaped opening described above. Surrounding each opening 504 in the rear wall 486 is a recessed portion 506 configured to receive an interface coupling member 556 of a connecting member 550 to reduce the distance the connecting member 550 extends from the rear wall 486.

Figure 29:
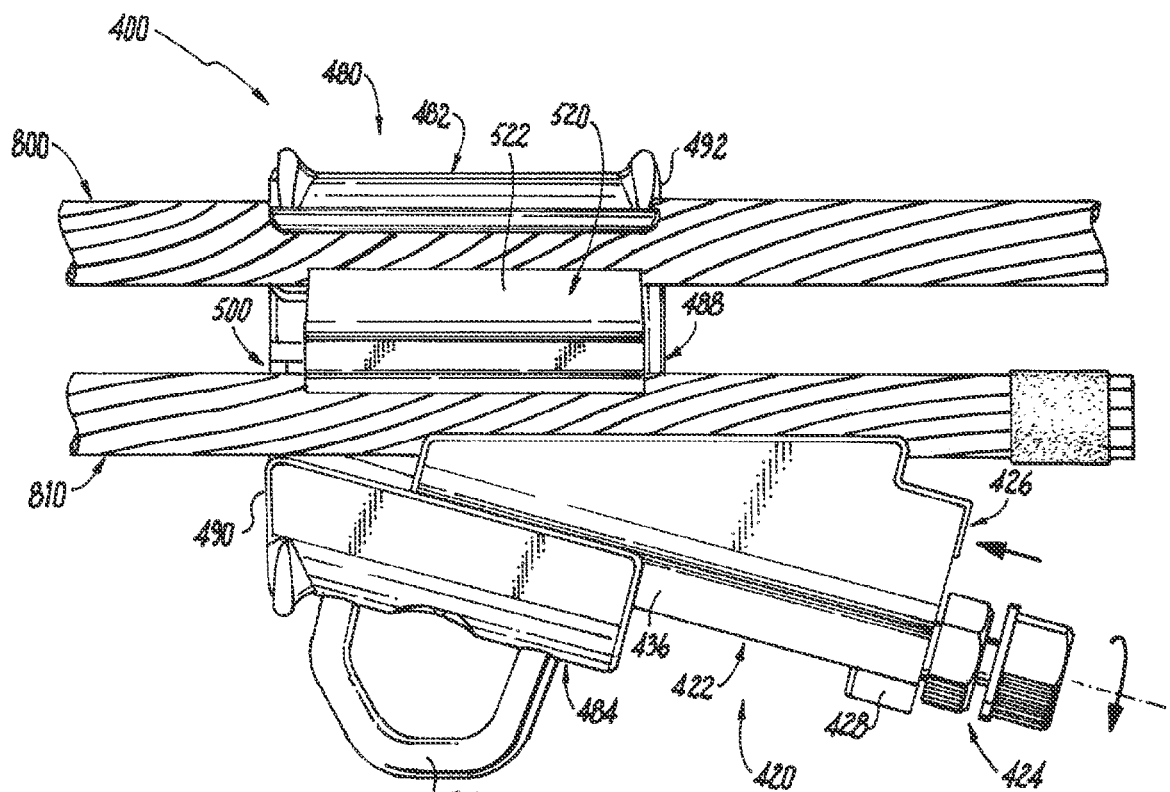
FIG. 29 is the front elevation view of the frame, conductor interface and flex connecting member of FIG. 19, illustrating a main conductor secured to the cable connector assembly, and the wedge assembly positioned to receive a tap conductor.

An exemplary embodiment of the interface 520 is shown in FIGS. 19 and 23-25. The interface 520 is an elongated body having a predefined length "L3" and a width "W2." In the exemplary embodiment shown, the interface 520 has a length "L3" that is substantially the same as a width "W" of the frame 480. In the exemplary embodiment shown, the interface 520 is a rectangular body having first and second ends 520a and 520b, and first and second side walls 520c and 520d. A lead-in 522 may extend from either the first side wall 520c or the second side wall 520d. A contact surface 524 is formed in an upper surface of the interface 520, and a contact surface 526 is formed in a lower surface of the interface 520. The contact surface 524 is configured and dimensioned to receive or fit at least partially around a main conductor 800. The contact surface 526 is configured and dimensioned to receive or fit at least partially around a tap conductor 810. As shown in FIG. 29, when the wedge assembly 420 is coupled to the frame 480 and the interface 520 is positioned between a main conductor 800 and a tap conductor 810, the contact surface 524 contacts a lower surface of the main conductor 800 and the contact surface 526 contacts an upper surface of the tap conductor 810. It is noted that the main conductor 800 and tap conductor 810, shown in FIG. 29, have substantially the same outer diameter. Accordingly, the contact surface 524 and 526 formed in the upper and lower surfaces of the interface 520 have substantially the same configuration. However, in some instances it may be desirable to connect a tap conductor having a smaller outer diameter to a main conductor having a larger outer diameter. In such situations, the contact surface 524 would be configured to engage the larger outer diameter main conductor 800 and the contact surface 526 would be configured to engage the smaller outer diameter tap conductor 810.

Figure 23:
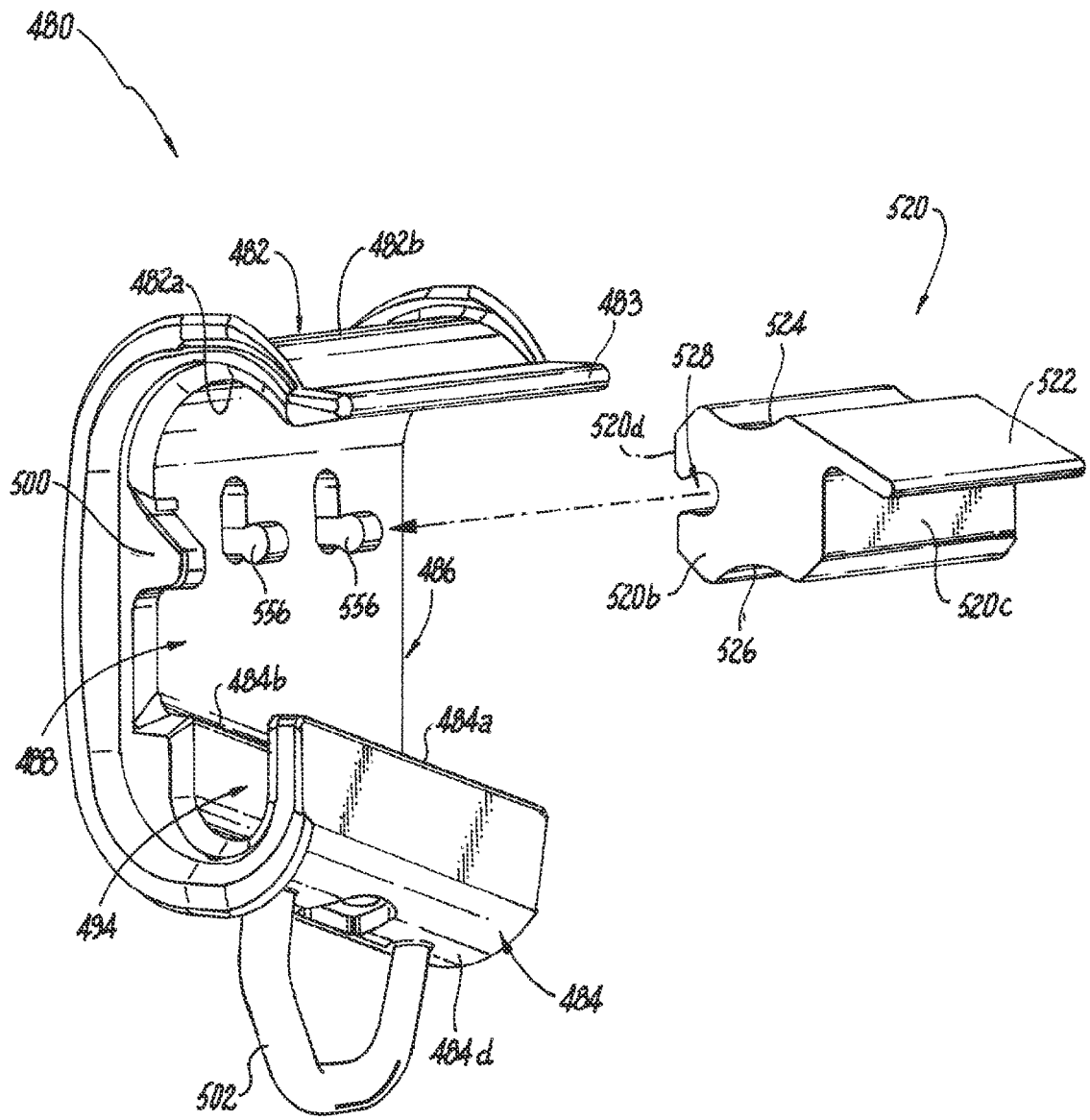
FIG. 23 is an exploded perspective view of a second end of the frame of the wedge type electrical cable connector assembly of FIG. 20, illustrating a conductor interface and flex connecting members positioned for mating the conductor interface with the frame by a slide in operation.
Figure 25:
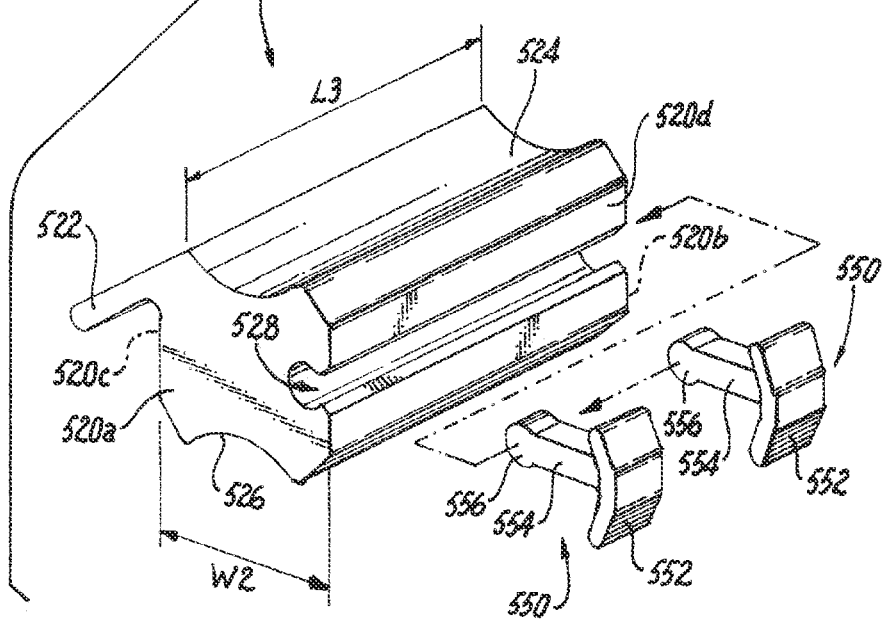
FIG. 25 is an exploded rear perspective view of the conductor interface and flex connecting members of FIG. 24, illustrating a channel in the conductor interface for receiving an interface coupling member of the flex connecting members.

Either the first side wall 520c or the second side wall 520d of the interface 520 includes a mounting element 528, e.g., a channel, configured and dimensioned to interact with the connecting members 550. As shown in FIGS. 23-25, the connecting members 550 are provided to be attached to the interface 520 and to mate the interface 520 to the frame 480 so that the interface 520 can flex and move when installing the main conductor 800 and the tap conductor 810 into the connector 400. In the exemplary embodiment shown in FIGS. 23 and 25, there are two connecting members 550 used. Each connecting member 550 includes an elastomeric base 552 and an elastomeric leg 554. The base 552 is configured and dimensioned to fit within the recess 506 on the rear wall 486 of the frame 480 and is provided to prevent the connecting member 550 from fully passing through the opening 504 in the rear wall 486. The base 552 also has an arcuate shape as, seen in FIG. 25, such that there is an angle between the leg 554 and the free ends of the base 552. This angle creates a linear distance from the free end of the base 552 and a portion of the base 552 from which the leg 554 attaches to the base 552. This linear distance determines a stroke length of the spring action of the connecting member 550. The leg 554 extends from the base 552 and end with an interface coupling member 556 that is configured and dimensioned to fit within the mounting element 528, e.g., the channel, of the interface 520. The leg 554 may be integrally or monolithically formed into the base 552 or the leg 554 may be secured to the base 552 using for example adhesives. The interface coupling member 556 of the leg 554 is passed through one of the openings 504 in the rear wall 486 of the frame 480, seen in FIG. 22, into engagement with the channel 528 of the interface 520, which is acting as the mounting element. In the exemplary embodiment of FIG. 23, the interface coupling member 556 of the leg 554 is slid into engagement with the channel 528 of the interface 520. In other exemplary embodiments, the interface coupling member 556 of the leg 554 can be snapped into engagement with the channel 528 of the interface 520.

Figure 28:
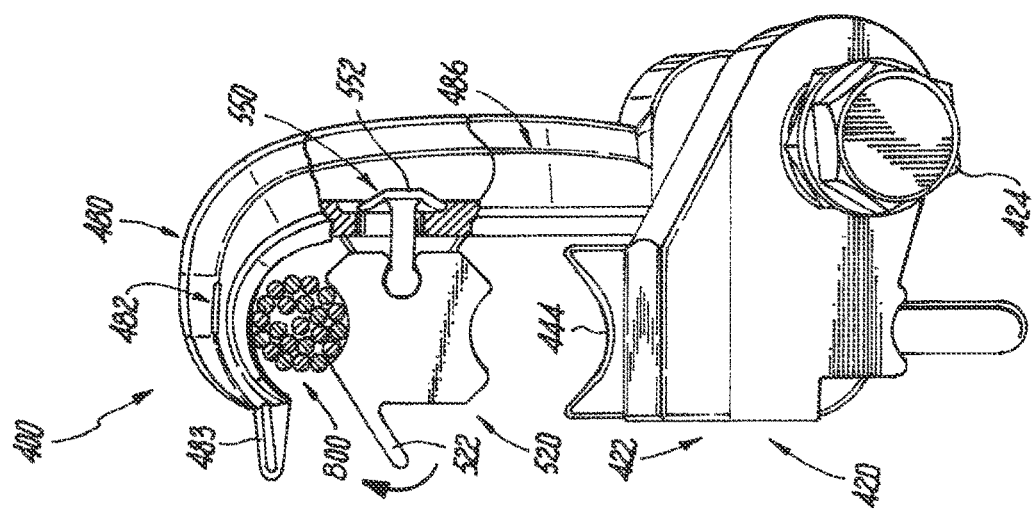
FIG. 28 is the second end elevation view of the wedge type electrical cable connector assembly of FIG. 25, illustrating the main conductor contacting the conductor contact wall and the conductor interface of the cable connector assembly.
Figure 27:
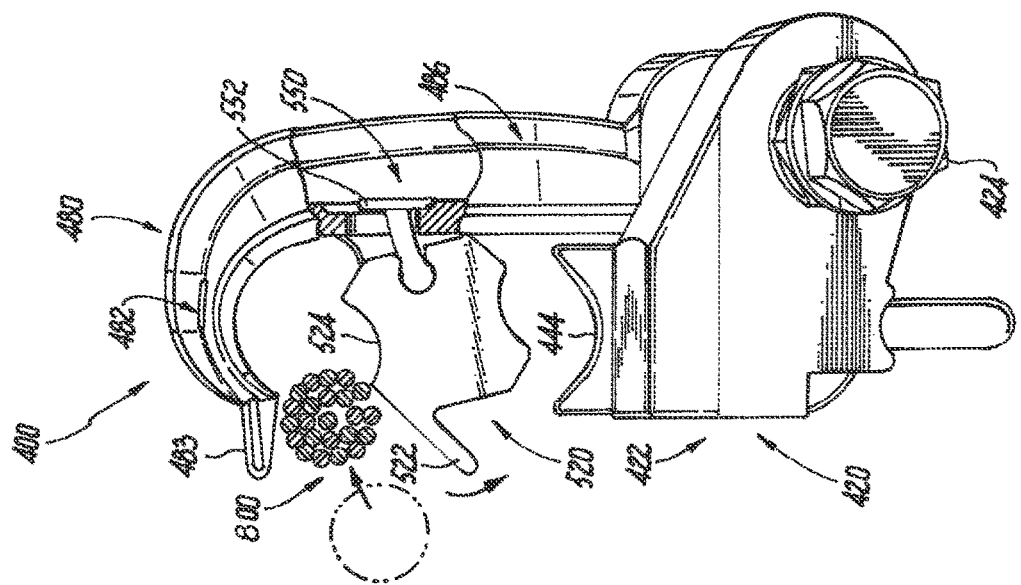
FIG. 27 is the second end elevation view of the wedge type electrical cable connector assembly of FIG. 24, illustrating the main conductor being inserted into the cable connector assembly.
Figure 26:
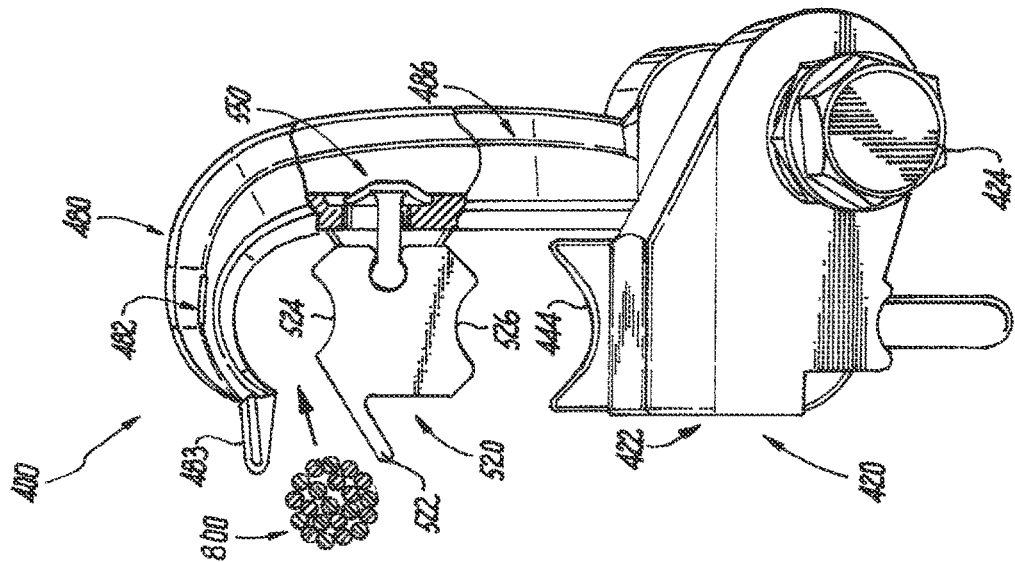
FIG. 26 is the second end elevation view of the wedge type electrical cable connector assembly of FIG. 19, illustrating a main conductor positioned for insertion into the cable connector assembly.

As shown in FIGS. 26-28, in this configuration, the interface coupling member 556 and leg 554 allow the interface 520 to flex and move axially relative to the frame 480 when installing the main conductor 800 and the tap conductor 810 into the connector 400. In addition, as noted above the leg 554 is made of an elastomeric material that allows the leg 554 and thus the interface 520 to further flex and move axially relative to the frame 480. More specifically, the leg 554 and interface coupling member 556 provide a snap operation when installing a main conductor 800 into the connector 400. The main conductor 800 is initially positioned in close proximity to the lead-in 483 of the frame 480 and the lead-in 522 of the interface 520, seen in FIG. 26, using for example an extendable reach tool (not shown). The main conductor 800 is then guided toward the conductor contact wall 482 by the lead-in 483 of the frame 480 and the lead-in 522 of the interface 520 where the force applied by the main conductor 800 causes the interface lead-in 522 to radially flex toward the wedge assembly 420 extending the leg 554 of the connecting members 550, as seen in FIG. 27. When the main conductor passes the lead-ins 483 and 522, the force extending the leg 554 is removed causing the interface 520 to return back to its normal position, as seen in FIG. 28.

Figure 30:
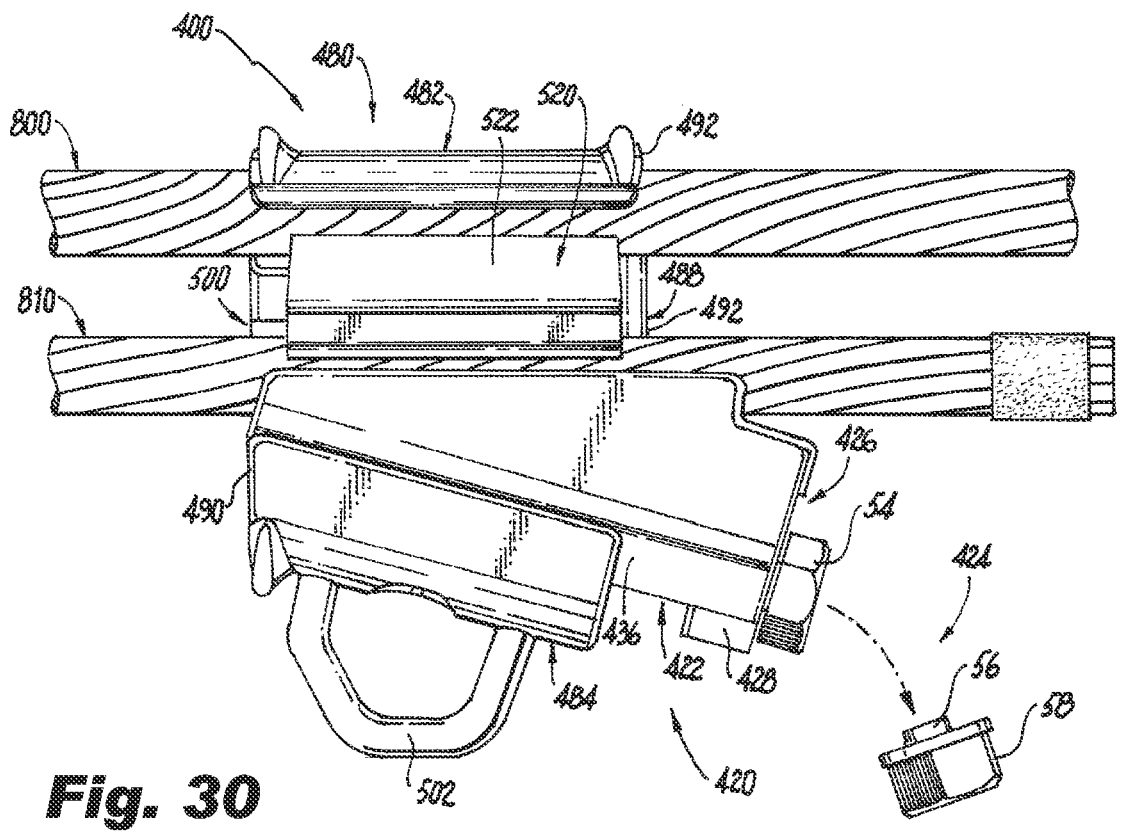
FIG. 30 is a front elevation view of the frame and conductor interface of FIG. 29, illustrating the main conductor secured to the cable connector assembly and the tap conductor secured to the cable connector assembly.

Referring now to FIGS. 29 and 30, the electrical connector 400 can be installed in the following exemplary manner. The connector 400 is first assembled where the interface 520 is mated to the frame 480 using the connecting members 550 of FIGS. 24 and 25, and the wedge 422 is attached to the frame 480 using the fastener 424 of the wedge assembly 420. The wedge 422 is attached to the frame 480 so that wedge 422 is substantially withdrawn from a center of the frame 480, as shown in FIG. 29. At this point, the interface 520 is in close proximity to the wedge assembly 420. The connector 400 is then suspended from a main conductor 800 by placing the inner surface 482a of the conductor contact wall 482 onto the main conductor 800 as described above with reference to FIGS. 26-28. As described, when placing the inner surface 482a of the conductor contact wall 482 onto the main conductor 800, the interface 520 may need to move axially and/or linearly, e.g., flex, relative to the frame 480 so that the interface 520 is not obstructing the placement of the inner surface 482a onto the main conductor 800. A tap conductor 810 is then passed, e.g., slid, between the contact surface 526 in the interface 520 and the contact surface 444 of the wedge body 426. As the tap conductor 810 is passed between the contact surface 526 in the interface 520 and the contact surface 444 of the wedge body 426, the interface 520 slides within the frame 480 toward the conductor contact wall 482. As noted above, the stop 500 on the frame 480, seen in FIG. 22, may be provided to prevent the interface 520 from rotating as the interface 520 slides within the frame 480 toward the conductor contact wall 482. With the conductors 800 and 810 positioned within the connector 400, the fastener 424 is rotated, e.g., tightened, so that wedge 422 moves toward and into the interior of the frame 480 causing the contact surface 444 of the wedge body 426 to engage the bottom surface of the tap conductor 810. As the wedge 422 is further moved into the interior of the frame 480, the wedge body 426 pushes the tap conductor 810 into engagement with the contact surface 526 of the interface 520. Continued movement of the wedge 422 into the interior of the frame 480 causes the interface 520 to move upwardly causing the contact surface 524 of the interface 520 into contact with the main conductor 800. Continued tightening of the fastener 424 forces the main conductor 800 against the inner surface 482a of the conductor contact wall 482 of the frame 480. The fastener 424 is tightened until a stable, electrically conductive path is established between the main conductor 800 and the tap conductor 810. In embodiments where the fastener 424 is a shear fastener, the cap nut 58 shears off when sufficient force has been applied by the wedge 422 against the tap conductor 810, the interface 520, the main conductor 800 and frame 480, as described above. While the above installation embodiment describes the connector 400 being suspended from the main conductor 800 first and then the tap conductor 810 being installed, the present disclosure also contemplates the tap conductor 810 being installed first and then suspending the connector 400 and the tap conductor 810 from the main conductor 800.

Referring now to FIGS. 31-41, another exemplary embodiment of a connector according to the present disclosure is shown and used to electrically and mechanically connect a main conductor 800 to a tap conductor 810. The connector 600 includes a wedge assembly 620, a frame 680, an interface 720 and one or more connecting members 750. The wedge assembly 620 is operatively coupled to or interconnected with a frame 680 so that the wedge assembly 620 can slide or glide along the frame 680 to wedge or secure the main conductor 800 to the tap conductor 810 so that the main conductor 800 and tap conductor 810 are electrically and mechanically connected, as will be described below. The wedge assembly 620, frame 680 and interface 720 are made of an electrically conductive material that has sufficient rigidity to withstand the forces applied by the wedge assembly 620 against the frame 680 when mechanically connecting the main conductor 800 to the tap conductor 810. Non-limiting examples of such electrically conductive and rigid materials include aluminum, aluminum alloys, stainless steel, galvanized steel, copper and copper/brass alloys. The one or more connecting members 750 may also be made of an electrically conductive material or a non-conductive material. Non-limiting examples of such electrically conductive materials include aluminum, aluminum alloys, stainless steel, galvanized steel, copper and copper/brass alloys described above. Non-limiting examples of such non-conductive materials include plastic materials and elastomeric materials. For example, the one or more connecting members 750 may be made of Ethylene Propylene Diene Monomer (EPDM), Thermoplastic Elastomer (Rubber TPE) or Silicone.

Figure 31:
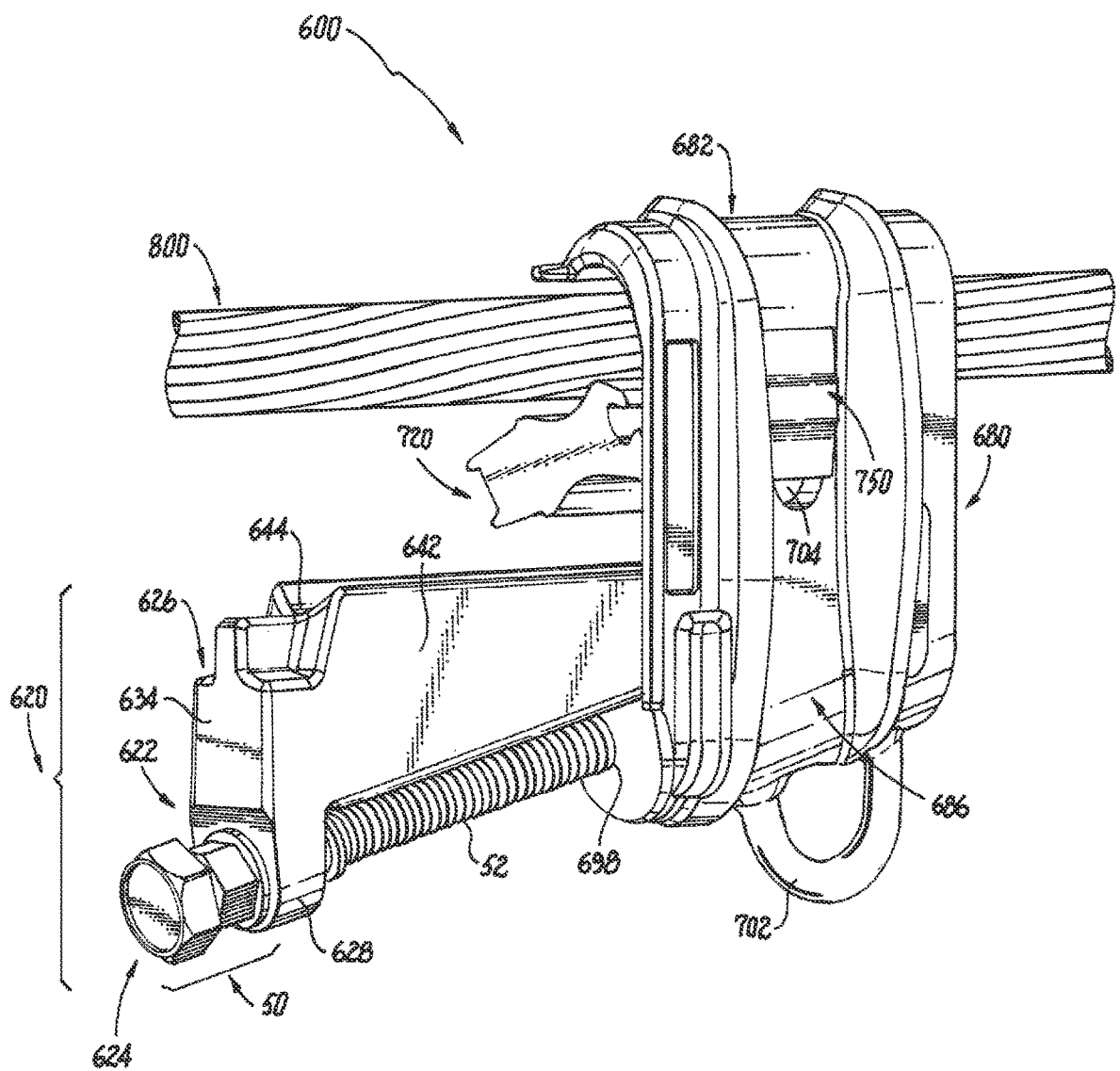
FIG. 31 is a second end perspective view of another exemplary embodiment of a wedge type electrical cable connector assembly according to the present disclosure, illustrating a frame, a wedge assembly and a conductor interface of the cable connector assembly, with the conductor interface flexing to permit a main conductor to be secured to the cable connector assembly.
Figure 32:
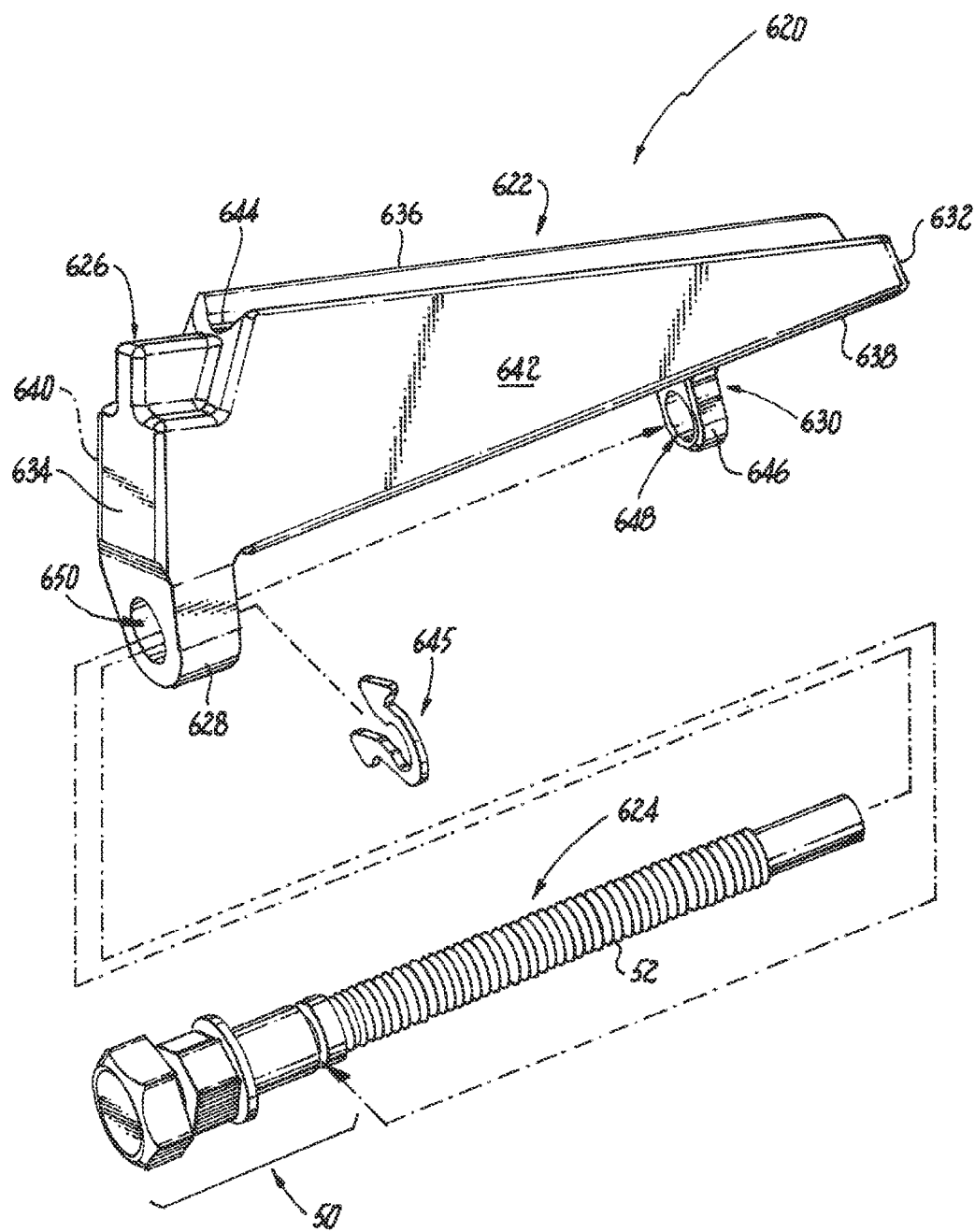
FIG. 32 is an exploded side perspective view of the wedge assembly of FIG. 31, illustrating a fastener operatively coupled to a wedge.
Figure 33:
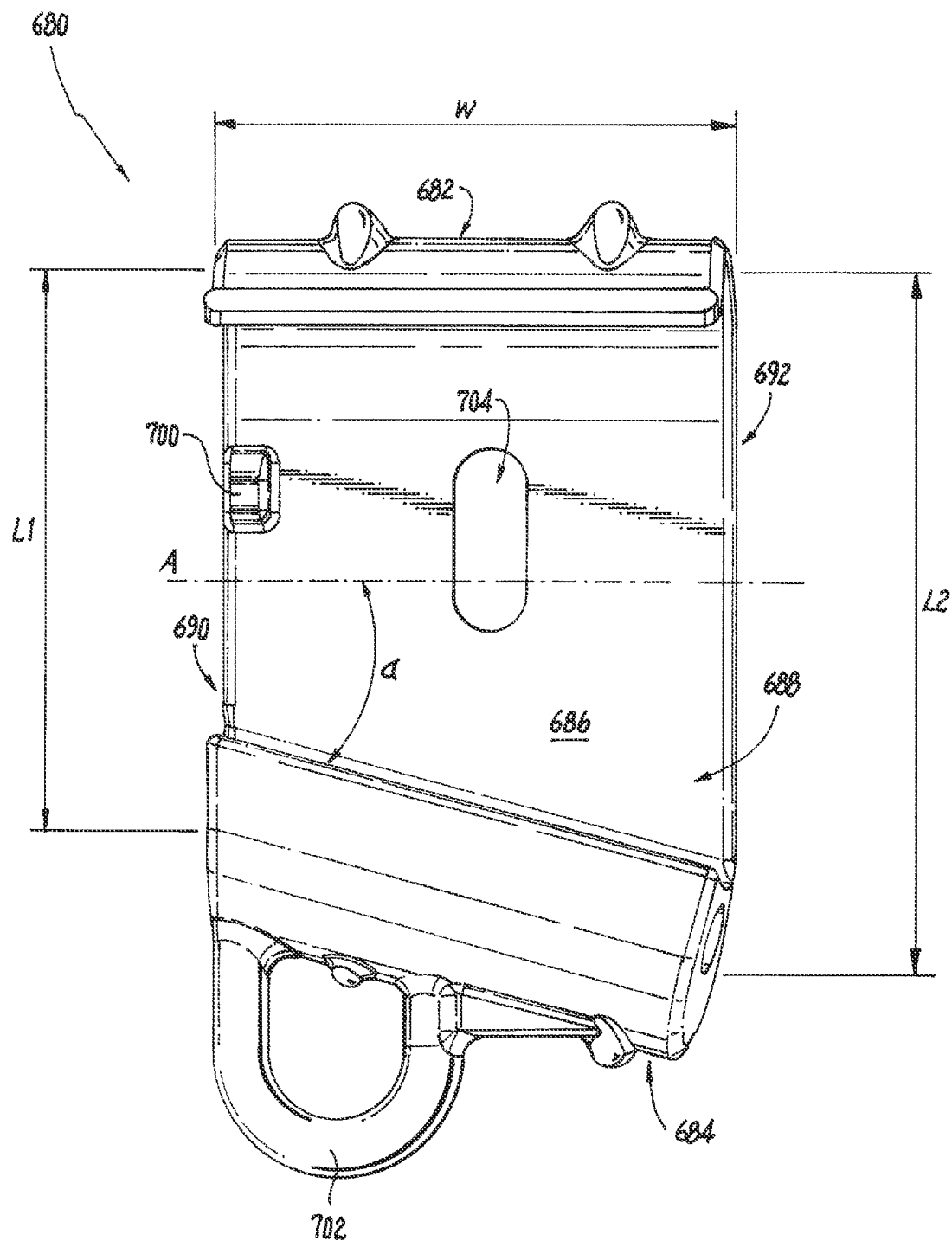
FIG. 33 is a front elevation view of the frame of the wedge type electrical cable connector assembly of FIG. 31, illustrating a single slot in the frame.

Referring to FIGS. 31 and 32, in the exemplary embodiment shown, the wedge assembly 620 includes a wedge 622 and a fastener 624. The wedge 622 includes a body 626, a fastener holder 628 and a fastener guide 630. The body 626 has a front wall 632, a rear wall 634, a top wall 636, a bottom wall 638 and side walls 640 and 642. The wedge body 626 is shaped to fit within the frame 680. At least a portion of the top wall 636 includes a contact surface 644 that may be an arcuate surface in the form of an elongated recess or groove as shown. The contact surface 644 is preferably configured to contact a tap conductor 810 positioned in the frame 680. The bottom wall 638 is substantially flat, and includes the fastener guide 630 extending therefrom. The fastener guide 630 is configured to be received within a channel 694, seen in FIG. 34, of the frame 680. In this exemplary embodiment, the fastener guide 630 includes a rail 646 having an aperture 648 therethrough in which a distal end of the fastener 424 rests. The fastener holder 628 extends from the body 626 and includes an aperture 650 configured and dimensioned to receive the fastener 624 such that the fastener 624 can rotate relative to the aperture 650. In this exemplary embodiment, the fastener holder 628 is positioned at or in proximity to the rear wall 634 of the body 626 and extends away from the bottom wall 638 so that the aperture 650 of the fastener holder 628 is aligned with an aperture 698 in the frame 680, seen in FIG. 34, and with the aperture 648 in the rail 646 when the wedge assembly 620 is coupled to the frame 680. However, the present disclosure contemplates that the fastener holder 628 can be positioned at any location on the body 626 so long as the aperture 650 of the fastener holder 628 aligns with the aperture 698 in the frame 680 and with the aperture 648 in the rail 646 when the wedge assembly 620 is coupled to the frame 680.

Continuing to refer to FIGS. 31 and 32, the fastener 624 may be any fastener suitable to releasably secure the wedge assembly 620 to the frame 680 as described herein. In the exemplary embodiment shown, the fastener 624 is the same as the fastener 24 described above such that like numerals will be used. Generally, the fastener 624 is an elongated bolt having a head portion 50 followed by a threaded portion 52. The head portion 50 may be, for example, a breakaway head configuration where a portion of the head shears or breaks-away from the head portion 50. In other embodiments, the head portion 50 may be a conventional hexagonal bolt head configuration. The head portion 50 shown is a breakaway head configuration described above. A more detailed description of a shear type head portion is described in commonly owned U.S. Pat. No. 10,465,732 which is incorporated herein in its entirety by reference. The fastener 624 is attached to the wedge 622 using a retaining ring 645.

Referring now to FIGS. 31 and 33-35, in the exemplary embodiment shown, the frame 680 is a C-shaped like body or member. The frame 680 has a conductor contact wall 682, a wedge support wall 684, and a rear wall 686 between the conductor contact wall 682 and the wedge support wall 684. Between the conductor contact wall 682, the wedge support wall 684 and the rear wall 686 is a wedge receiving channel 688. The wedge receiving channel 688 at a first end 690 of the frame 680 has a length "L1" and the wedge receiving channel 688 at a second end 692 of the frame 680 has a length "L2." In the embodiment shown, the length "L1" is less than the length "L2" such that one or both of the conductor contact wall 682 and the wedge support wall 684 are tapered relative to a longitudinal axis "A" of the frame 680. In the embodiment shown, the wedge support wall 684 is at an angle "α" relative to a longitudinal axis "A" of the frame 680. The angle "α" may be in the range of about 5 degrees to about 25 degrees. In the embodiment shown, the conductor contact wall 682, the wedge support wall 684, the rear wall 686 and the wedge receiving channel 688 form the C-shaped like body or member. The frame 680 may also include a stop member 700, seen in FIG. 33, used to prevent longitudinal movement of the interface 720 along axis "A" when mated with the frame 680. The stop member 700 may also limit and possibly prevent rotation of the interface 720 when tightening the fastener 624 to secure the main conductor 800 and the tap conductor 810 to the frame 680.

Continuing to refer to FIGS. 31 and 33-35, the conductor contact wall 682 has an inner surface 682a, an outer surface 682b and a lead-in 683. The inner surface 682a of the conductor contact wall 682 is shaped, e.g., arcuate shaped, to form a conductor groove that is configured and dimensioned to receive or fit at least partially around a main conductor 800. The lead-in 683 helps to guide the main conductor 800 toward and into the conductor contact wall 682. The wedge support wall 684 includes one or more upper surfaces and the channel 694. In the embodiment shown, the wedge support wall 684 includes two upper surfaces 684a and 684b. The upper surfaces 684a and 684b are configured and dimensioned to interact with the flat bottom wall 638, seen in FIG. 32, of the wedge body 626 so that the wedge body 626 can glide along the upper surfaces 684a and 684b when the wedge body 626 moves between the loading position and the clamping position. It is noted that in the loading position a center of the wedge body 626 is away from a center of the frame 680 sufficient so that the main conductor 800 and the tap conductor 810 can be installed in the frame 680. In the clamping position a center of the wedge body 626 is close to a center of the frame 680 sufficient so that the main conductor 800 and the tap conductor 810 are electrically and mechanically connected.

In the exemplary embodiment shown, the wedge support wall 684 also includes an inner surface 684c and an outer surface 684d. The inner surface 684c of the wedge support wall 684 is shaped, e.g., a U-shape like structure, to form the channel 694, seen in FIG. 34, that is configured and dimensioned to receive the fastener 624 and the rail 646, seen in FIG. 32, extending from the wedge body 626, such that the channel 694 acts as a track. The wedge support wall 684 of the frame 680 includes a mounting member or tab 696 extending from the wedge support wall 484 and/or the rear wall 486 into the channel 694, as shown. The mounting member 696 is a substantially solid member having an internally threaded bore 698 that passes through the mounting member 696. The threaded bore 698 is configured and dimensioned to receive the fastener 624. The mounting member 696 may be positioned at any point along the channel 694 of the wedge support wall 684. In the exemplary embodiment shown in FIGS. 31 and 35, the mounting member 696 is positioned in close proximity to the second end 692 of the frame 680. The mounting member 696 may be integrally or monolithically formed into the wedge support wall 684 and/or the rear wall 686, or the mounting member 696 may be secured to the wedge support wall 684 and/or the rear wall 686 using welds, mechanical fasteners or adhesives. The wedge support wall 684 may also include an eyelet 702 used for connecting an extendable reach tool (not shown) to the connector 600.

Figure 34:
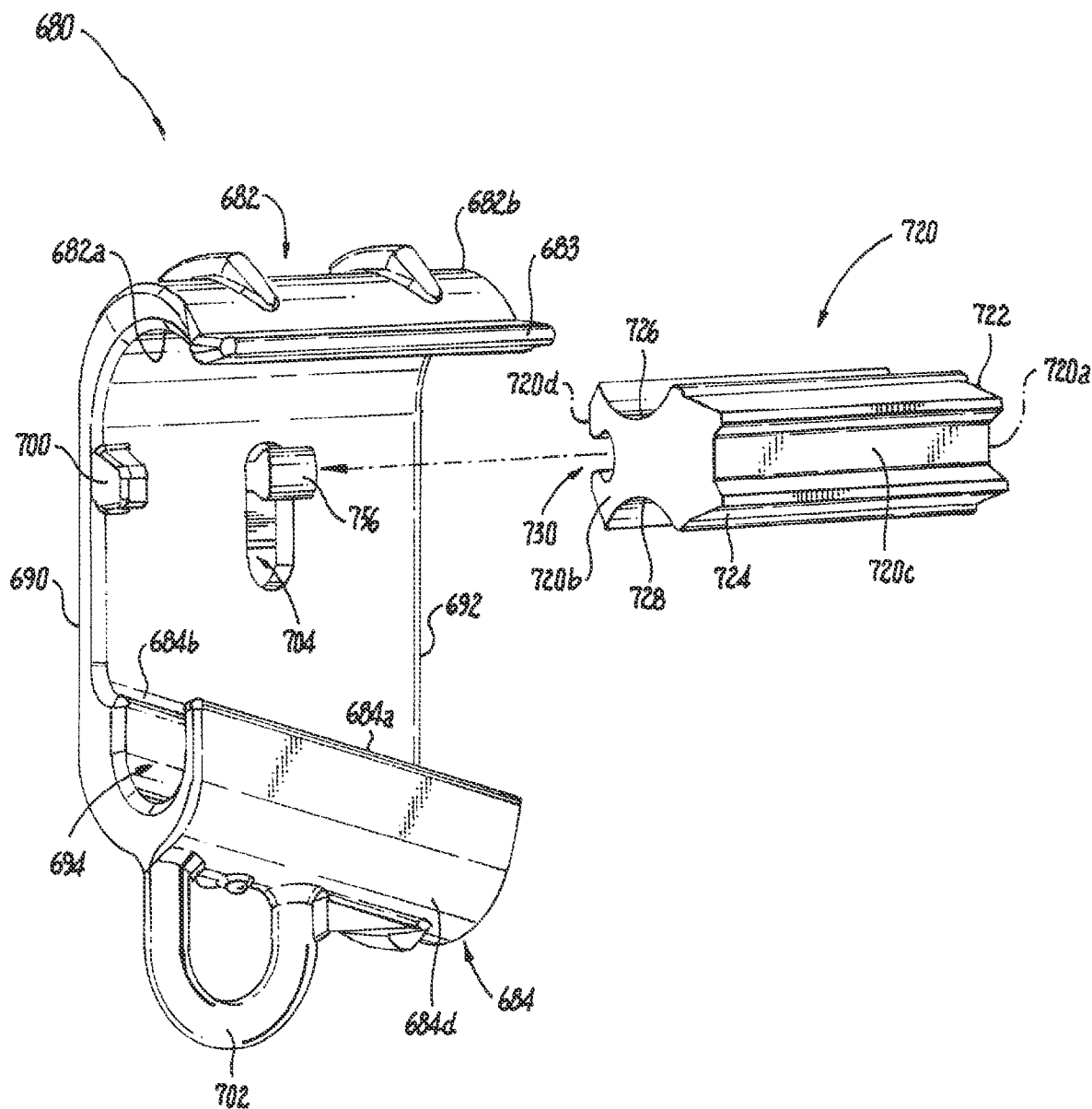
FIG. 34 is an exploded perspective view of a second end of the frame of the wedge type electrical cable connector assembly of FIG. 31, illustrating the conductor interface and flex connecting member positioned for mating the conductor interface with the frame by a slide in operation.
Figure 35:
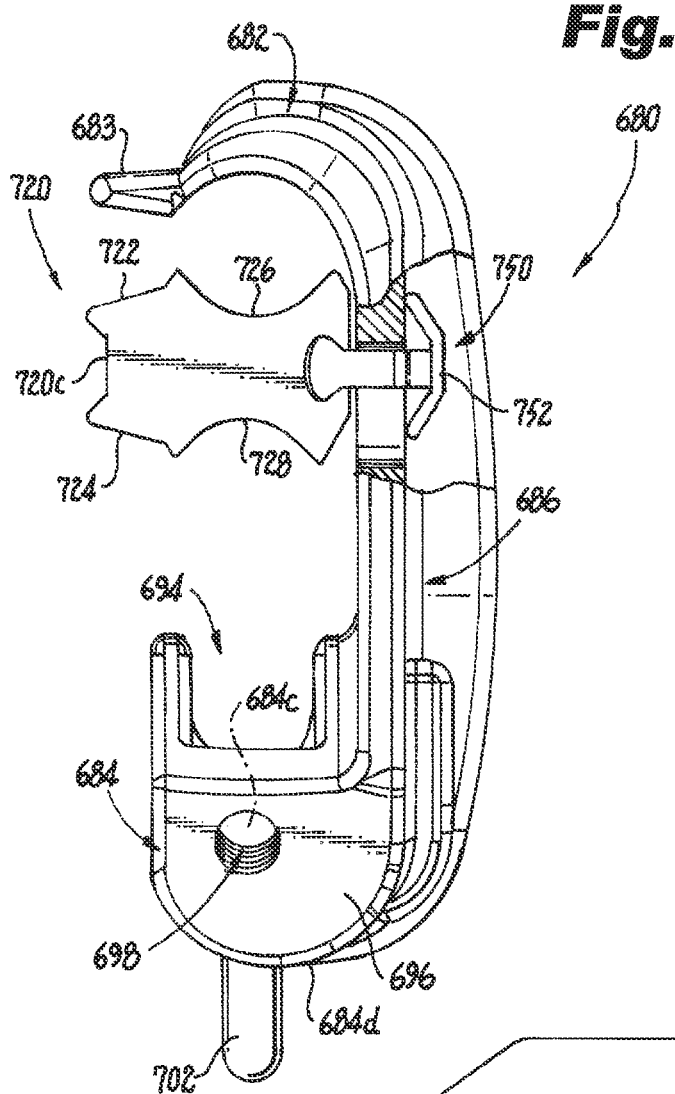
FIG. 35 is the second end elevation view of the frame of the wedge type electrical cable connector assembly of FIG. 31 in partial cut away, illustrating the conductor interface mated with the frame using the flex connecting member.

Referring to FIGS. 31 and 34, the rear wall 686 of the frame 680 is a substantially flat wall having one or more openings 704, e.g., slots, through which the connecting member 750 may pass to mate the conductor interface 720 to the frame 680. In the exemplary embodiment of FIG. 34 there is a single opening 704. But, as described above, there may be multiple openings, or other opening, such as the T-shaped opening described above.

Figure 36:
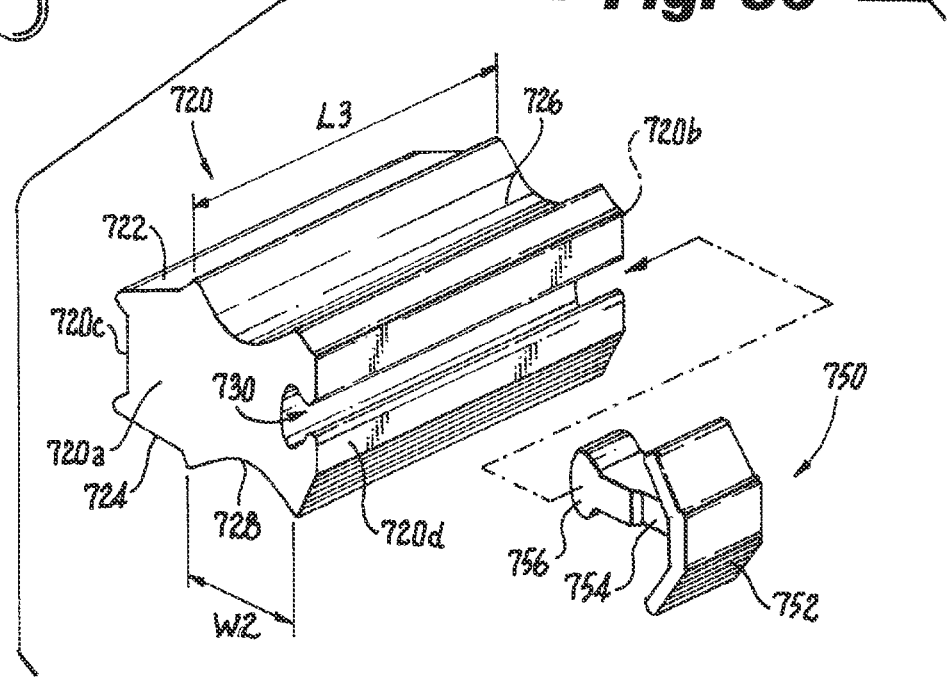
FIG. 36 is an exploded rear perspective view of the conductor interface and flex connecting member of FIG. 35, illustrating a channel in the conductor interface for receiving the flex connecting member.
Figure 40:
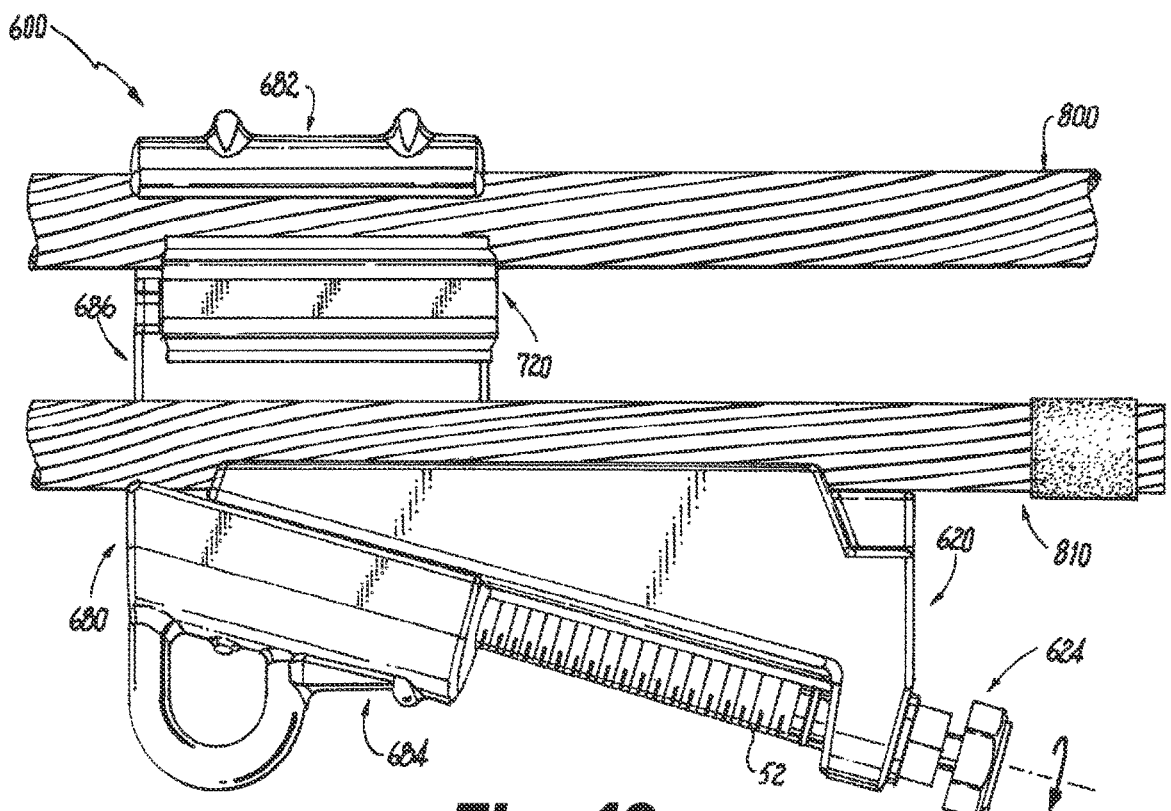
FIG. 40 is the front elevation view of the frame, conductor interface and flex connecting members of FIG. 31, illustrating a main conductor secured to the cable connector assembly and the wedge assembly positioned to receive a tap conductor.
Figure 41:
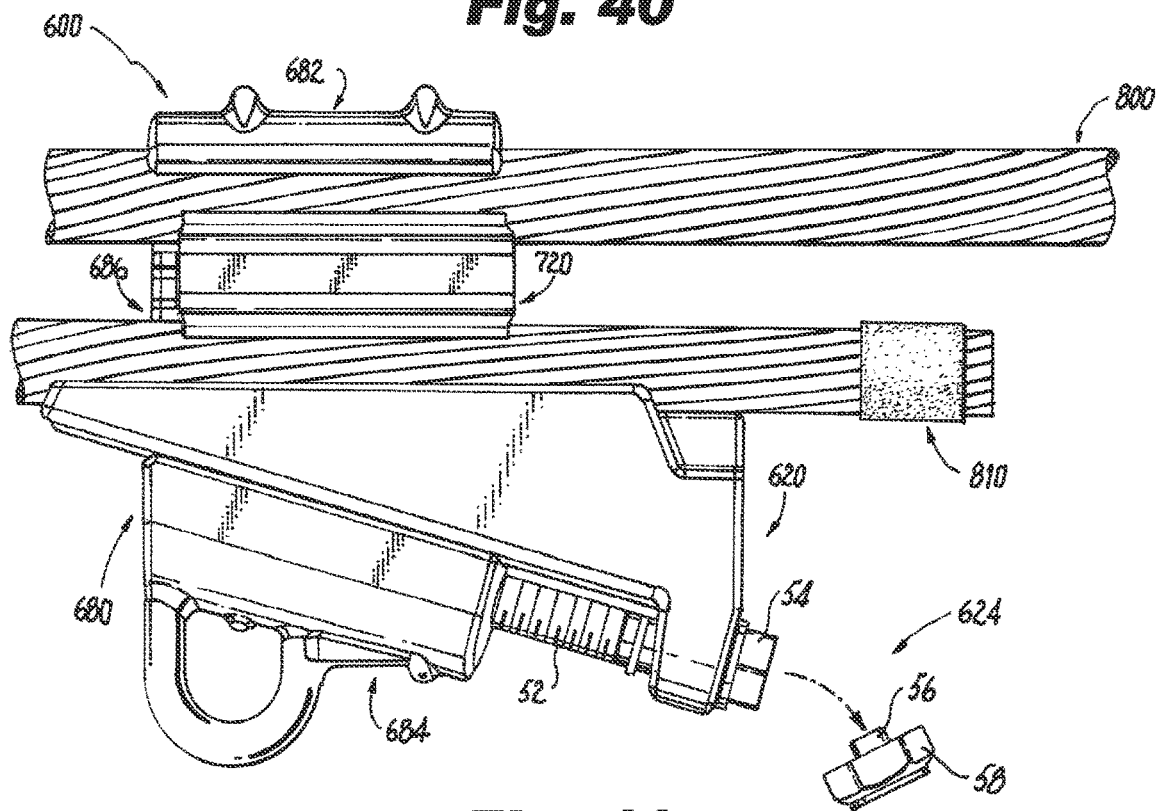
FIG. 41 is a front elevation view of the frame and conductor interface of FIG. 40, illustrating the main conductor secured to the cable connector assembly and the tap conductor secured to the cable connector assembly.
Figure 42:
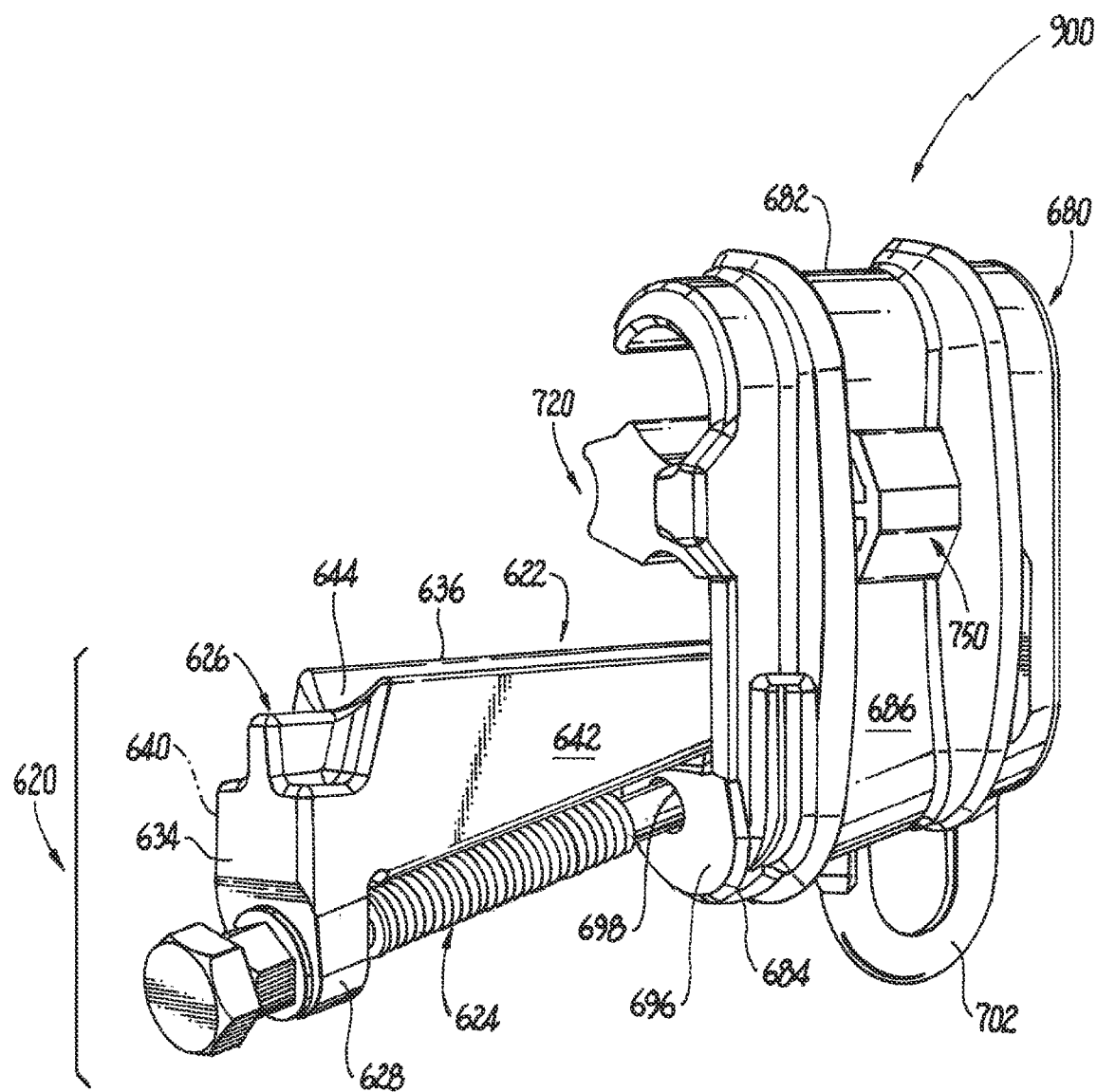
FIG. 42 is a rear perspective view of another exemplary embodiment of a wedge type electrical cable connector assembly according to the present disclosure, illustrating a frame, a wedge assembly and a conductor interface of the cable connector assembly.

An exemplary embodiment of the conductor interface 720 is shown in FIGS. 34 and 36. The interface 720 is an elongated body having a predefined length "L3" and a width "W2." In the exemplary embodiment shown, the interface 720 has a length "L3" that is substantially the same as a width "W" seen in FIG. 33, of the frame 680. In the exemplary embodiment shown, the interface 720 is a rectangular body having first and second ends 720a and 720b, and first and second side walls 720c and 720d. A first or upper lead-in 722 may extend from either the first side wall 720c or the second side wall 720d, and a second or lower lead-in 724 may extend from either the first side wall 720c or the second side wall 720d. The upper lead-in 722 is provided to guide the main conductor 800 toward the conductor contact wall 682, and the lower lead-in 724 is provided to guide the tap conductor 810 toward the contact surface 644 of the wedge 622. A contact surface 726 is formed in an upper surface of the interface 720, and a contact surface 728 is formed in a lower surface of the interface 720. The contact surface 726 is configured and dimensioned to receive or fit at least partially around the main conductor 800. The contact surface 728 is configured and dimensioned to receive or fit at least partially around the tap conductor 810. As shown in FIGS. 40 and 41, when the wedge assembly 620 is coupled to the frame 680 and the interface 720 is positioned between the main conductor 800 and the tap conductor 810, the contact surface 726 contacts a lower surface of the main conductor 800 and the contact surface 728 contacts an upper surface of the tap conductor 810. It is noted that the main conductor 800 and tap conductor 810, shown in FIGS. 40 and 41, have substantially the same outer diameter. Accordingly, the contact surfaces 726 and 728 formed in the upper and lower surfaces of the interface 720 have substantially the same configuration. However, in some instances it may be desirable to connect a tap conductor having a smaller outer diameter to a main conductor having a larger outer diameter. In such situations, the contact surface 726 would be configured to engage the larger outer diameter main conductor 800 and the contact surface 728 would be configured to engage the smaller outer diameter tap conductor 810.

Either the first side wall 720c or the second side wall 720d of the interface 720 includes a mounting element 730, e.g., a channel, configured and dimensioned to interact with or couple to the connecting member 750. As shown in FIGS. 34 and 36, the connecting member 750 is provided to be attached to the interface 720 and to mate the interface 720 to the frame 680 so that the interface 720 can flex and move when installing the main conductor 800 and the tap conductor 810 into the connector 600. In the exemplary embodiment shown in FIGS. 33 and 35, there is a single connecting member 750 used. The connecting member 750 includes an elastomeric base 752 and an elastomeric leg 754. The base 752 is configured and dimensioned to fit within the recess 704 on the rear wall 686, seen in FIG. 33, of the frame 680 and is provided to prevent the connecting member 750 from fully passing through the opening 704 in the rear wall 686. In the embodiment shown, the base 752 has an arcuate shape, seen in FIG. 36, such that there is an angle between the leg 754 and the free ends of the base 752. This angle creates a linear distance from the free end of the base 752 and a portion of the base 752 from which the leg 754 attaches to the base 752. This linear distance determines a stroke length of the spring action of the connecting member 750. The leg 754 extends from the base 752 and ends with an interface coupling member 756 that is configured and dimensioned to fit within the mounting element 730, e.g., the channel, of the interface 720. The leg 754 may be integrally or monolithically formed into the base 752 or the leg 754 may be secured to the base using for example adhesives. The interface coupling member 756 of the leg 754 is passed through one of the openings 704 in the rear wall 686 of the frame 680, seen in FIG. 34, into engagement with the channel 730 of the interface 720, which is acting as the mounting element. In the exemplary embodiment of FIG. 36, the interface coupling member 756 of the leg 754 can be slid into engagement with the channel 730 of the interface 720. In another exemplary embodiment, the interface coupling member 756 of the leg 754 can be snapped into engagement with the channel 730 of the interface 720.

Figure 39:
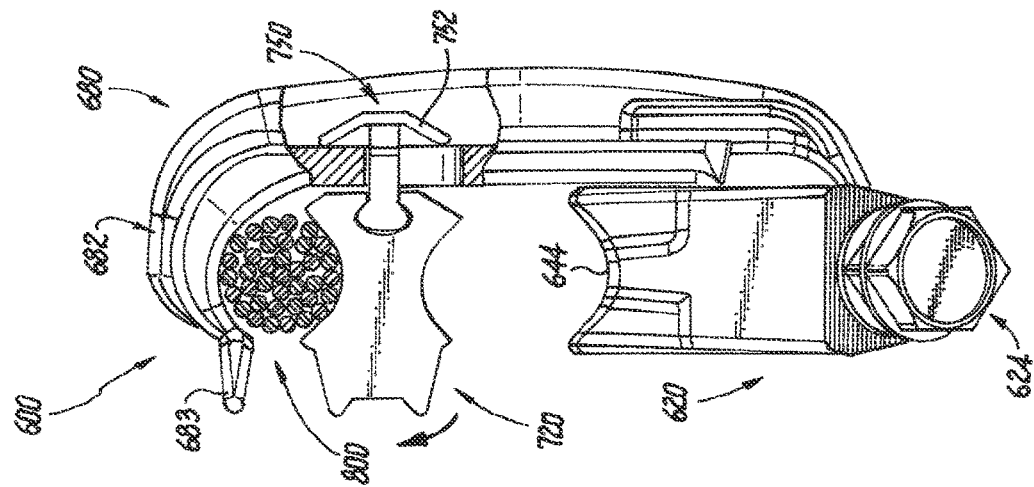
FIG. 39 is the second end elevation view of the wedge type electrical cable connector assembly of FIG. 38, illustrating the main conductor contacting the conductor contact wall and the conductor interface of the cable connector assembly.
Figure 38:
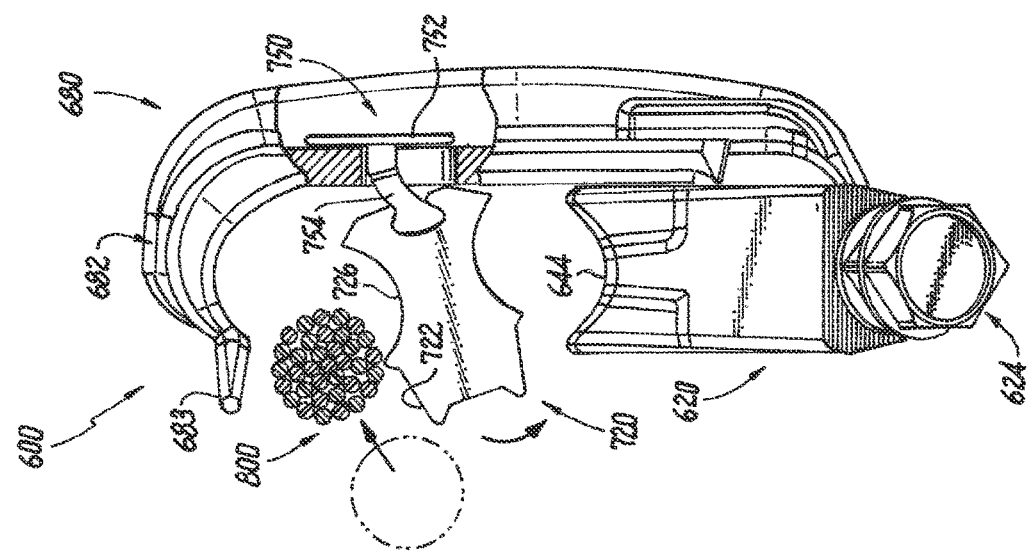
FIG. 38 is the second end elevation view of the wedge type electrical cable connector assembly of FIG. 37, illustrating the main conductor being inserted into the cable connector assembly.
Figure 37:
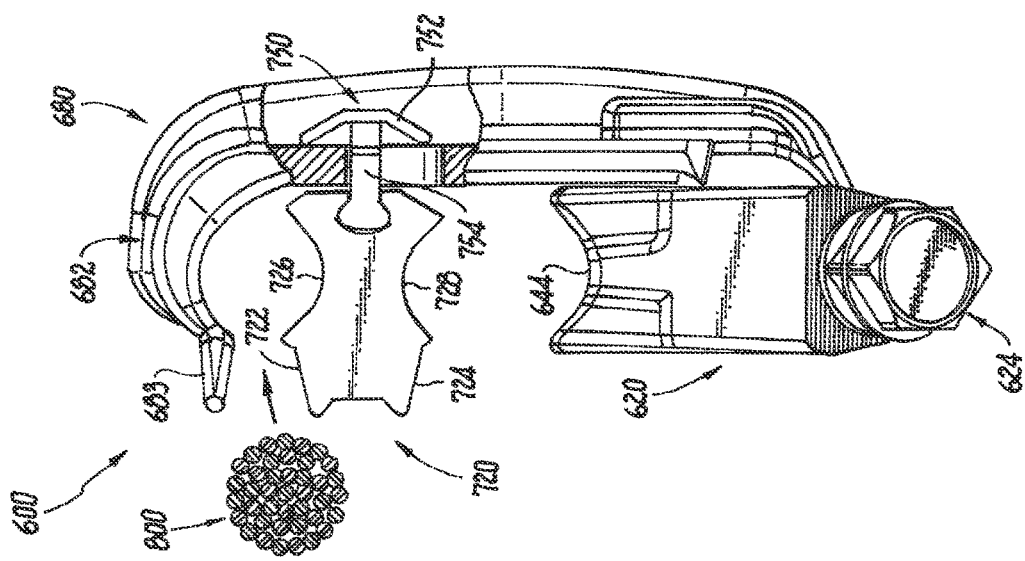
FIG. 37 is the second end elevation view of the wedge type electrical cable connector assembly of FIG. 31, illustrating a main conductor positioned for insertion into the cable connector assembly.

As shown in FIGS. 37-39, in this configuration, the interface coupling member 756 and leg 754 allow the interface 720 to flex and move axially relative to the frame 680 when installing the main conductor 800 and the tap conductor 810 into the connector 600. In addition, as noted above the leg 754 is made of an elastomeric material that allows the leg 754 and thus the interface 720 to further flex and move axially relative to the frame 680. More specifically, the leg 754 and interface coupling member 756 provide a snap operation when installing a main conductor 800 into the connector 600. The main conductor 800 is initially positioned in close proximity to the lead-in 683 of the frame 680 and the lead-in 722 of the interface 720, seen in FIG. 37, using for example an extendable reach tool (not shown). The main conductor 800 is then guided toward the conductor contact wall 682 by the lead-in 683 of the frame 680 and the lead-in 722 of the interface 720 where the force applied by the main conductor 800 causes the interface lead-in 722 to radially flex toward the wedge assembly 620 extending the leg 654 of the connecting member 750, as seen in FIG. 38. When the main conductor passes the lead-ins 683 and 722, the force extending the leg 754 is removed causing the interface 720 to return (e.g., snap back) back to its normal position, as seen in FIG. 39.

Referring now to FIGS. 40 and 41, the electrical connector 600 can be installed in the following exemplary manner. The connector 600 is first assembled where the interface 720 is mated to the frame 680 using the connecting members 750 of FIGS. 35 and 36, and the wedge 622 is attached to the frame 680 using the fastener 624 of the wedge assembly 620. The wedge 622 is attached to the frame 680 so that wedge 622 is substantially withdrawn from a center of the frame 680, as shown in FIG. 40. At this point, the interface 720 is in close proximity to the wedge assembly 620. The connector 600 is then suspended from a main conductor 800 by placing the inner surface 682a of the conductor contact wall 682 onto the main conductor 800 as described above with reference to FIGS. 37-39. As described, when placing the inner surface 682a of the conductor contact wall 682 onto the main conductor 800, the interface 720 may need to move axially and/or linearly, e.g., flex, relative to the frame 680 so that the interface 720 is not obstructing the placement of the inner surface 682a onto the main conductor 800. A tap conductor 810 is then passed, e.g., slid, between the contact surface 728 in the interface 720 and the contact surface 644 of the wedge body 626. As the tap conductor 810 is passed between the contact surface 728 in the interface 720 and the contact surface 644 of the wedge body 626, the interface 720 slides within the frame 680 toward the conductor contact wall 682. As noted above, the stop 700 on the frame 680, seen in FIG. 33, may be provided to prevent the interface 720 from rotating as the interface 720 slides within the frame 680 toward the conductor contact wall 682. With the conductors 800 and 810 positioned within the connector 600, the fastener 624 is rotated, e.g., tightened, so that wedge 622 moves toward and into the interior of the frame 680 causing the contact surface 644 of the wedge body 626 to engage the bottom surface of the tap conductor 810. As the wedge 622 is further moved into the interior of the frame 680, the wedge body 626 pushes the tap conductor 810 into engagement with the contact surface 728 of the interface 720. Continued movement of the wedge 622 into the interior of the frame 680 causes the interface 720 to move upwardly causing the contact surface 726 of the interface 720 into contact with the main conductor 800. Continued tightening of the fastener 624 forces the main conductor 800 against the inner surface 682a of the conductor contact wall 682 of the frame 680. The fastener 624 is tightened until a stable, electrically conductive path is established between the main conductor 800 and the tap conductor 810. In embodiments where the fastener 624 is a shear fastener, the cap nut 58 shears off when sufficient force has been applied by the wedge 622 against the tap conductor 810, the interface 720, the main conductor 800 and frame 680, as described above. While the above installation embodiment describes the connector 600 being suspended from the main conductor 800 first and then the tap conductor 810 being installed, the present disclosure also contemplates the tap conductor 810 being installed first and the suspending the connector 600 and the tap conductor 810 from the main conductor 800.

Figure 43:
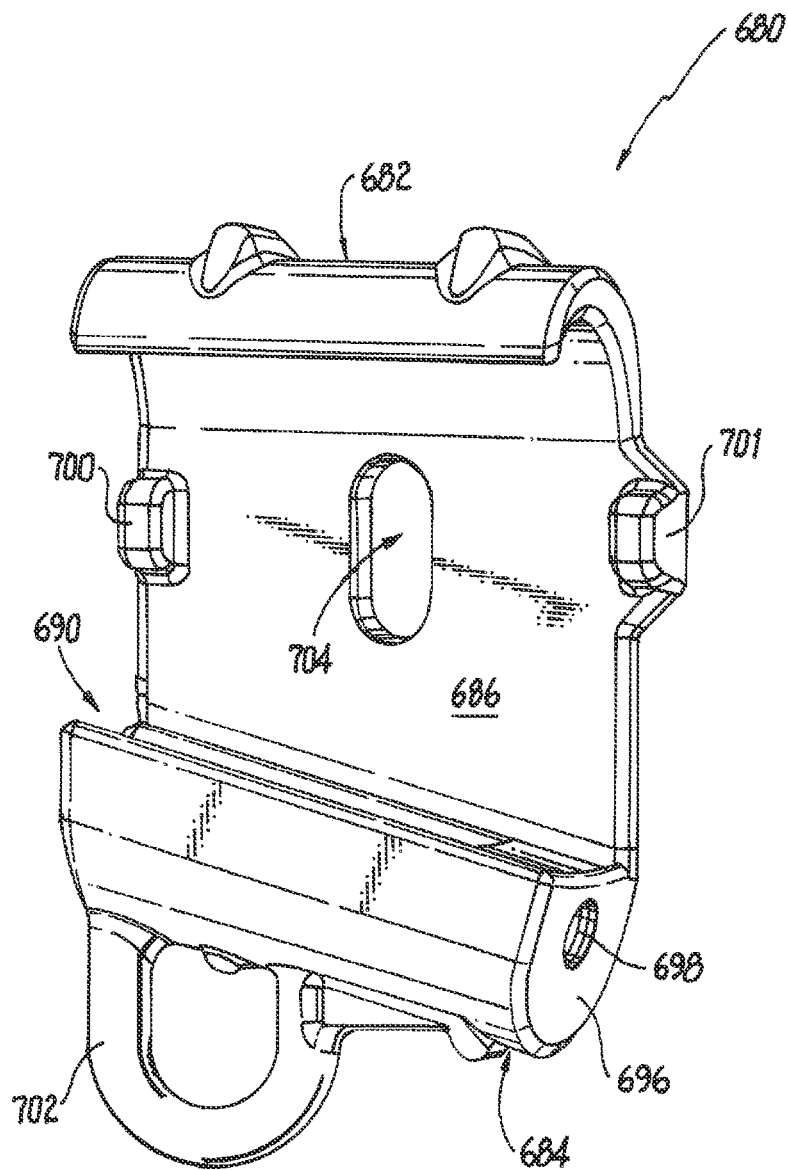
FIG. 43 is a front perspective view of the frame of the wedge type electrical cable connector assembly of FIG. 42, illustrating two interface stop members on the frame.
Figure 44:
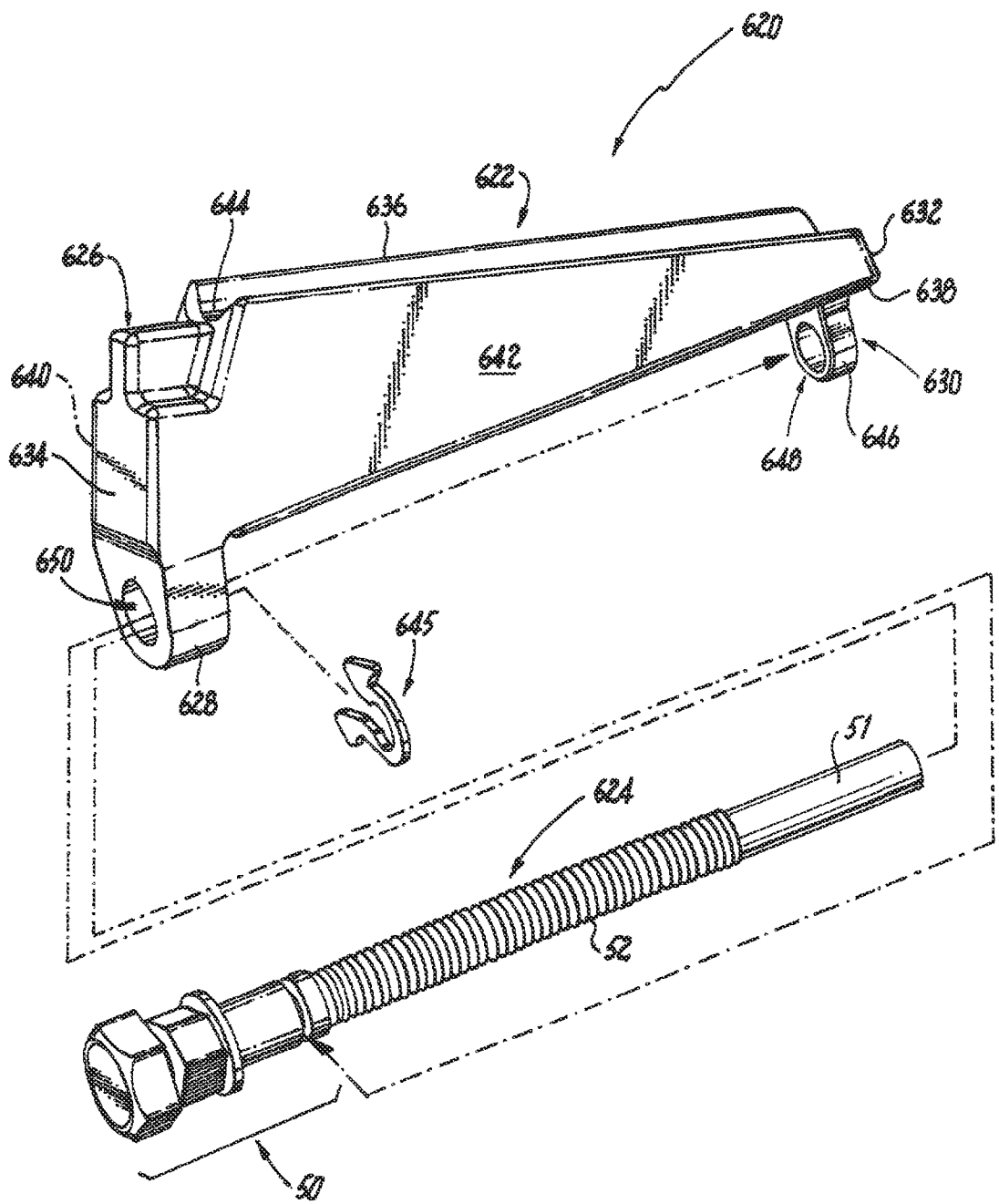
FIG. 44 is an exploded side perspective view of the wedge assembly of FIG. 42, illustrating a fastener with an elongated unthreaded portion operatively coupled to a wedge.
Figure 45:
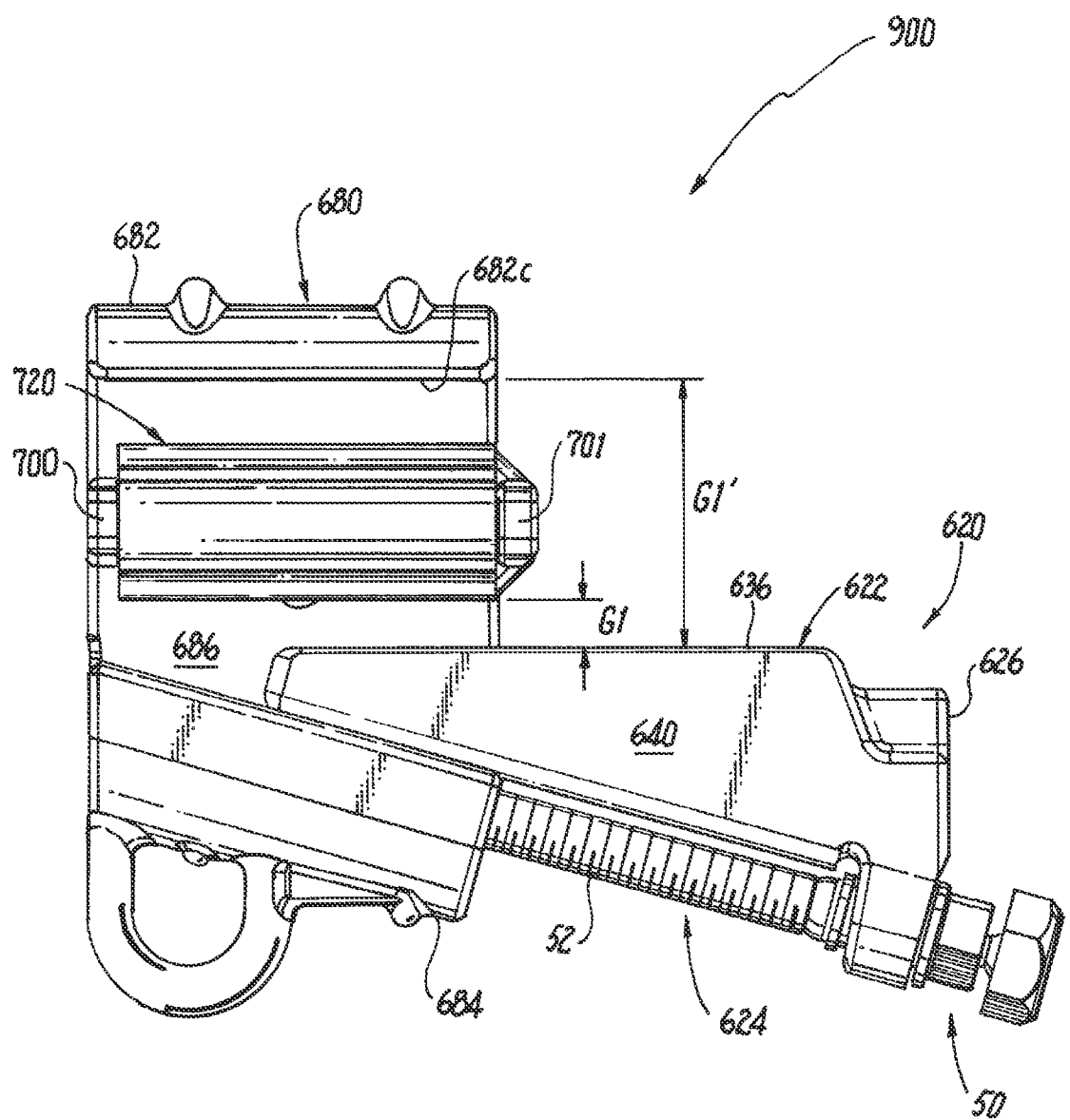
FIG. 45 is a front elevation view of the wedge type electrical cable connector assembly of FIG. 42, illustrating threading of the fastener in a threaded bore of the mounting member of the frame.
Figure 46:
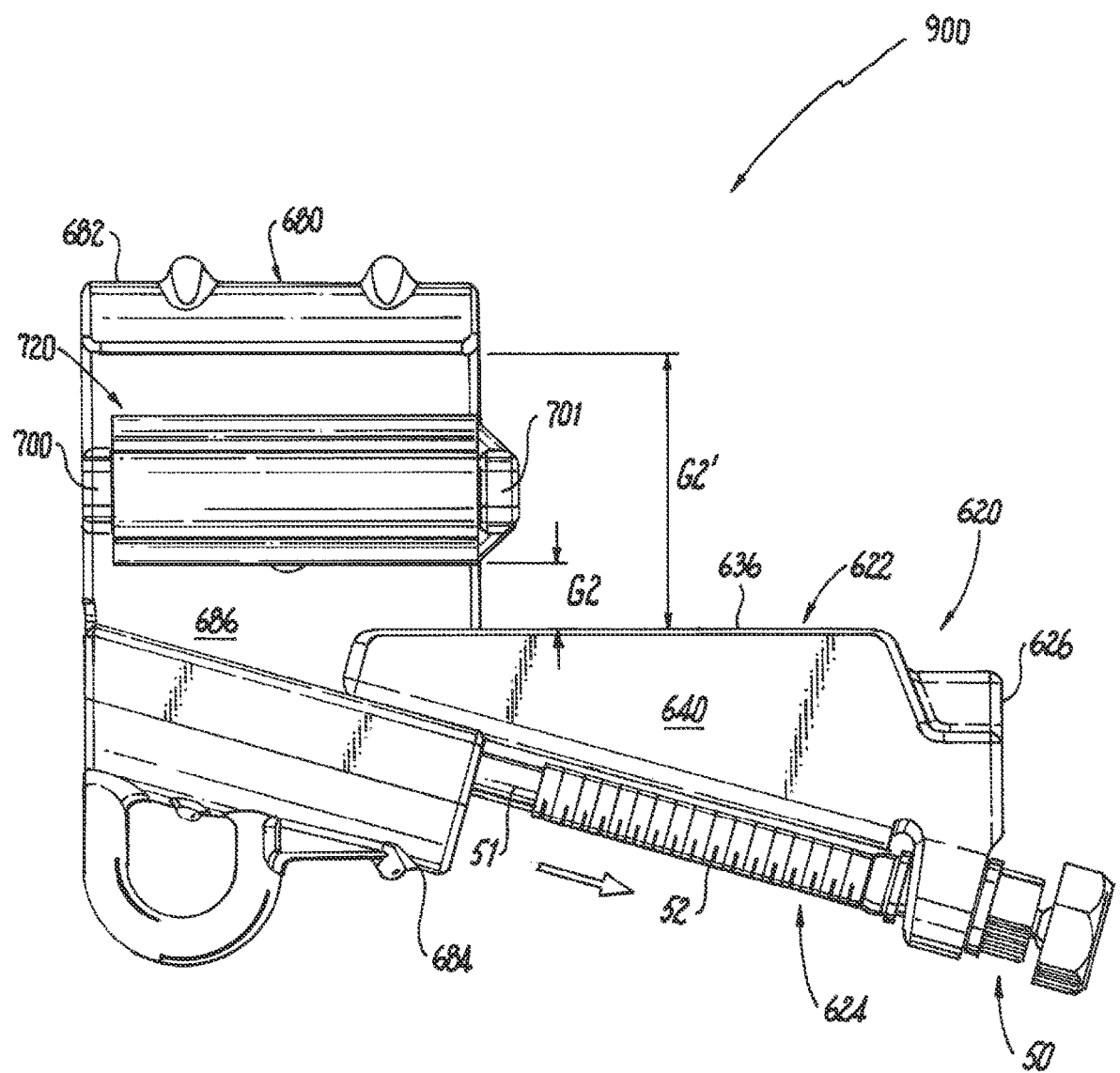
FIG. 46 is a front elevation view of the wedge type electrical cable connector assembly similar to FIG. 45, illustrating the unthreaded portion of the fastener extending from the threaded bore of the mounting member.
Figure 47:
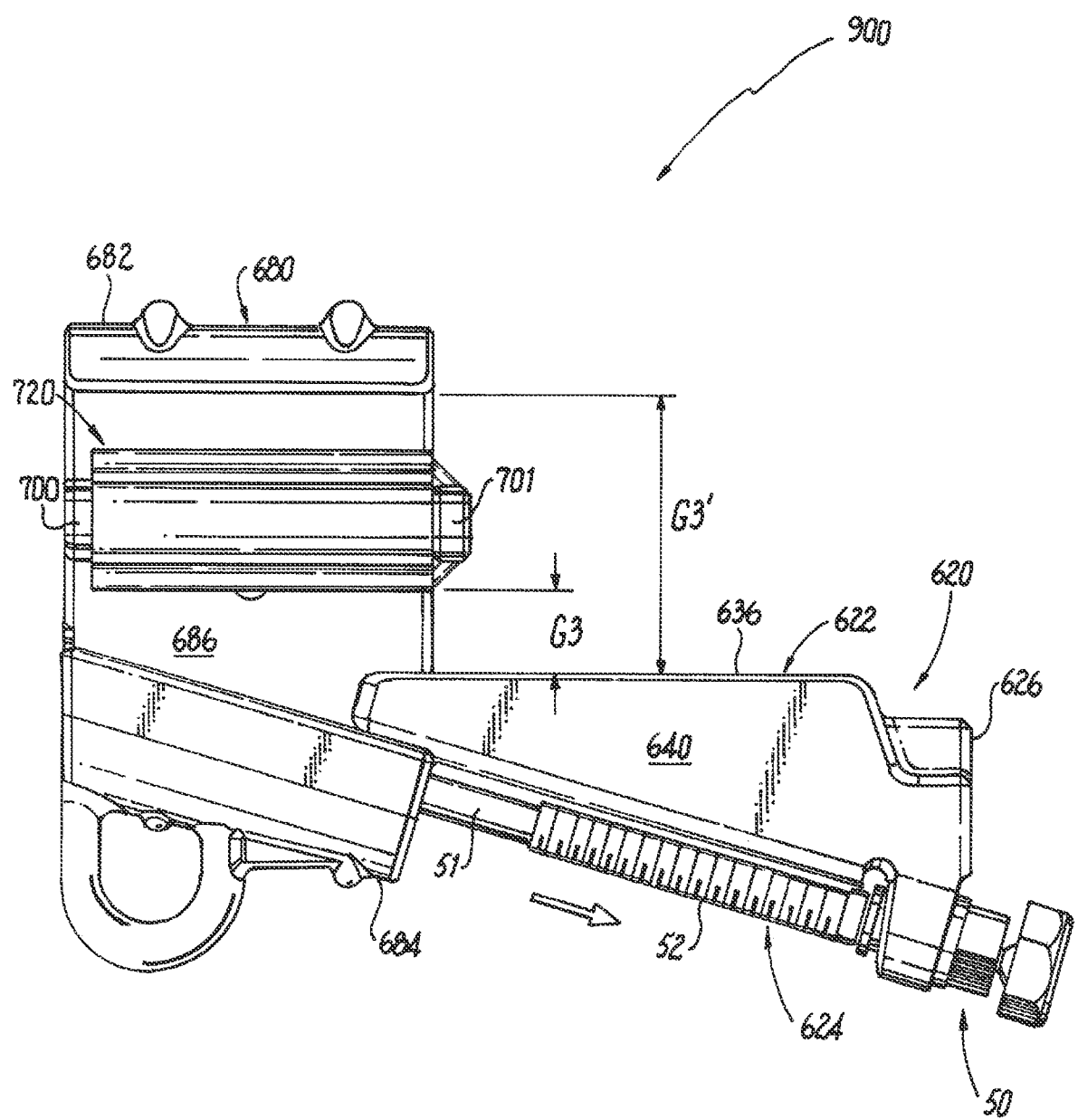
FIG. 47 is a front elevation view of the wedge type electrical cable connector assembly similar to FIG. 46, illustrating the unthreaded portion of the fastener extending further from the threaded bore of the mounting member.
Figure 48:
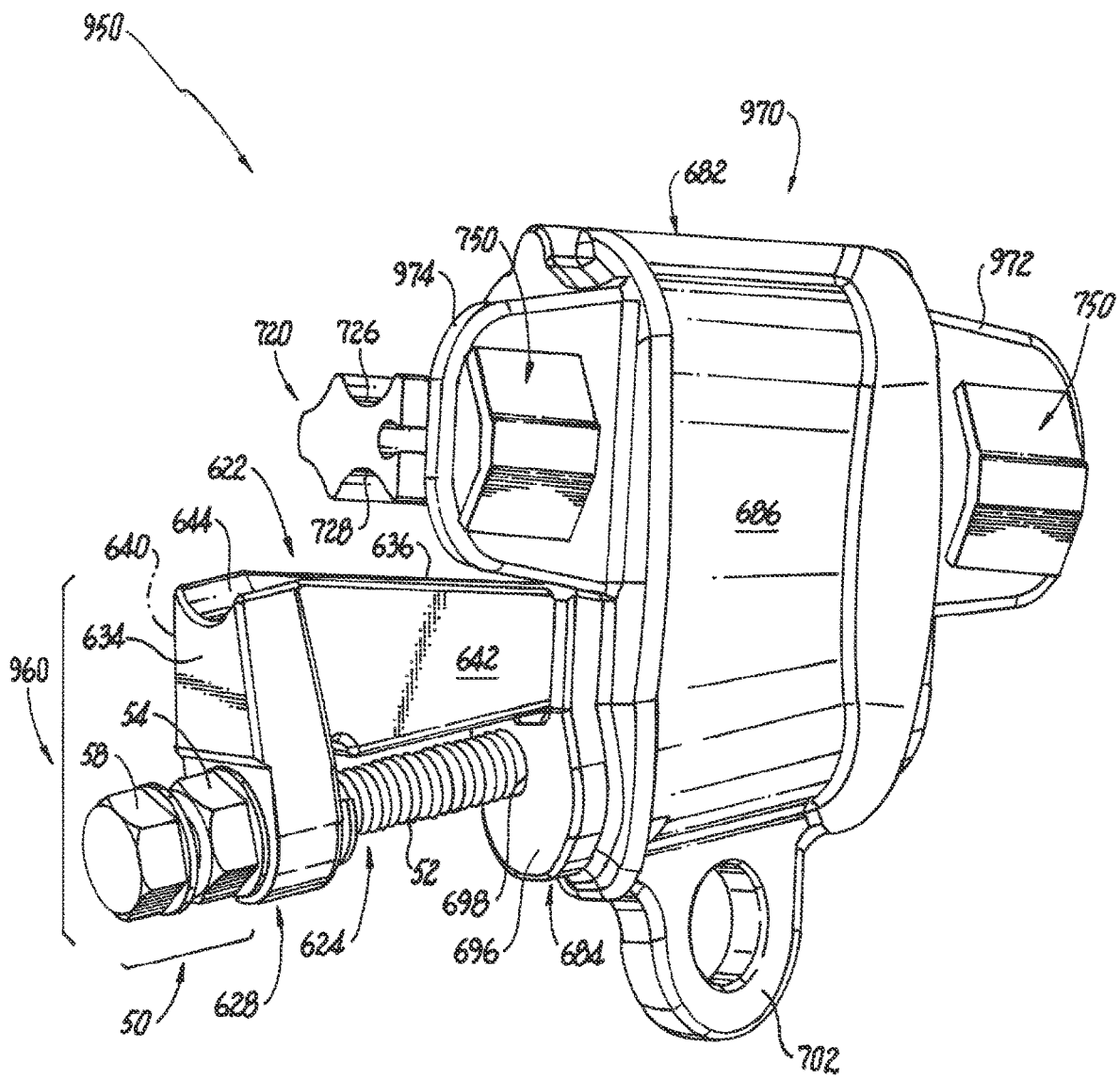
FIG. 48 is a rear perspective view of another exemplary embodiment of a wedge type electrical cable connector assembly according to the present disclosure, illustrating a frame with ears, a wedge assembly and a conductor interface of the cable connector assembly.
Figure 49:
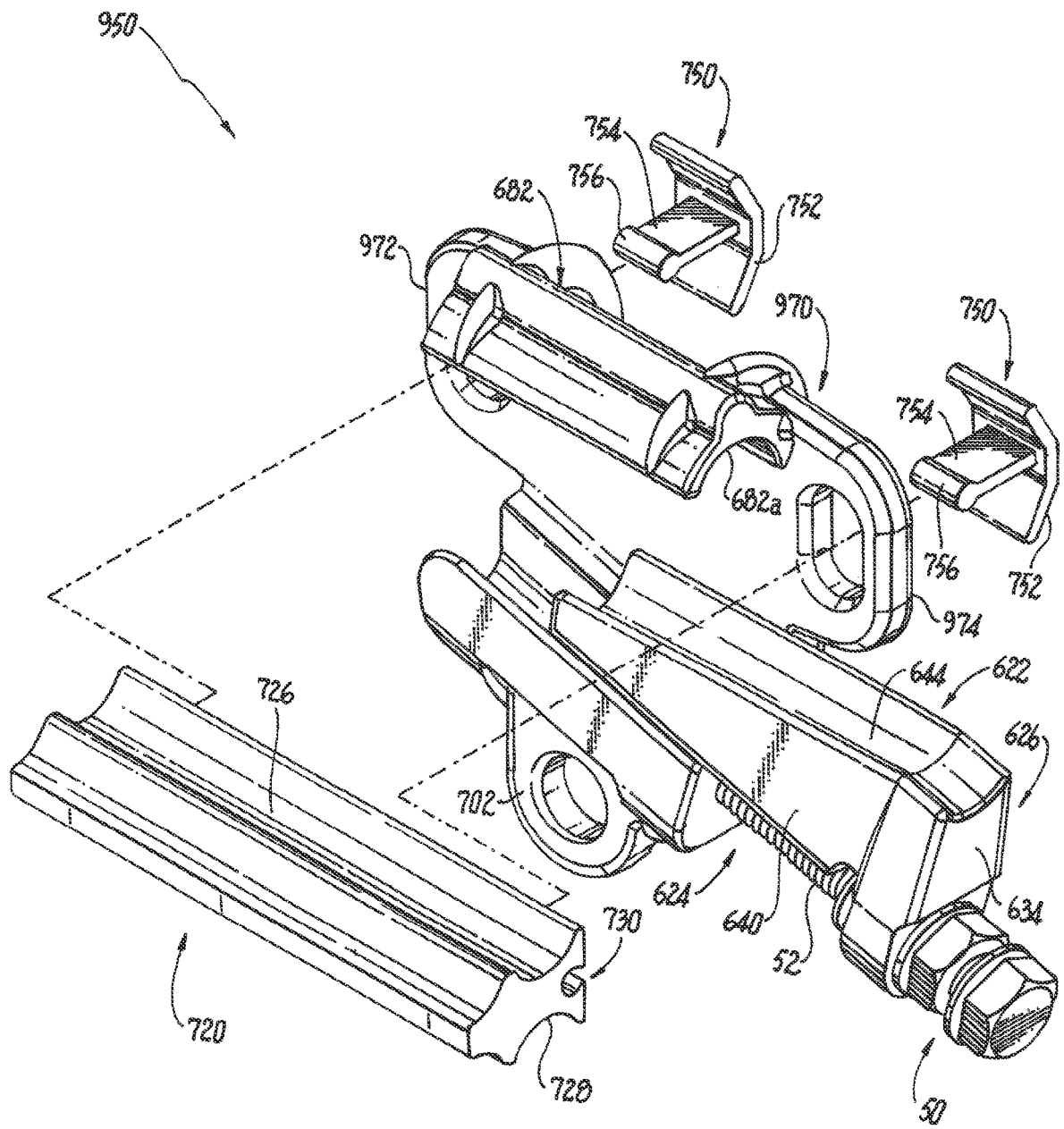
FIG. 49 is an exploded front perspective view of the wedge type electrical cable connector assembly of FIG. 48.

Referring now to FIGS. 42-47, another exemplary embodiment of a connector according to the present disclosure is shown and used to electrically and mechanically connect a main conductor 800 to a tap conductor 810. The connector 900 is substantially similar to the connector 600 described above with reference to FIGS. 31-41 such that like numerals are used for like components. In this exemplary embodiments, the connector 900 includes the wedge assembly 620, the frame 680, the interface 720 and one or more connecting members 750. The wedge assembly 620 is substantially similar to the wedge assembly 620 described above and a detailed description thereof is not repeated. However, in this exemplary embodiment, the fastener guide 630 is positioned in close proximity to the front wall 632 of the wedge body 626, as seen in FIG. 44. The fastener 624 is an elongated bolt having a head portion 50 followed by a threaded portion 52 followed by an unthreaded portion 51. For ease of description, the head portion 50 and threaded portion 52 are described above and a detailed description thereof is not repeated. In this exemplary embodiment, the unthreaded portion 51 is elongated sufficient to permit a rapid advance of the wedge 622 of the wedge assembly 620 toward the center of the body 680, as shown in FIGS. 45-47, allowing the connector 900 to accommodate larger size and smaller size conductors 800 and/or 810 without increasing the time to install such conductors. In addition, the elongated unthreaded portion 51 of the fastener 624 permits the wedge 622 to be withdrawn further out of the frame 680 creating a wider gap between the top wall 636 of the wedge body 626 and the interface 720 and a wider gap between the top wall 636 of the wedge body 626 and edge 682c of the conductor contact wall 682 than would exist if the threaded portion 52 of the fastener 624 were threaded into the threaded bore 698 in the mounting member 696. For example, in FIG. 45, the gap "G1" between the top wall 636 of the wedge body 626 and the interface 720 would be at a minimum in the range that permits unobstructed insertion of the main conductor 800 and the tap conductor 810 into the connector 900. And the gap "G1'" between the top wall 636 of the wedge body 626 and edge 682c of the conductor contact wall 682 would be at a minimum in the range that permits unobstructed insertion of the main conductor 800 and the tap conductor 810 into the connector 900. In FIG. 46, the wedge 622 is withdrawn out of the frame 680 creating a gap "G2" between the top wall 636 of the wedge body 626 and the interface 720 that is larger than the gap G1 and creating a gap "G2'" between the top wall 636 of the wedge body 626 and the edge 682c of the conductor contact wall 682 that is larger than the gap "G1'". And, in FIG. 47, the wedge 622 is withdrawn further out of the frame 680 creating a gap "G3" between the top wall 636 of the wedge body 626 and the interface 720 is at a maximum, which is larger than the gaps G1 and G2, and in a range that permits unobstructed insertion of a larger main conductor 900 and a larger tap conductor 810 into the connector 800. And, creating a gap "G3'" between the top wall 636 of the wedge body 626 and the edge 682c of the conductor contact wall 682 that is at a maximum, which is larger than the gaps G1' and G2', and in a range that permits unobstructed insertion of a larger main conductor 800 and a larger tap conductor 810 into the connector 900.

In the exemplary embodiment of FIGS. 42-47, the frame 680 may also include a second stop member 701, seen in FIG. 43, that can prevent longitudinal movement of the interface 720 along axis "A" of the frame 680 when the interface 720 is mated with the frame 680. The second stop member 701 may also limit and possibly prevent rotation of the interface 720 when tightening the fastener 624 to secure the main conductor 800 and the tap conductor 810 to the frame 680.

Referring now to FIGS. 48-53, another exemplary embodiment of a connector according to the present disclosure is shown and used to electrically and mechanically connect a main conductor 800 to a tap conductor 810. The connector 950 is substantially similar to the connector 600 described above with reference to FIGS. 31-41, and the connector 900 described above with reference to FIGS. 42-47, such that like numerals are used for like components. In this exemplary embodiments, the connector 950 includes a wedge assembly 960, a frame 970, an interface 720 and one or more connecting members 750. The wedge assembly 960 is substantially similar to the wedge assembly 620 described above such that like reference numerals are used and a detailed description of the similar features are not repeated. The frame 970 is substantially similar to the frame 680 described above such that like reference numerals are used and a detailed description of the similar features are not repeated.

In this exemplary embodiment, the frame 970 is a C-shaped like body or member. The frame 970 has a conductor contact wall 682, a wedge support wall 684, and a rear wall 686 between the conductor contact wall 682 and the wedge support wall 684. Between the conductor contact wall 682, the wedge support wall 684 and the rear wall 686 is a wedge receiving channel 688. The wedge receiving channel 688 at a first end 690 of the rear wall 686 has a length "L1" and the wedge receiving channel 688 at a second end 692 of the rear wall 686 has a length "L2" similar to that seen in FIG. 33. In the embodiment shown, the length "L1" is less than the length "L2" such that one or both of the conductor contact wall 682 and the wedge support wall 684 are tapered relative to a longitudinal axis "A" of the frame 970. In the embodiment shown, the wedge support wall 684 is at an angle "α" relative to a longitudinal axis "A" of the frame 970. The angle "α", similar to the angle seen in FIG. 33, may be in the range of about 5 degrees to about 25 degrees. In the embodiment shown, the conductor contact wall 682, the wedge support wall 684, the rear wall 686 and the wedge receiving channel 688 form the C-shaped like body or member.

Figure 50:
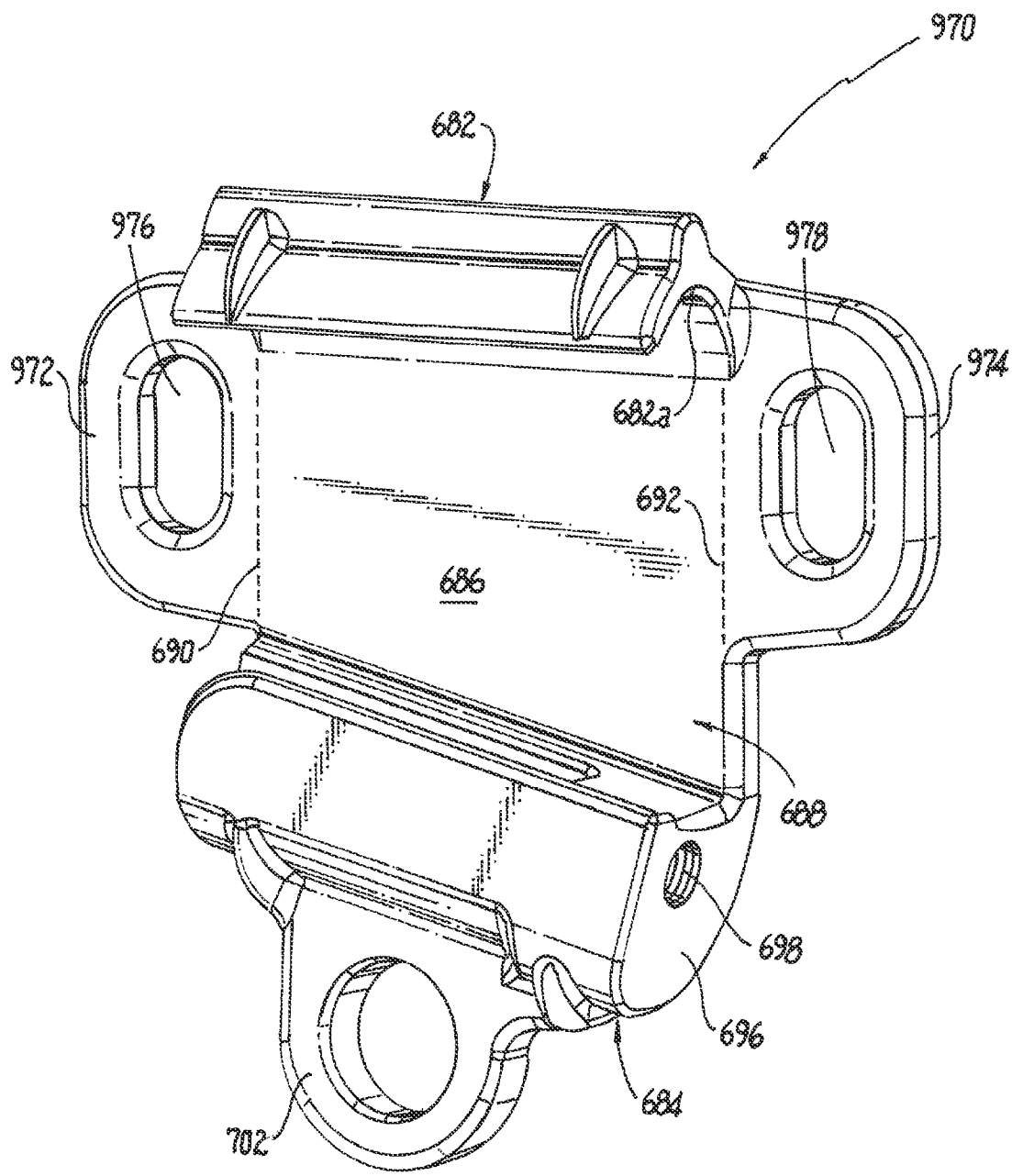
FIG. 50 is a front perspective view of the frame of the wedge type electrical cable connector assembly of FIG. 48, illustrating two ears extending from a rear wall of the frame.
Figure 51:
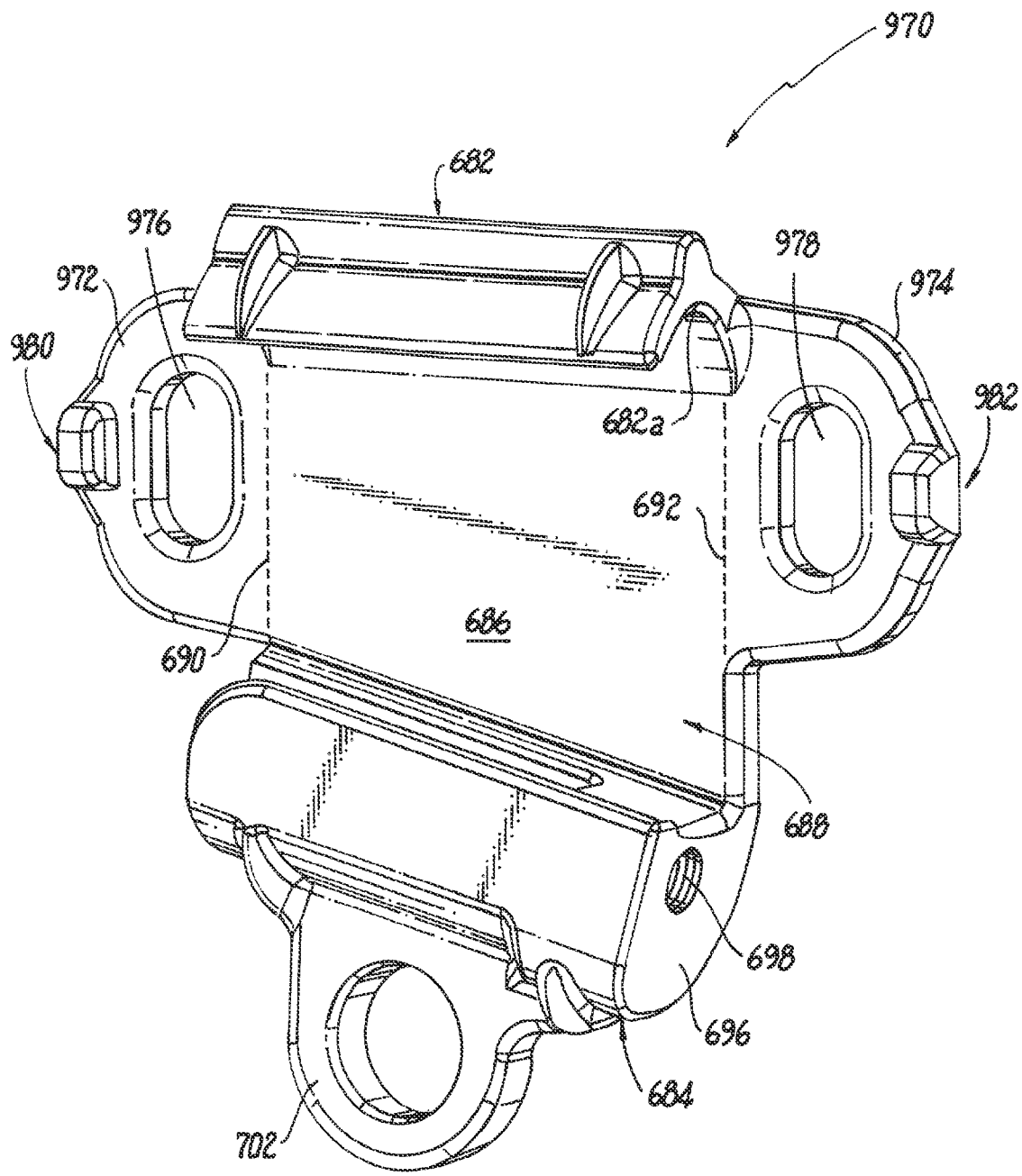
FIG. 51 is a front perspective view of another exemplary embodiment of the frame of the wedge type electrical cable connector assembly of FIG. 48, illustrating two ears extending from a rear wall of the frame and an interface stop member on each ear.

Continuing to refer to FIGS. 48-53, the first end 690 of the rear wall 686 has an ear 972 extending therefrom so that the ear 972 is in the same plane as the rear wall 686. Similarly, the second end 692 of the rear wall 686 has an ear 974 extending therefrom so that the ear 974 is in the same plane as the rear wall 686. The ears 972 and 974 extend the width of the rear wall 686 of the frame 970, as shown in FIG. 50. It is noted that by extending the width of the rear wall 686, the length "L3" of the conductor interface 720 would be increased so that the connecting members 750 can couple the conductor interface 720 to the frame 970.

The ear 972 is a substantially flat wall that is integrally or monolithically formed into the rear wall 686 or is secured to the rear wall using, for example, welds, adhesives or fasteners. The ear 972 has one or more openings 976, e.g., slots, through which the connecting member 750 may pass to mate the conductor interface 720 to the frame 970 as described hereinabove. In the exemplary embodiment of FIG. 50 there is a single opening 976. But, as described above, there may be multiple openings, or other opening, such as the T-shaped opening described above. The ear 972 may also include a stop member 980, seen in FIG. 50, used to prevent longitudinal movement of the interface 720 along axis "A" when mated with the frame 970. The stop member 980 may also limit and possibly prevent rotation of the interface 720 when tightening the fastener 624 to secure the main conductor 800 and the tap conductor 810 to the frame 970.

Continuing to refer to FIG. 50, the ear 974 is a substantially flat wall that is integrally or monolithically formed into the rear wall 686 or is secured to the rear wall using, for example, welds, adhesives or fasteners. The ear 974 has one or more openings 978, e.g., slots, through which the connecting member 750 may pass to mate the conductor interface 720 to the frame 970 as described hereinabove. In the exemplary embodiment of FIG. 50 there is a single opening 978. But, as described above, there may be multiple openings, or other opening, such as the T-shaped opening described above. The ear 974 may include a stop member 982 used to prevent longitudinal movement of the interface 720 along axis "A" when mated with the frame 970. The stop member 982 may also limit and possibly prevent rotation of the interface 720 when tightening the fastener 624 to secure the main conductor 800 and the tap conductor 810 to the frame 970.

Figure 52:
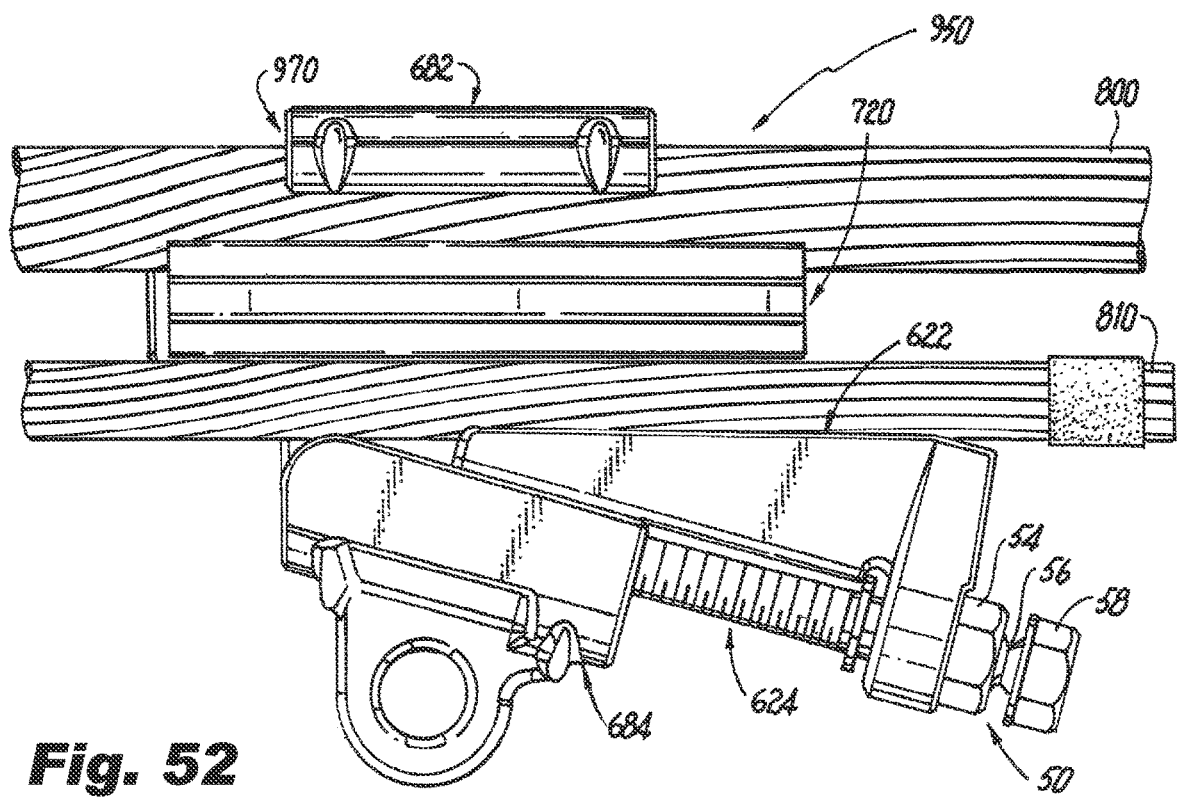
FIG. 52 is the front elevation view of the frame, conductor interface and flex connecting members of FIG. 48, illustrating a main conductor secured to the cable connector assembly and the wedge assembly positioned to receive a tap conductor.
Figure 53:
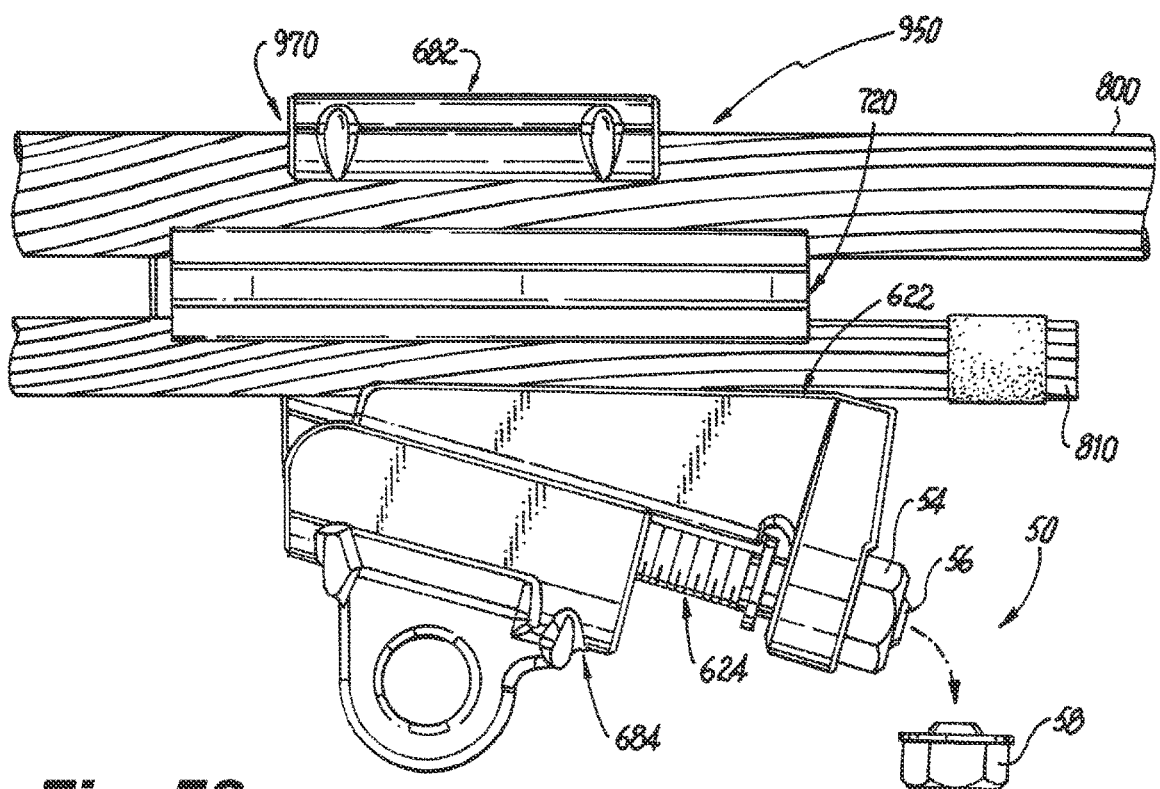
FIG. 53 is a front elevation view of the frame and conductor interface of FIG. 52, illustrating the main conductor secured to the cable connector assembly and the tap conductor secured to the cable connector assembly.

Referring now to FIGS. 52 and 53, the electrical connector 950 can be installed in the following exemplary manner. The connector 950 is first assembled where the interface 720 is mated to the frame 970 using the connecting members 750 of FIG. 49, and the wedge 622 is attached to the frame 970 using the fastener 624 of the wedge assembly 620. The wedge 622 is attached to the frame 970 so that wedge 622 is withdrawn from a center of the frame 970 sufficient to permit the conductors 800 and 810 to be installed on the connector 950, as described herein. At this point, the interface 720 is in close proximity to the wedge assembly 620. The connector 950 is then suspended from a main conductor 800 by placing the inner surface 682a of the conductor contact wall 682 onto the main conductor 800, as described above with reference to, for example, FIGS. 37-39. As described, when placing the inner surface 682a of the conductor contact wall 682 onto the main conductor 800, the interface 720 may need to move axially and/or linearly, e.g., flex, relative to the frame 970 so that the interface 720 is not obstructing the placement of the inner surface 682a onto the main conductor 800. A tap conductor 810 is then passed, e.g., slid, between the contact surface 728 of the interface 720 and the contact surface 644 of the wedge body 626. As the tap conductor 810 is passed between the contact surface 728 in the interface 720 and the contact surface 644 of the wedge body 626, the interface 720 slides within the frame 970 toward the conductor contact wall 682. As noted above, the stops 972 and 974 on the frame ears 972 and 974 of the frame 970, seen in FIG. 50, may be provided to prevent the interface 720 from moving linearly and rotating as the interface 720 slides relative to the frame 970 toward the conductor contact wall 682. With the conductors 800 and 810 positioned within the connector 950, the fastener 624 is rotated, e.g., tightened, so that wedge 622 moves toward and into the interior of the frame 970 causing the contact surface 644 of the wedge body 626 to engage the bottom surface of the tap conductor 810. As the wedge 622 is further moved into the interior of the frame 970, the wedge body 626 pushes the tap conductor 810 into engagement with the contact surface 728 of the interface 720. Continued movement of the wedge 622 into the interior of the frame 970 causes the interface 720 to move upwardly causing the contact surface 726 of the interface 720 into contact with the main conductor 800. Continued tightening of the fastener 624 forces the main conductor 800 against the inner surface 682a of the conductor contact wall 682 of the frame 970. The fastener 624 is tightened until a stable, electrically conductive path is established between the main conductor 800 and the tap conductor 810. In embodiments where the fastener 624 is a shear fastener, the cap nut 58 shears off when sufficient force has been applied by the wedge 622 against the tap conductor 810, the interface 720, the main conductor 800 and frame 970, as described above. While the above installation embodiment describes the connector 950 being suspended from the main conductor 800 first and then the tap conductor 810 being installed, the present disclosure also contemplates the tap conductor 810 being installed first and the suspending the connector 970 and the tap conductor 810 from the main conductor 800.

While illustrative embodiments of the present disclosure have been described and illustrated above, it should be understood that these are exemplary of the disclosure and are not to be considered as limiting. Additions, deletions, substitutions, and other modifications can be made without departing from the spirit or scope of the present disclosure. Accordingly, the present disclosure is not to be considered as limited by the foregoing description.

What is claimed is:

1. A wedge type electrical power connector assembly comprising:
   a frame including a conductor contact wall, a wedge support wall and a rear wall having at least one opening, the rear wall being between the conductor contact wall and the wedge support wall, such that the conductor contact wall, wedge support wall and rear wall form a wedge receiving channel;
   an interface movably coupled to the frame by at least one connecting member passing at least partially through the at least one opening and mating to the interface; and
   a wedge assembly positioned at least partially within the wedge receiving channel and movably coupled to the frame.

2. The wedge type electrical power connector assembly according to claim 1, wherein the frame includes a mounting member configured to receive a fastener movably coupled to the wedge assembly.

3. The wedge type electrical power connector assembly according to claim 1, wherein the interface is movably coupled to the frame such that the interface is within the wedge receiving channel.

4. The wedge type electrical power connector assembly according to claim 1, wherein the interface is movably coupled to the frame by the at least one connecting member such that the interface can move axially and linearly relative to the frame.

5. The wedge type electrical power connector assembly according to claim 4, wherein the interface can move axially and linearly within the wedge receiving channel.

6. The wedge type electrical power connector assembly according to claim 1, wherein the at least one connecting member comprises a flexible member.

7. The wedge type electrical power connector assembly according to claim 6, wherein the flexible member comprises an elastomeric member.

8. The wedge type electrical power connector assembly according to claim 6, wherein the flexible member comprises a base and a leg, the leg having an interface coupling member configured to mate with the interface.

9. The wedge type electrical power connector assembly according to claim 1, wherein the interface is coupled to the frame such that the interface is within the wedge receiving channel, and wherein the rear wall of the frame includes at least one stop to maintain the interface within the wedge receiving channel.

10. A wedge type electrical power connector assembly comprising:
    a frame having a conductor contact wall, a wedge support wall and a rear wall between the conductor contact wall and the wedge support wall, such that the conductor contact wall, wedge support wall and rear wall form a wedge receiving channel, the rear wall having at least one ear extending therefrom;
    an interface movably coupled to the frame by at least one connecting member, wherein the frame includes at least one opening configured to permit a portion of the connecting member to pass therethrough to couple the interface to the frame, and wherein the ear includes at least one stop configured to maintain the interface within the wedge receiving channel; and
    a wedge assembly positioned at least partially within the wedge receiving channel and movably coupled to the frame.

11. The wedge type electrical power connector assembly according to claim 10, wherein the frame includes a mounting member configured to receive a fastener movably coupled to the wedge assembly.

12. The wedge type electrical power connector assembly according to claim 10, wherein the interface is movably coupled to the frame such that the interface is at least partially within the wedge receiving channel.

13. The wedge type electrical power connector assembly according to claim 10, wherein the interface is movably coupled to the at least one ear by the at least one connecting member such that the interface can move axially and linearly relative to the frame.

14. The wedge type electrical power connector assembly according to claim 13, wherein the interface can move axially and linearly within the wedge receiving channel.

15. The wedge type electrical power connector assembly according to claim 10, wherein the at least one connecting member comprises a flexible member.

16. The wedge type electrical power connector assembly according to claim 15, wherein the flexible member comprises an elastomeric member.

17. The wedge type electrical power connector assembly according to claim 15, wherein the flexible member comprises a base and a leg, the leg having an interface coupling member configured to mate with the interface.

\* \* \* \* \*